Figures 1, 2:
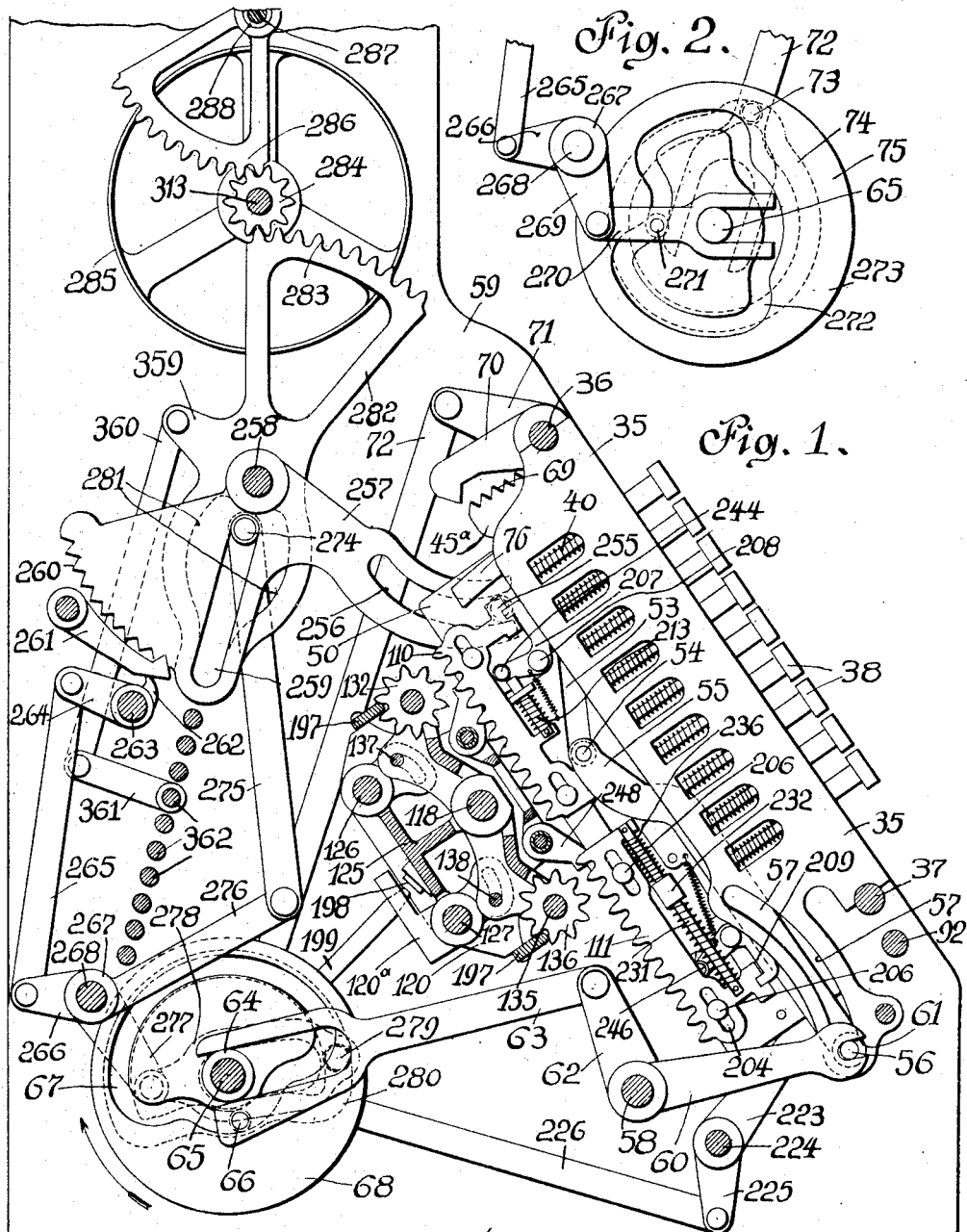

H. A. MARTIN.
MULTIPLE CASH REGISTER.
APPLICATION FILED SEPT. 26, 1910.

1,185,696.

Patented June 6, 1916.
20 SHEETS—SHEET 1.

WITNESSES:

INVENTOR
Haakon A. Martin
ATTORNEYS

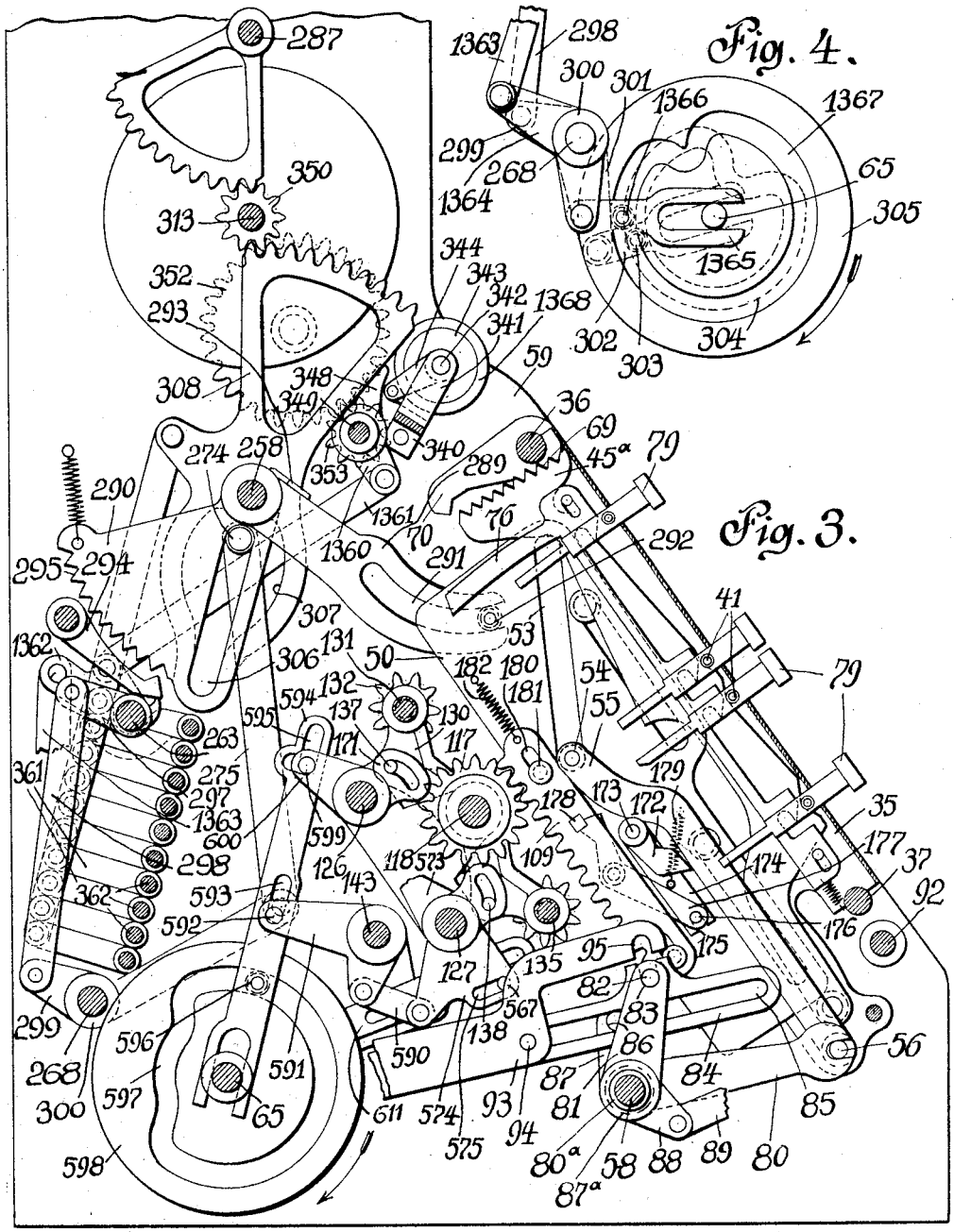

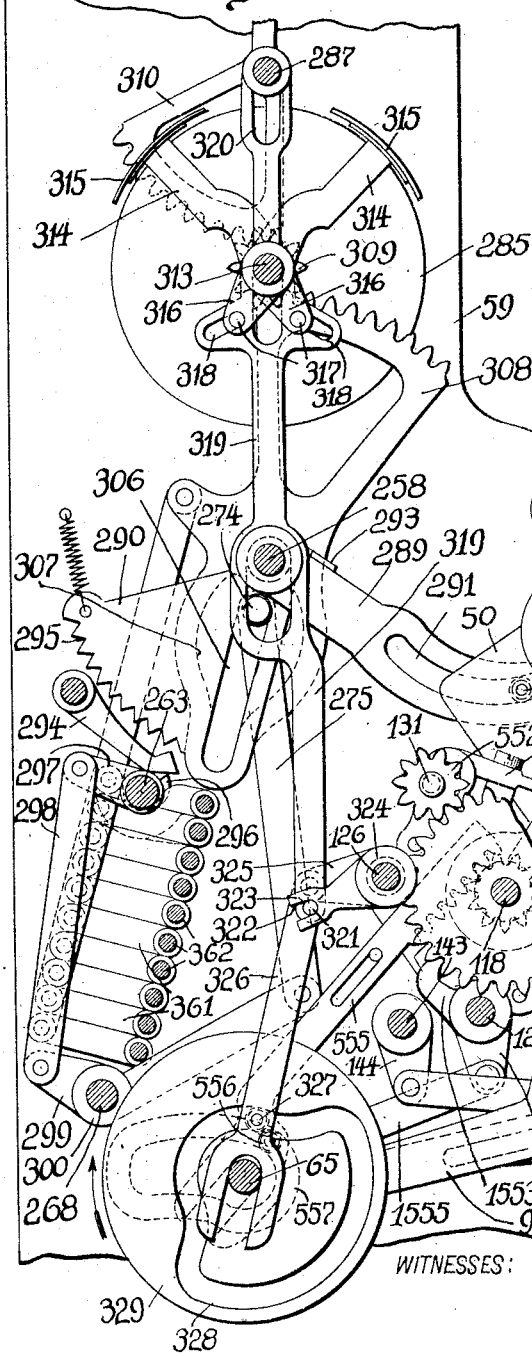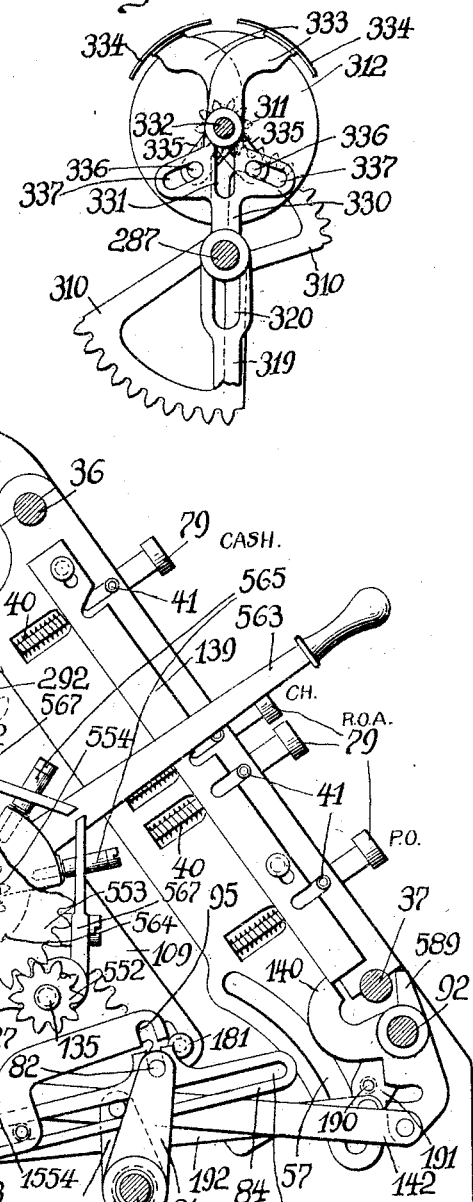

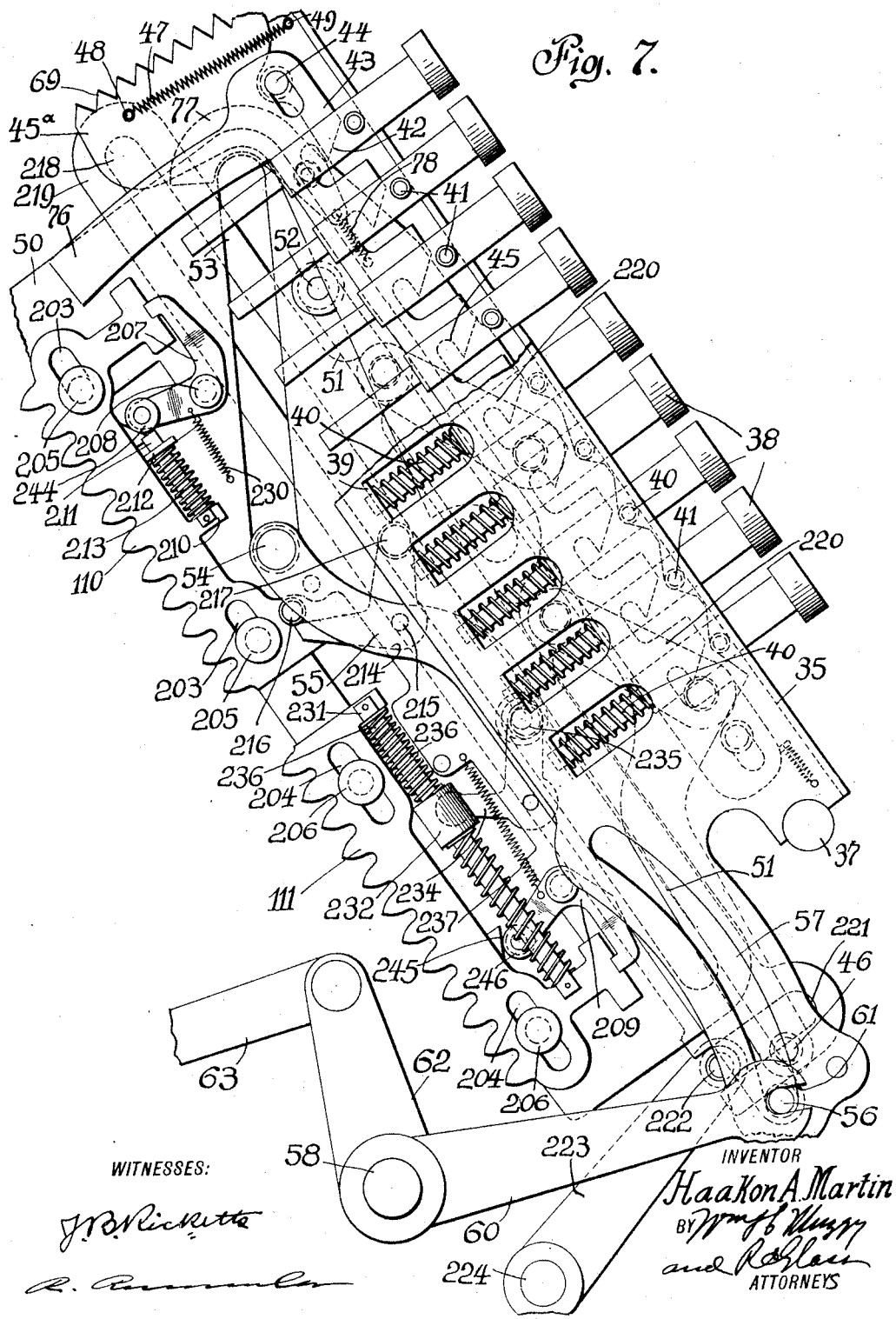

H. A. MARTIN.
MULTIPLE CASH REGISTER.
APPLICATION FILED SEPT. 26, 1910.
1,185,696.
Patented June 6, 1916.
20 SHEETS—SHEET 5.
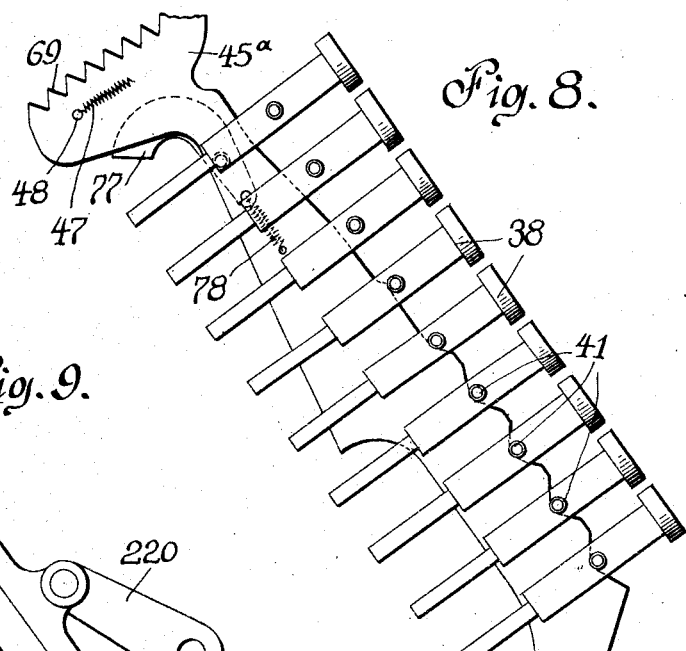
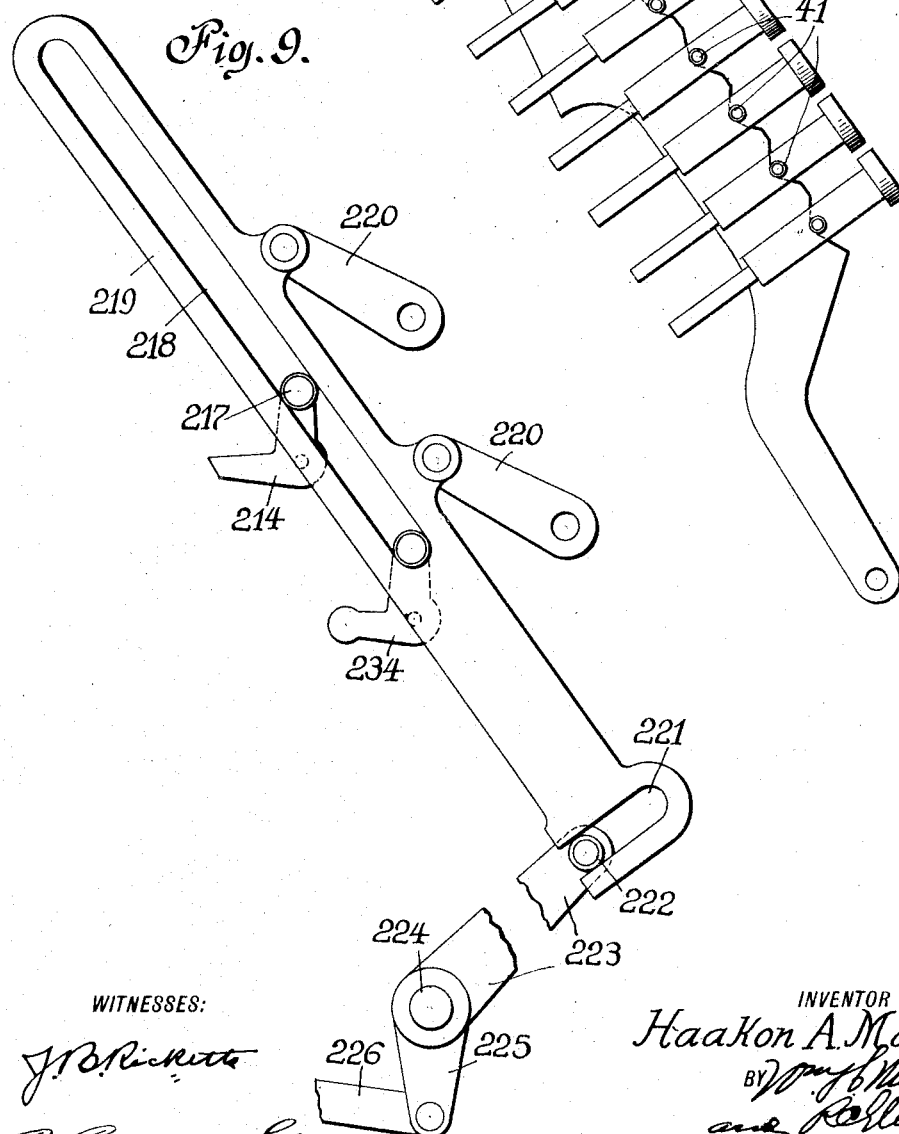
WITNESSES:
INVENTOR
Haakon A. Martin
BY
ATTORNEYS

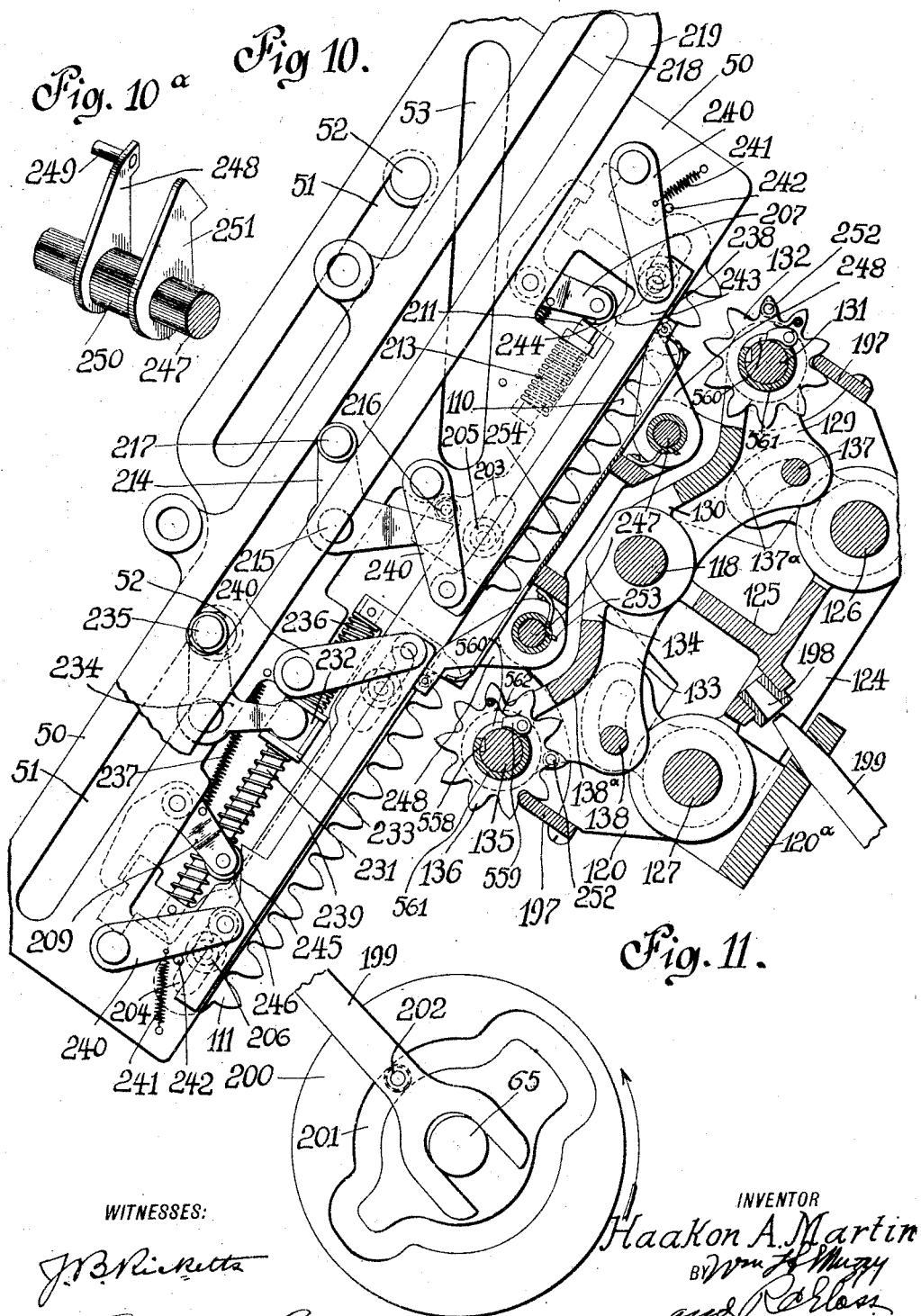

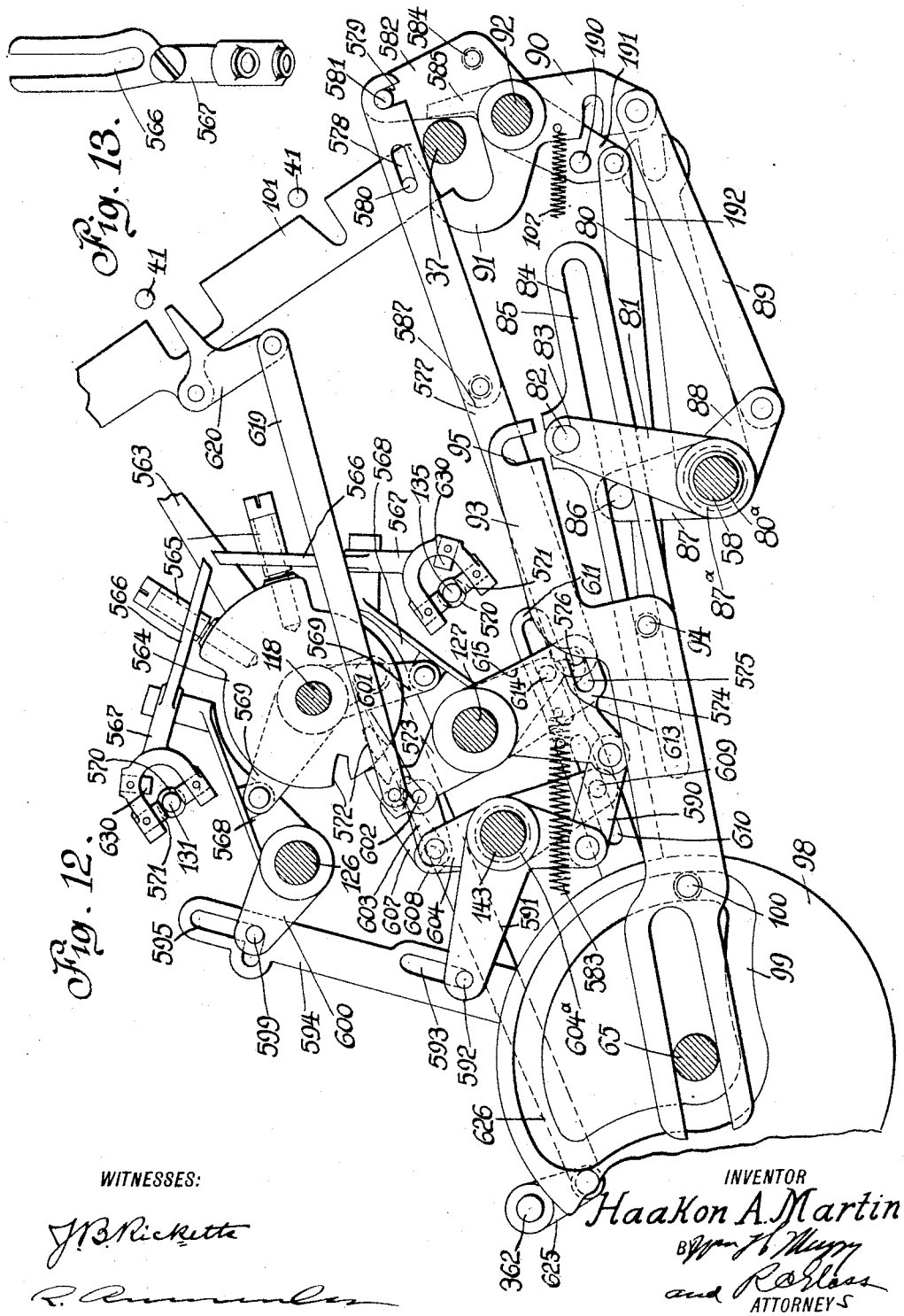

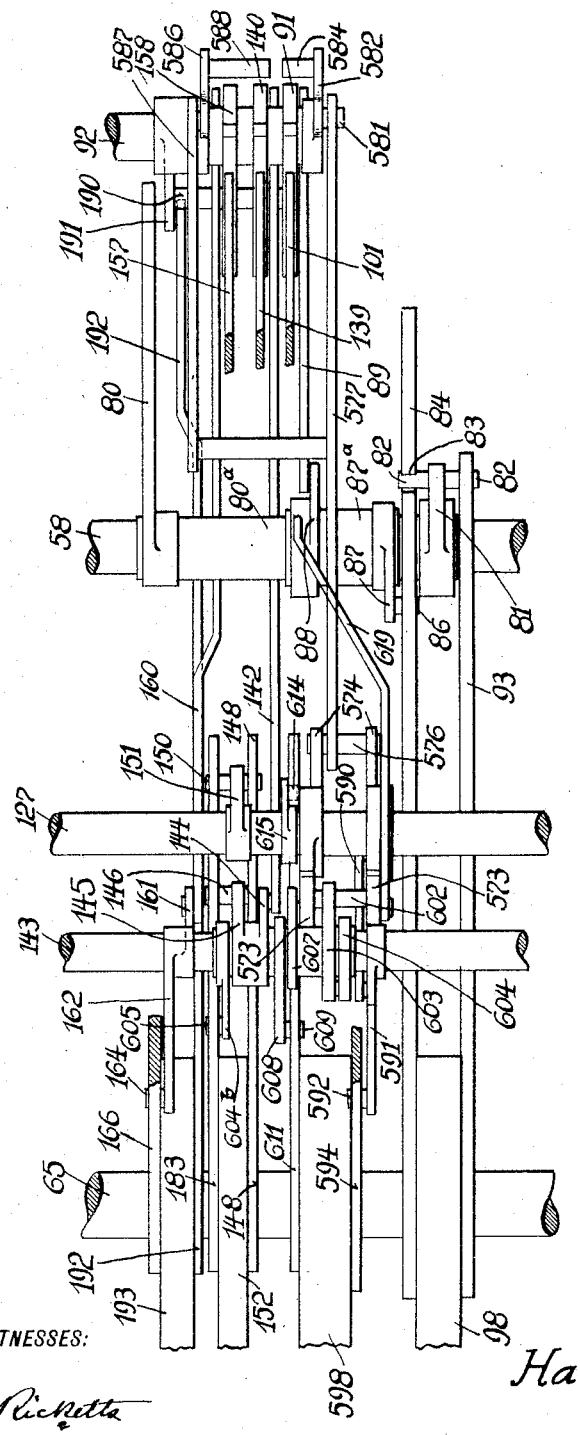

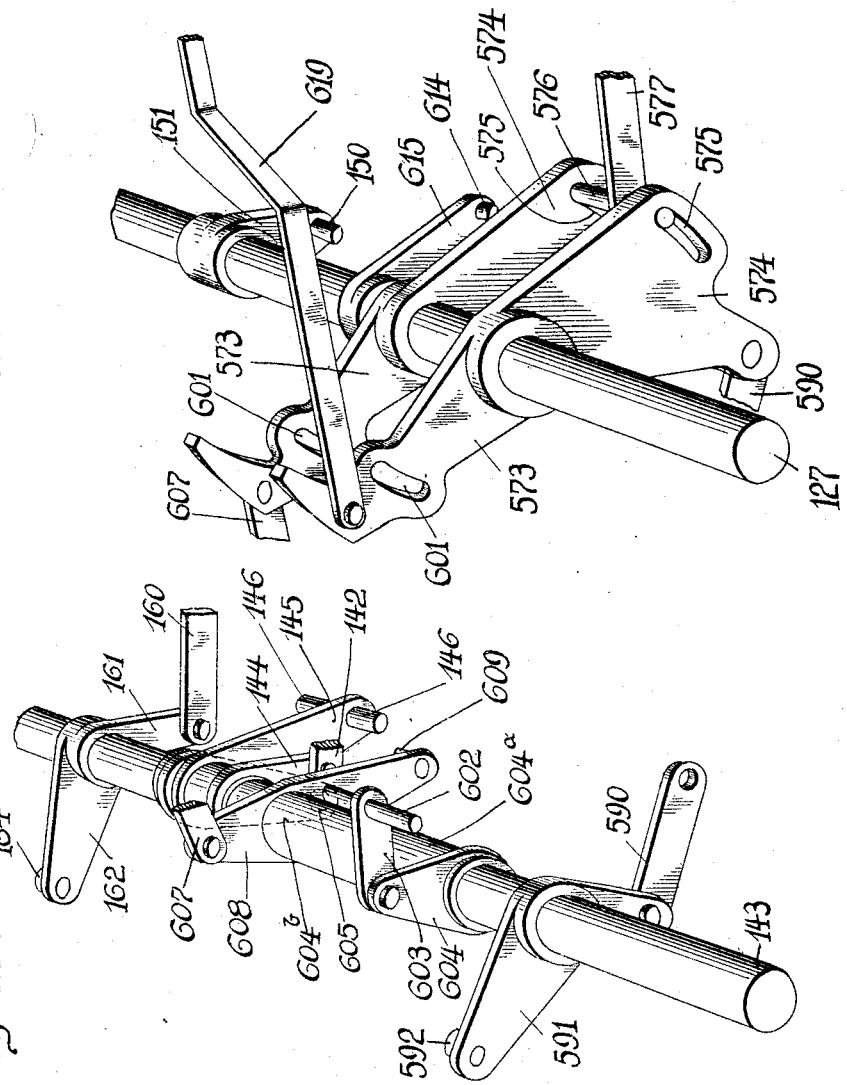

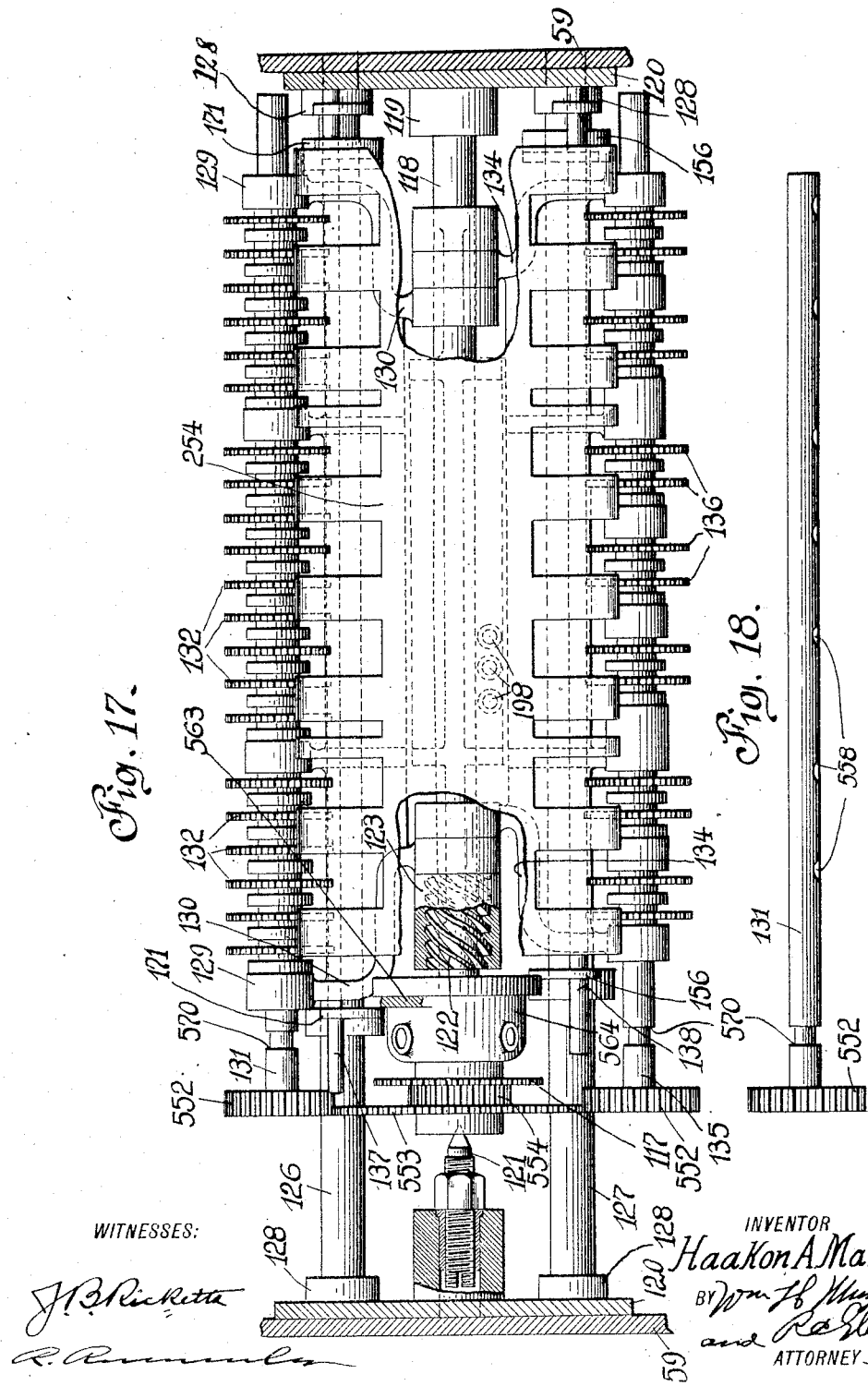

H. A. MARTIN.
MULTIPLE CASH REGISTER.
APPLICATION FILED SEPT. 26, 1910.
1,185,696.
Patented June 6, 1916.
20 SHEETS—SHEET 11.
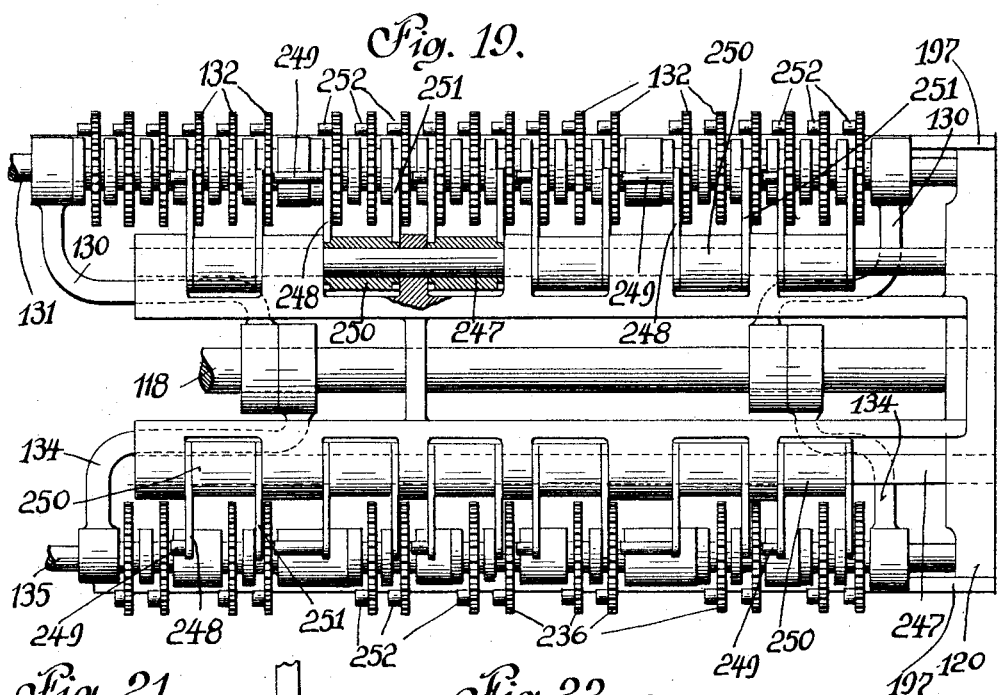
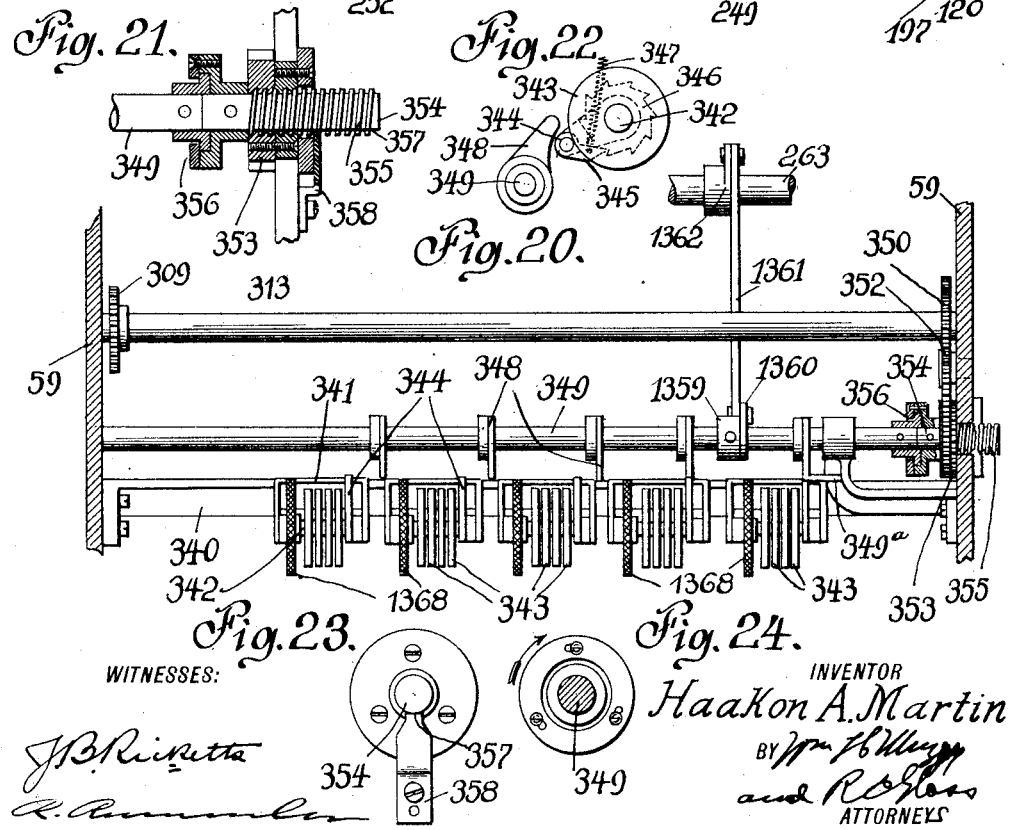
WITNESSES:
INVENTOR
Haakon A. Martin
BY
ATTORNEYS

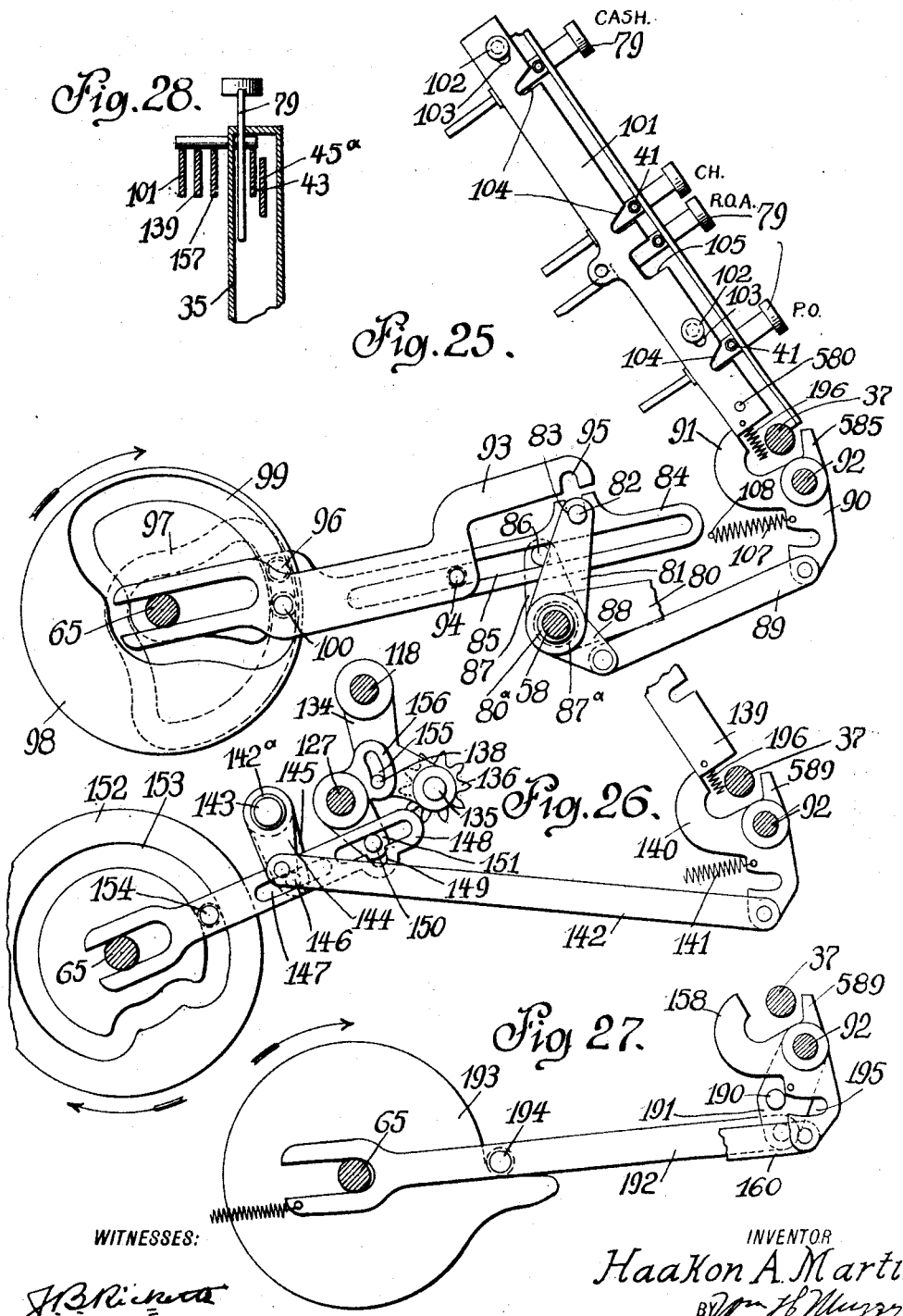

H. A. MARTIN.
MULTIPLE CASH REGISTER.
APPLICATION FILED SEPT. 26, 1910.

1,185,696.

Patented June 6, 1916.
20 SHEETS—SHEET 13.

WITNESSES:

INVENTOR
Haakon A. Martin
ATTORNEYS

H. A. MARTIN.
MULTIPLE CASH REGISTER.
APPLICATION FILED SEPT. 26, 1910.
1,185,696.
Patented June 6, 1916.
20 SHEETS—SHEET 14.
Fig. 31.
Fig. 32.
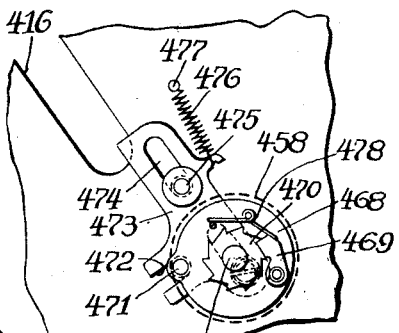
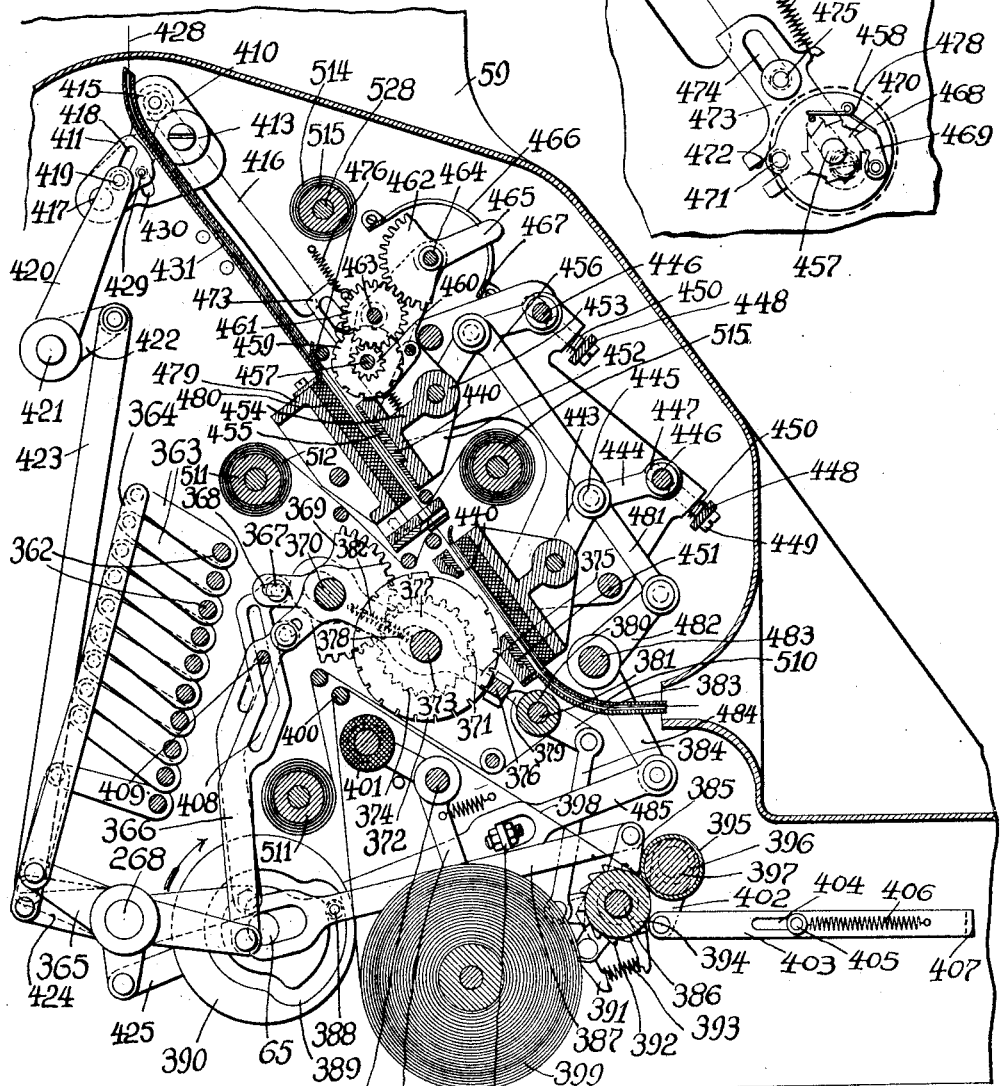
WITNESSES:
INVENTOR
Haakon A. Martin
BY
ATTORNEYS

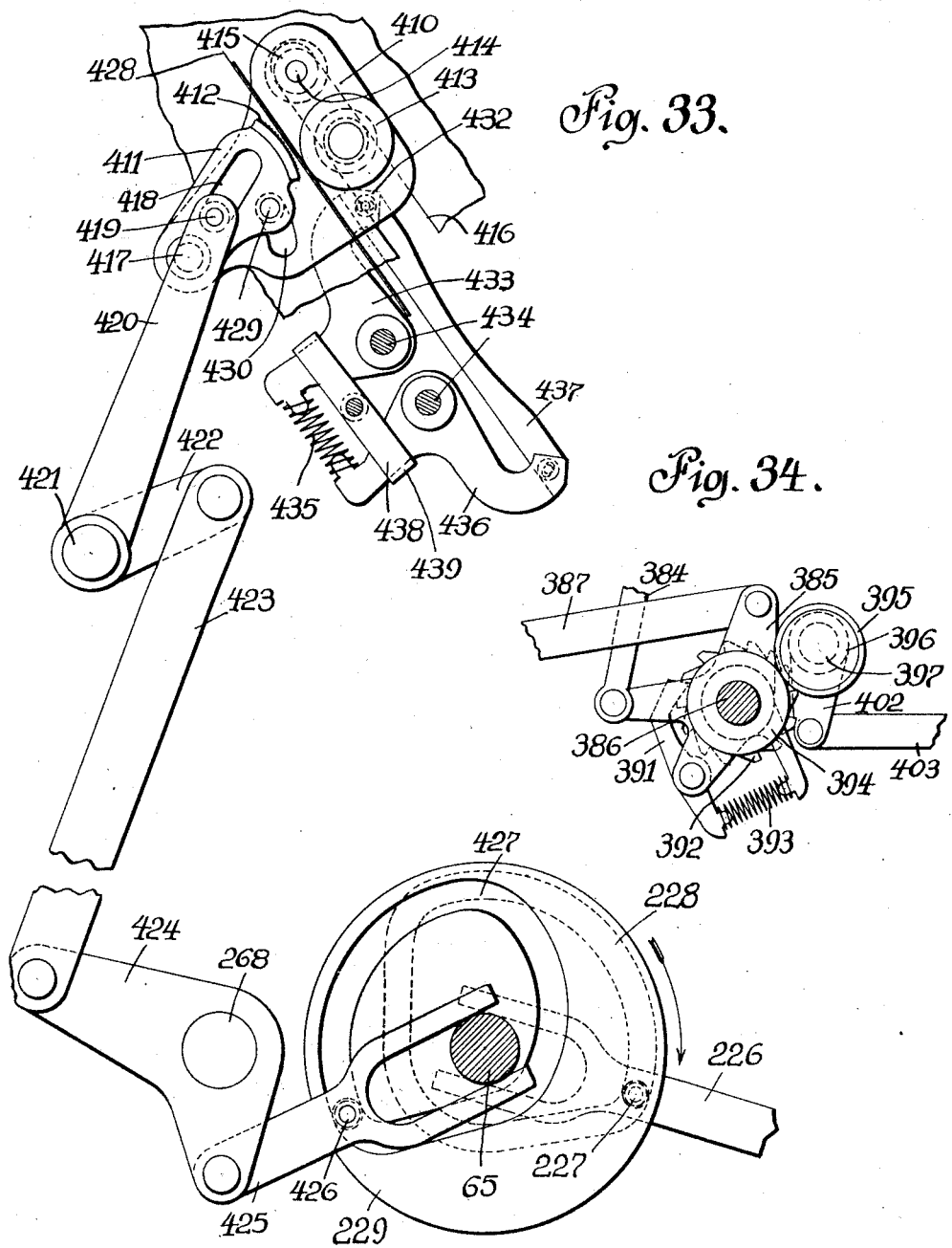

H. A. MARTIN.
MULTIPLE CASH REGISTER.
APPLICATION FILED SEPT. 26, 1910.
1,185,696.
Patented June 6, 1916.
20 SHEETS—SHEET 16.
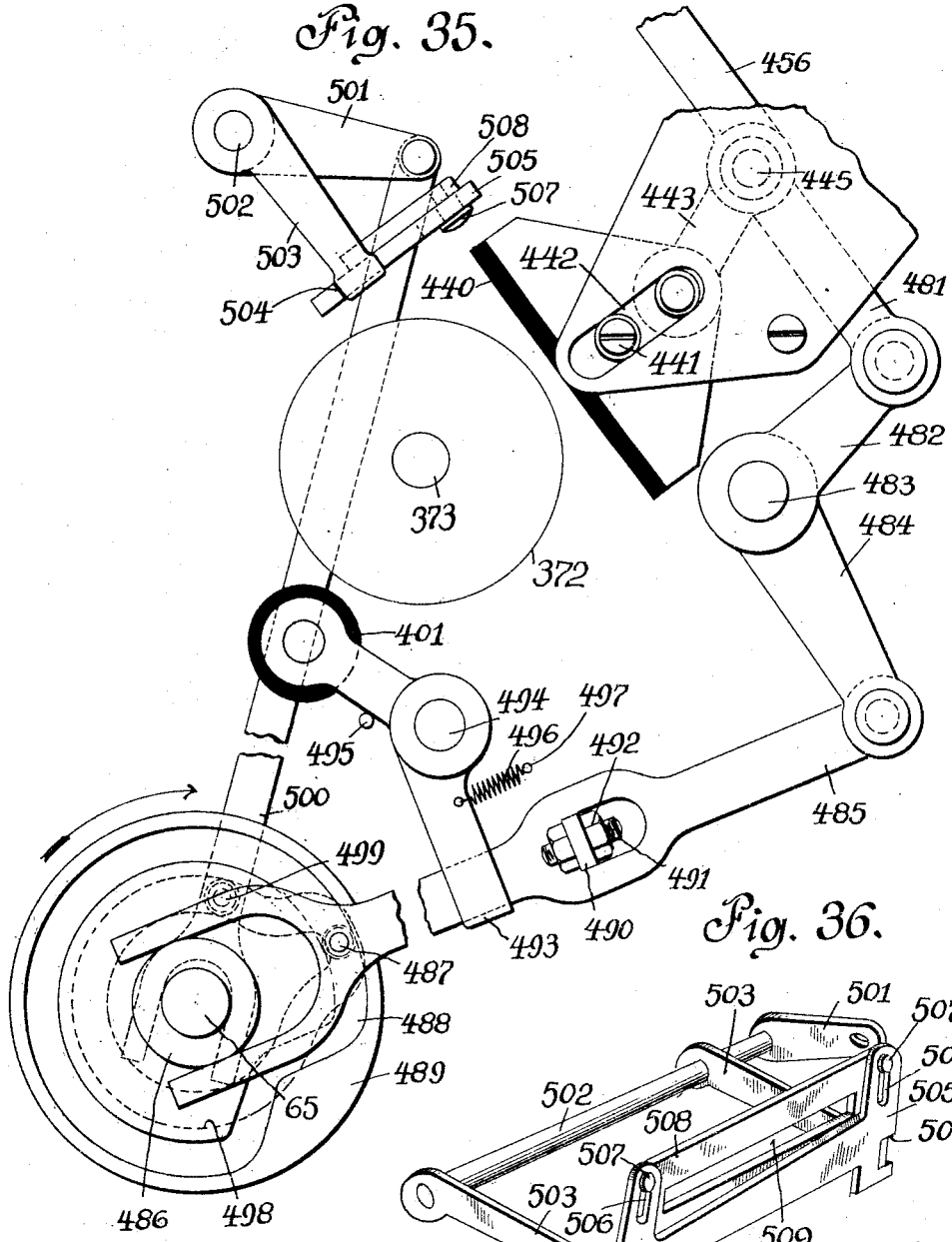
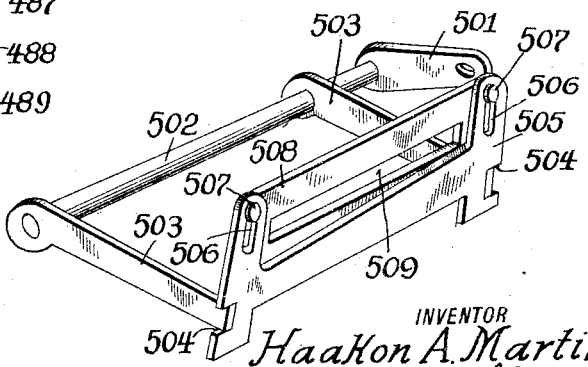
WITNESSES:
INVENTOR
Haakon A. Martin
ATTORNEYS

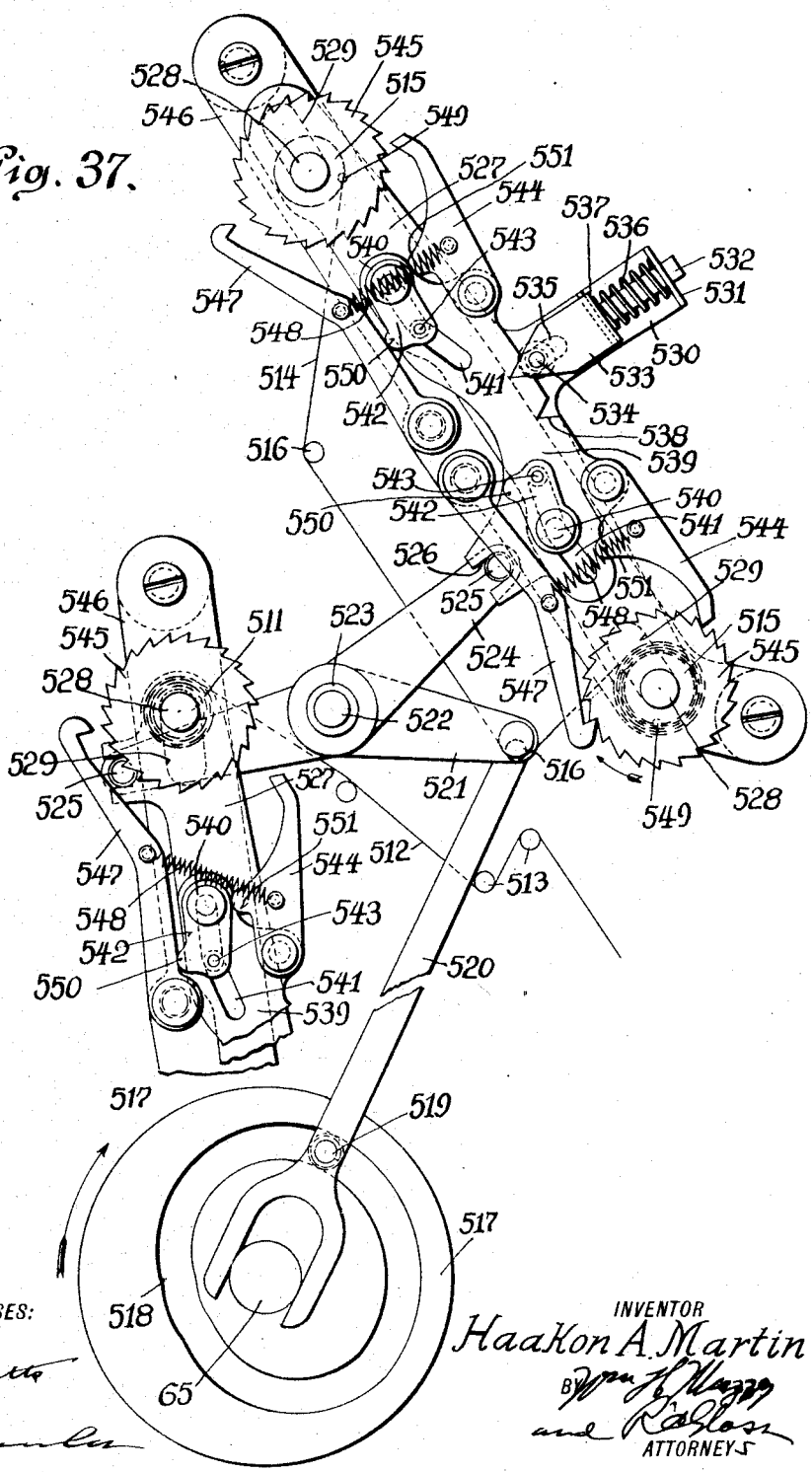

H. A. MARTIN.
MULTIPLE CASH REGISTER.
APPLICATION FILED SEPT. 26, 1910.

1,185,696.

Patented June 6, 1916.
20 SHEETS—SHEET 18.

WITNESSES:

INVENTOR
Haakon A. Martin
ATTORNEYS

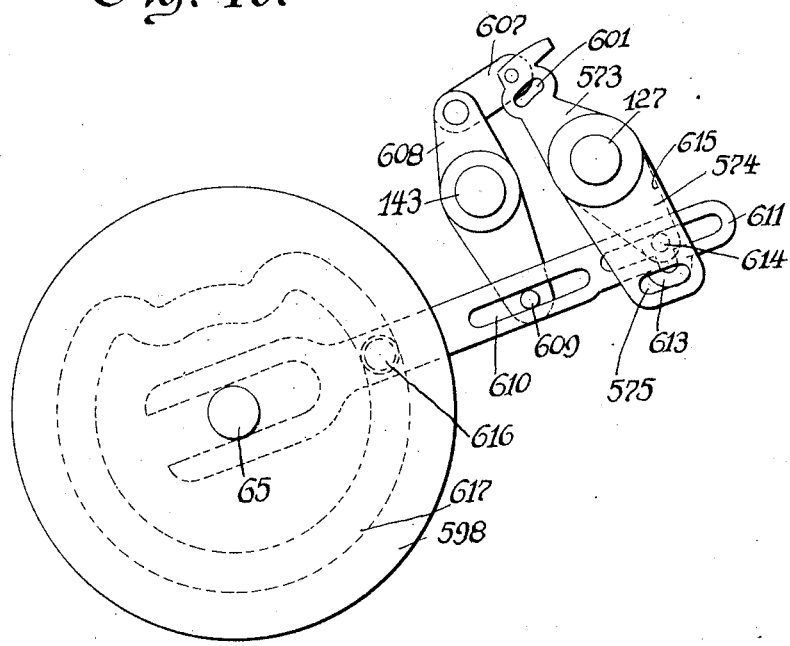

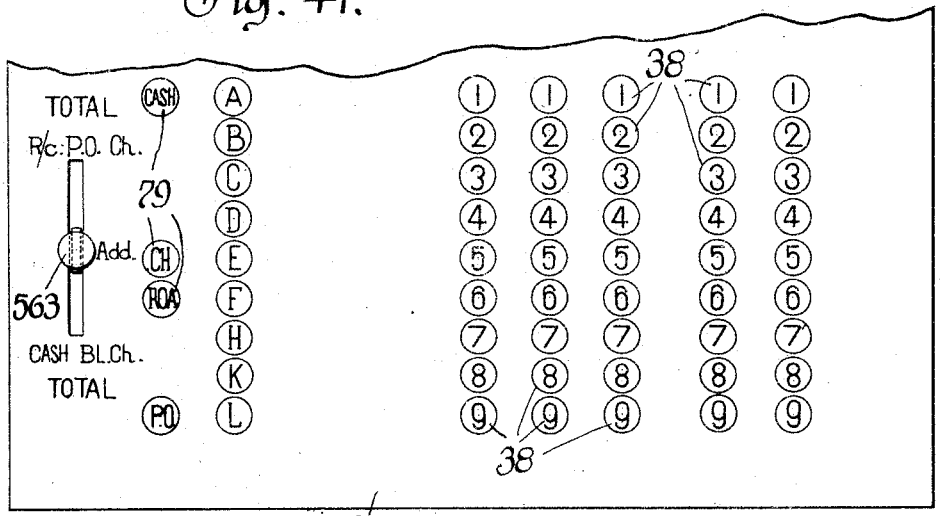

UNITED STATES PATENT OFFICE.

HAAKON A. MARTIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

MULTIPLE CASH-REGISTER.

1,185,696. Specification of Letters Patent. Patented June 6, 1916.

Application filed September 26, 1910. Serial No. 583,883.

*To all whom it may concern:*

Be it known that I, HAAKON A. MARTIN, a subject of the King of Norway, residing at Dayton, in the county of Montgomery and State of Ohio, have invented certain new and useful Improvements in Multiple Cash-Registers, of which I declare the following to be a full, clear, and exact description.

This invention relates to accounting machines and more particularly to that class employing a plurality of totalizers for retaining separately transactions of different classes entered in the machine.

The usual transactions that occur in mercantile establishments in which money is exchanged or a record made of the transaction may be divided into four classes, namely, cash sales, credit sales, cash received on account, and cash paid out. There are on the market at the present time machines in which entries of the above enumerated transactions are separately retained, but in order to find out the amount of outstanding credit business it is necessary mentally to subtract the amount shown on the received on account totalizer from the amount on the charge totalizer, and to find out the amount of cash on hand it is necessary to add to the amount shown on the cash sales totalizer the amount of the received on account totalizer, and then subtract therefrom the amount shown on the cash paid out totalizer. To avoid these mental calculations and to provide a machine which, during an operation thereof automatically adds and subtracts from a plurality of totalizers is the principal object of this invention.

Another object of this invention is to provide a set of reciprocatory actuators for a totalizer with which an operative relation may be established as the actuators are moved in different directions so as to add to or subtract from the totalizer, with provisions for imparting to the actuators an additional degree of movement to effect a transfer as said actuators move in either direction.

Another object of this invention is to provide an improved actuating mechanism for moving a set of indicators directly from one position to another to exhibit different characters thereon.

Another object of this invention is to provide an improved keyboard construction whereby a determining member is differentially adjusted by a series of manipulative devices so as to deflect the course of a device given invariable extents of movement, at different times during the movement of the latter, and by this deflection cause the invariably movable device to impart a differential movement to the element carrying the totalizer actuator.

A further object of the invention is to provide an improved form of printing mechanism which is equipped with a novel form of impression platens and feed devices for the check strip and inking ribbon.

Another object of the invention is to provide an improved mechanism for resetting the totalizers and recording the total of each one upon the record strip.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 29:
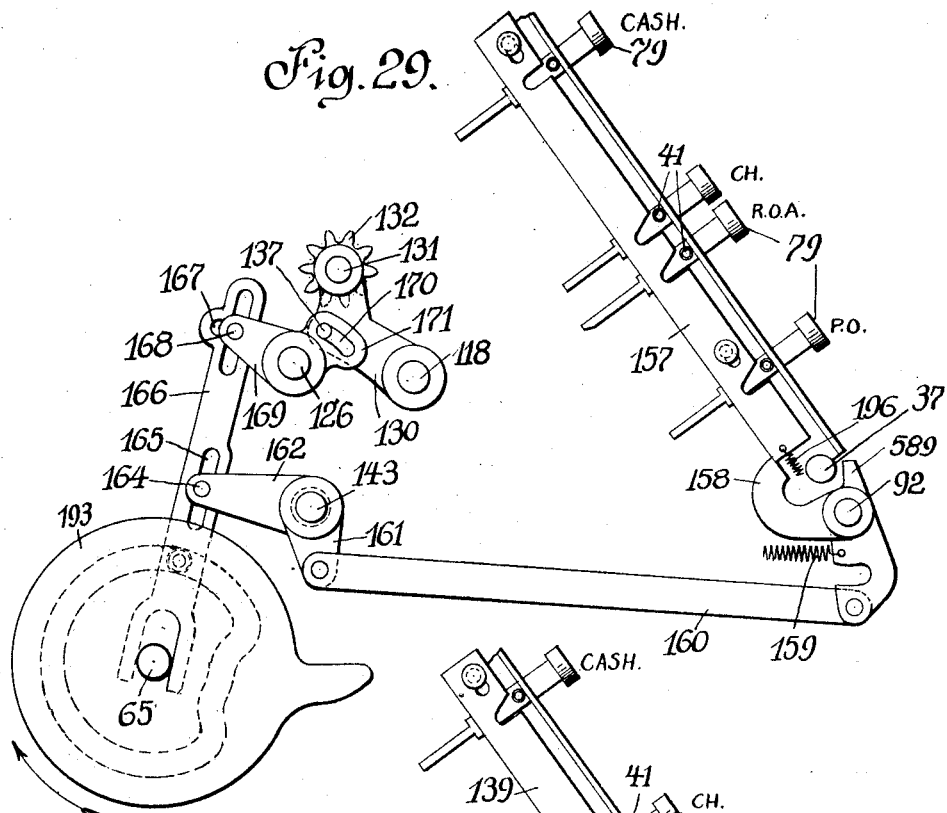
Figure 30:
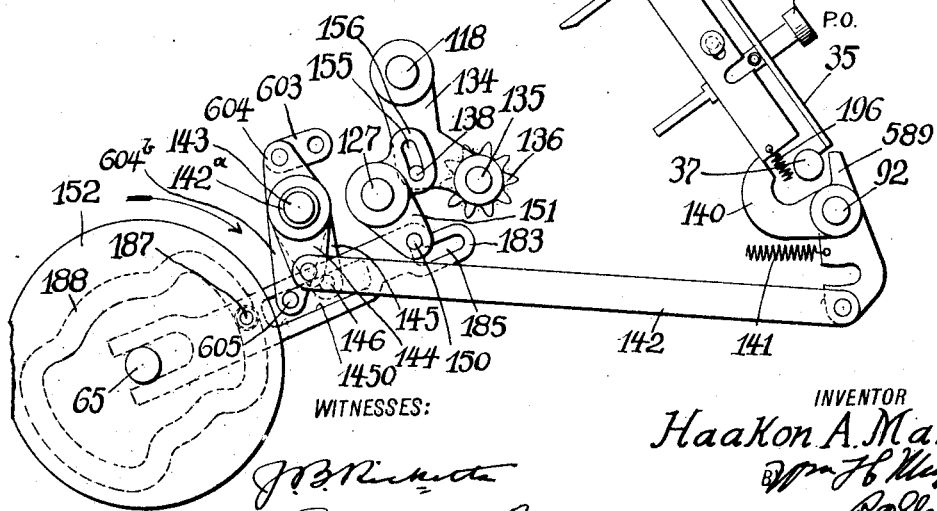
Figure 38:
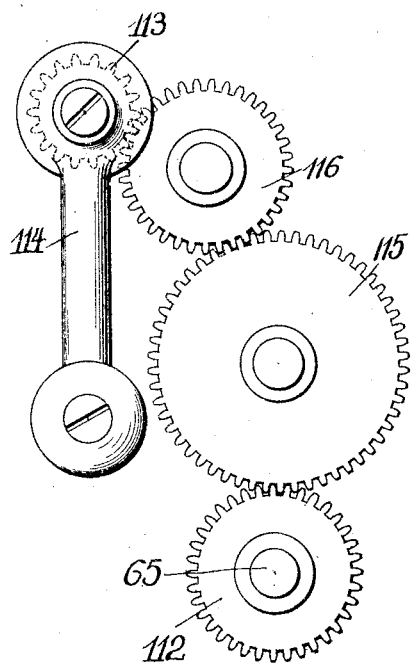
Figure 39:
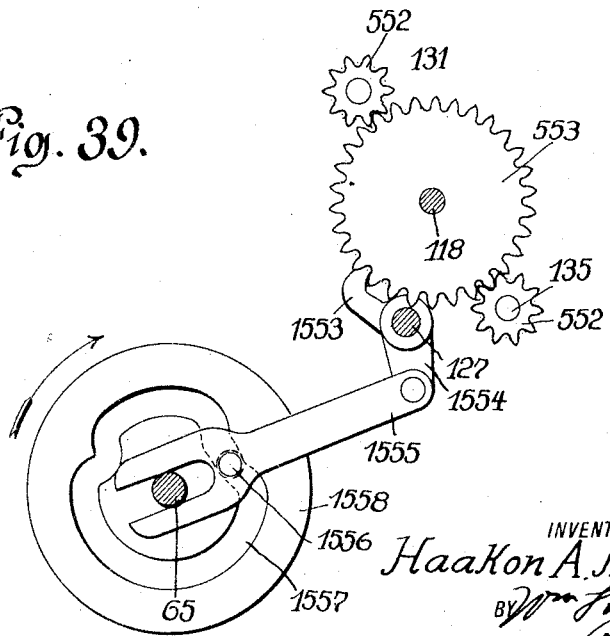

Figure 1 is a central transverse sectional view taken alongside one of the amount banks of keys. Fig. 2 is a detail elevation of a cam disk for operating the locking pawls for the determining members and the bell cranks controlling the amount and clerks' indicators. Fig. 3 is a view similar to Fig. 1 and taken alongside of the special transaction keys. Fig. 4 is a detail elevation of a cam disk for actuating the special or transaction counters and alining the mechanism controlling the special indicator. Fig. 5 is a transverse sectional view taken alongside the manipulative device controlling the resetting of the totalizers. Fig. 6 is a detail side elevation of the special indicator and the flashes coöperating therewith. Fig. 7 is an enlarged detail view of a bank of manipulative devices and a differentially movable element controlled thereby. Fig. 8 is a detail view of a bank of manipulative devices and a determining member which is differentially adjusted thereby. Fig. 9 is a detail view of the slide controlling the two way movement of the totalizer actuators in effecting the transfer for adding or subtracting. Fig. 10 is an enlarged sectional view of one of the differentially movable elements and the actuators carried thereby and the totalizers which are operated by said actuators. Fig. 10ᵃ is a detail perspective of a pair of trip pawls which are controlled by the totalizer elements. Fig. 11 is a detail view of a cam disk for alining the frame carrying the totalizers. Fig. 12 is an enlarged view of the special manipulative device controlling the resetting of the totalizers and parts coöperating therewith. Fig. 13 is a detail view of one of the levers for shifting the totalizer shaft in preparation for resetting the totalizers thereon. Fig. 14 is a top plan view of the snap pawls and coöperating mechanism controlled by the special bank of keys. Figs. 15 and 16 are enlarged perspective views of the mechanism controlling the pitmen used for totalizing. Fig. 17 is an enlarged front elevation of the frames carrying the different totalizers. Fig. 18 is a detail view of one of the shafts upon which the totalizer elements are mounted showing the resetting notches cut therein. Fig. 19 is a view similar to Fig. 17 with a few of the parts left off. Fig. 20 is a top plan view of the special counters and the mechanism for operating the same. Figs. 21 to 24 are detail views of different devices forming a part of the operating mechanism for the special counters. Fig. 25 is a detail view of the special transaction keys and the cam disk for actuating the invariably movable device coöperating with the said transaction keys. Fig. 26 is a detail view of a cam disk for rocking the lower group of totalizers into engagement with the actuators when an addition only is to take place. Fig. 27 is a detail view of a cam and coöperating parts for returning the different snap pawls to their normal positions which pawls are used in determining the totalizer that is to be connected with the actuators. Fig. 28 is a cross section of a special bank of keys taken alongside of the cash keys and showing the various slides coöperating with one of said keys. Fig. 29 is a detail view of the special bank of keys and the cam disk for rocking the upper group of totalizers into engagement with the actuators. Fig. 30 is a detail view of the special bank of keys and the cam for rocking the lower group of totalizers into and out of engagement with the actuators when addition and subtraction are to be accomplished during an operation of the machine. Fig. 31 is a transverse sectional view through the printing mechanism. Fig. 32 is a detail view of the actuating device for the units wheel of the consecutive numbering devices. Fig. 33 is an enlarged elevation of the check strip feeding mechanism. Fig. 34 is an enlarged view of the feed devices for the record strip. Fig. 35 is an enlarged elevation of the improved mechanism for the check and detail record strip and also the operating device for the check severing mechanism. Fig. 36 is an enlarged perspective view of the check severing mechanism. Fig. 37 is an enlarged view of the automatic feeding mechanism for the ink ribbon. Fig. 38 is a detail view of the operating gearing. Fig. 39 is a detail view of the alining pawl for the totalizer shafts and the cam for operating the same. Fig. 40 is a detail view of the cam and coöperating parts for rocking the upper group of totalizers into engagement with the actuators during the resetting operation. Fig. 41 is a plan view of the keyboard arrangement. Fig. 42 is a plan view of a portion of the record strip.

Described in general terms the machine comprises a plurality of banks of amount manipulative devices such as keys, a bank of clerks' initial keys and a bank of keys representing transactions, such as "cash", "charge", "received on account", and "paid out". These banks of keys control the movement of differentially movable elements which in turn control the movement of mechanism for indicating the kind of transaction, the amount of same, and the initial of the clerk who made it. The differential elements which are controlled by the amount keys carry actuators with which totalizers are arranged to be brought into engagement, so that the elements of said totalizers will have the movement of the differential elements controlled by the amount keys imparted thereto. There are a plurality of totalizers, and the ones that are to engaged by the actuators are determined by the movement of the differentially movable element controlled by the bank of special keys. The differential elements and actuators carried thereby have a reciprocatory movement, and if any of the totalizers are brought into engagement with the actuators as the actuators move in one direction addition will take place, while if the totalizers are moved into engagement with the actuators while they are moving in the opposite direction, subtraction will take place.

In the machine there are shown five totalizers arranged in two groups. The upper group of totalizers may be assigned to "cash received on account", "cash paid out", and "charged"; while the totalizers in the lower group totalize "balance charged" and "cash on hand". When a cash transaction takes place the "cash on hand" totalizer only will be moved into engagement with the actuators controlled by the amount manipulative devices, so as to add the amount of the transaction upon said totalizer. When a credit transaction takes place the totalizers assigned to "charge" and "balance charged" are drawn into engagement with the actuators so as to have added on each thereof the amount of the transaction. When a transaction involving "cash received on account" occurs, the "balance charged" totalizer will first be brought into engagement with the actuators as they are moved from normal position, which movement of the actuators will subtract the amount of the transaction from said totalizer, and then this totalizer is disengaged and the "received on account" and the "cash on hand" totalizers are engaged with the actuators so as to have added to each thereof the amount of the transaction by the return movement of the actuators. When a "paid out" transaction occurs the same mode of operation is carried out as when a "received on account" transaction occurs, except that instead of having the totalizers previously mentioned moved into engagement with the actuators, the "cash on hand" totalizer will be moved into engagement therewith to have subtracted therefrom the amount of the transaction, and then the "paid out" totalizer will be engaged with the actuators to have added thereon the amount subtracted from the "cash on hand" totalizer.

Connected with the indicating mechanism is a series of type wheels from which impressions are arranged to be made upon a record strip and a check strip, the former being suitably stored in the machine while the latter, after being printed, is severed and ejected.

The various totalizers are constructed to be reset to zero by an operation of the machine, and when so reset the amount previously shown on the said totalizers will be recorded upon the record strip.

With this general description of the invention it is thought that the succeeding detailed description will be easier to follow.

*Keyboard construction.*—For convenience in assembling, the various banks of keys are built as units, and each unit consists of side plates 35 which are supported upon transverse shafts 36 and 37. These side plates are of sheet metal and at their outer edge are bent at right angles to form a face plate by which the outer ends of the keys 38 are guided (see Fig. 7). The inner ends of the keys are reduced in size and are arranged to pass through flanges 39 struck from one of the side plates 35 and surrounding the reduced portions of the keys 38 are springs 40, the ends of which abut against the flanges 39 and the shoulders of the enlarged portions of the stems of the keys 38 and thereby hold said keys in their outermost positions. The keys 38 have projecting therefrom pins 41 which contact with the under side of the face plate formed by the right angle portion of the side plates 35 so as to limit the outward movement of said keys. When depressed each pin contacts with an inclined portion 42 of a detent 43 which is mounted between the side plates 35 upon pins 44 supported by said side plates, and raises said detent until said key is fully depressed, when a hook portion 45 of the detent will pass over the pin 41 of the depressed key and hold said key in its depressed position. These key pins are arranged to engage with the forward edge of a determining member 45ª (see Figs. 7 and 8) and differentially adjust said member about its pivotal point. This member is pivoted as at 46 to one of the side plates 35 and is normally held in the position shown in Figs. 7 and 8 by a coiled spring 47, the ends of which are fastened to pins 48 and 49 which project respectively from said member 45ª and one of the side plates 35 of the key bank.

Mounted between the plates 35 of each key bank is a differentially movable element 50 provided with elongated slots 51 through which project pins 52 mounted in the side plates 35 (see Figs. 7 and 10). Each of these differentially movable elements 50 is also equipped with a vertical slot 53 through which a roller 54 mounted in the upper end of a link 55 travels. The lower end of this link 55 is provided with a stud 56 which extends through a circular slot 57 formed in the left hand plate 35 of the particular key bank. The arc of the circular slot 57 is struck from the center of a shaft 58 which is suitably supported in the side frames 59 of the machine. Fast to this shaft 58 are a series of forwardly extending arms 60, one for each of the amount banks and the clerks' bank of keys or manipulative devices. The forward end of each of these arms 60 is provided with a recess 61 into which enters the pin 56 of the corresponding link 55. Extending upwardly from the shaft 58 is an arm 62 to which, at its upper end, is fastened the forward end of a pitman 63, the rearward end of the latter being forked and straddling a collar 64 (see Fig. 1) mounted upon a main operating shaft 65. The lower member of the forked portion of the pitman 63 carries an anti-friction roller 66 which projects in a cam groove 67 in a disk 68 which is secured to the shaft 65 and when no key is depressed, and the machine operated, the arms 60 will be rocked upwardly and then downwardly carrying therewith the links 55, the rollers 54 of which play idly in the vertical slots 53 of the differentially movable elements 50. When a key is depressed the rear edge of a determining member 45ª, which is adjacent to the differentially movable element 50, will pass more or less across the slot 53 of said element so that when the roller 54 of the link 55, coöperating with the differential element 50, moves up the slot 53, by an operation of the machine, it will contact with the rear edge of the determining member and for the rest of its movement pass up alongside of the rear edge of the determining member. By thus deflecting the course of the movement of said roller 54 it will carry the differential element 50 from the time the roller contacts with the rear edge of the determining member until the end of the movement of said roller. As the determining member, as previously described, is differentially positioned by the keys 38 it will be seen that the roller 54 may contact with the rear edge of said member at different points in the course of travel, thereby differentially adjusting the element 50. Upon the return movement of the links 55 the rollers 54 will engage with the lower ends of the slots 53 of any of the displaced elements 50 and return said elements to their normal positions.

In order to prevent any undue strain on determining elements 45ª, by the rollers 54 contacting with the rear edges thereof, these elements are provided at their upper ends with V shaped notches 69, with which the alining pawls 70 engage at the beginning of the operation of the machine, and are withdrawn therefrom at the end of the operation of the machine. These pawls 70 are fast to the shaft 36, which also has fast thereto an arm 71, the rear end of which is pivoted to the upper end of a bar 72 (see Figs. 1 and 2), the lower end of which is forked and straddles a collar mounted upon the main shaft 65. This bar, near its lower end, is provided with a roller 73 which plays in the cam groove 74 of a disk 75 secured to the shaft 65. It may be mentioned here that there are a number of the cam disks similar to the disks 68 and 75 and in nearly all instances these disks are provided with cam grooves upon opposite faces thereof, instead of employing single cams for performing the various functions required in the operation of the machine. From Fig. 2 it will be seen that the shape of the groove 74 formed in the disk 75 is such as to lower the arm 72 at the beginning of the operation of the machine, thereby rocking the pawls 70 into engagement with the notches 69 of the adjusted members 45, and thus holding said members in their adjusted positions until near the end of the operation of the machine, when the arm 72 will be raised to withdraw the pawls 70 out of the notches 69.

By reference to Figs. 1 and 3 it will be seen that each of the detents 43 has projecting rearwardly therefrom an arm 76, the lower edge of which is slightly below the upper edge of the vertical slots 53 of the differentially movable elements 50 and as the rollers 54 carried by the links 55 pass to the extreme upper end of the slot 53, these rollers will contact with the under side of the arm 76 of the detents 43, thereby elevating the detents to release the depressed keys, which will then be restored to their normal outer position by the springs 40.

If some means were not provided for preventing overthrow of the differentially movable elements 50, it will be seen that by a rapid operation of the machine the rollers 54 will sharply strike the upper ends of the slots 53 of the elements 50 and might carry said elements beyond their intended positions. In order to prevent this the following mechanism has been designed: Pivoted to each one of the determining members (see Figs. 7 and 8), is a hook pawl 77 which surrounds the upper end of the slot 53 of the companion element 50. This pawl is held in the position shown in said figures by a coiled spring 78. When the roller 54 reaches the upper end of the slot 53 it will be partially surrounded by the hook portion of the pawl 77. From this it will be seen that in order to move the element 50 upwardly, independent of the roller 54, the said roller will have to be cammed rearwardly by one of the side walls of the slot 53, but that this rearward movement of the roller 54 is prevented by the hook portion of the pawl 77, thereby preventing any upward movement of the element 50 independently of the roller 54. In ordinary operations of the machine it would be possible to prevent this overthrow of the differentially movable elements by providing the lower edges of the upper ends of the determining members 45 with notches of the shape of the upper ends of the slots 53 thereby doing away with the pawls 77, but as these determining members 45 are not moved during resetting operations, as hereafter described, the rollers 54 would jam against the under edges of the determining members 45 before the end of their upward movements, and in order to obviate this defect the spring pawls 77 are provided.

The differential element 50 controlled by the special keys 79 (see Fig. 3), is used to bring the proper totalizers into coöperation with the actuators hereafter described, and as several of these totalizers may be brought into coöperative relation with the actuators at different times during an operation of the machine, it is necessary to provide devices for actuating the differential element independently of the devices for actuating the element controlled by the amount and clerks' banks of keys. An arm 80, similar to the arms 60 which coöperate with the links 55 which actuate the differential elements 50 of the amount and clerks' banks of keys, is loosely mounted upon the shaft 58 and has connected thereto, by a sleeve 80ª, (see Figs. 3, 5, 14 and 25) an upwardly extending arm 81 which is provided with a lateral pin 82 that normally extends into a recess 83 in a pitman 84, which extends rearwardly and straddles the shaft 65. This pitman, at its forward end, is provided with an elongated slot 85 through which extends a pin 86 projecting from an arm 87 which is loosely mounted upon the sleeve 80ª. This arm 87 is attached to one end of a sleeve 87ª surrounding the sleeve 80ª to the other end of which is secured a downwardly extending arm 88 (Fig. 12) to which is connected the rearward end of a link 89. The forward end of the link 89 is connected to a downwardly extending portion 90 of a snap pawl 91, which is loosely mounted upon a transverse rod 92 supported by the side frames 59 of the machine. A pitman 93 is provided with a pin 94 which enters into the slot 85 of the pitman 84 and at its rearward end the said pitman straddles the shaft 65 similarly to the pitman 84. At its forward end the pitman 93 is provided with a recess 95 which is arranged to engage the pin 82 of the arm 81 at certain operations of the machine. The pitman 84 is provided with a pin 96 (Fig. 25) which plays in a cam groove 97 formed upon a disk 98 secured to the shaft 65. On the side of the disk 98 opposite from the groove 97 is another groove 99 of the same configuration but which is timed differently. In this groove 99 plays a pin 100 projecting from the pitman 93. When the arm 81 is connected to the pitman 84 the said arm will be rocked counter clockwise at the very beginning of the operation of the machine thereby carrying arm 80 therewith, which will elevate the differential element 50 according to the key depressed in a manner similar to the method of elevating the elements 50 corresponding to the amount and clerks' banks of keys. The pitman 84 may be withdrawn from pin 82, when the pitman 93 will follow, through the action of connecting pin 94 thus connecting the pitman 93 to arm 81 by causing notch 95 in pitman 93 to surround pin 82 on arm 81. Under this condition the arms 80 and 81 will be rocked in the same direction as when operated by the pitman 84 but at period later in the operation of the machine.

By referring to Fig. 25 it will be seen that the snap pawl 91 is controlled by a slide 101 which is secured to one of the side plates 35 of the special or transaction key bank by suitable pins 102 which pass through slots 103 formed in said slide. This slide is provided with three inclined slots 104 and one slot 105 having sides parallel to the movement of the key pin 41 coöperating therewith.

If it were not for the fact that during certain operations of the machine the frame carrying totalizers has to be first shifted to bring the proper totalizer into coöperative relation with the actuators, and then rocked to move said totalizer into engagement with the actuators previous to the upward movement of the differently movable elements carrying the actuators, it would not be necessary to provide the differentially timed pitmen for operating the arms 80 and 81, which form the device movable invariable extents for actuating the differentially movable element 50 controlled by the special or transaction bank of keys or manipulative devices, but the invariably movable device might be fastened to the shaft 58 and moved by the cam 68 which rocks the said shaft carrying the arms 60 that form the operating devices for actuating the differential elements controlled by the amount and clerks' banks of keys.

Upon the depressing of either the "cash", "charge" or "paid out" key the slide 101 will be elevated against the tension of its spring 196 and permit the upper end of the snap pawl 91 to be drawn under said slide by a spring 107 which is connected to the downwardly extending portion 90 and to a pin 108 projecting from one of the side frames of the machine. This forward movement of the upper end of the snap pawl 91 will move the portion 90 thereof rearwardly thereby carrying the link 89 also rearwardly and rock the arm 87 clockwise about the shaft 58 so as to withdraw the pitman 84 from engagement with the pin 82 of the arm 81 and by this movement bring the pitman 93 into engagement with said pin. When the "received on account" key is depressed, which is the second key from the bottom, the slide 101 will not be elevated and consequently the earlier acting pitman 84 will be left in engagement with the pin 82 of the arm 81.

The differentially movable element 50, coöperating with the special keys, carries a rack 109, (see Fig. 3) which has a slight movement independent thereof for a purpose hereafter described. This rack shifts the totalizer frame to bring the proper totalizer into coöperative relation with the actuators controlled by the amount keys.

The differential elements 50, controlled by the amount keys, carry two sets of actuators, 110 and 111, (see Figs. 1, 7, and 10). The upper set of actuators 110 may have a movement independent of the differential elements in one direction, while the lower set 111 may have movement in both directions independent of the differential elements. These independent movements of the actuators 110 and 111 are for the purpose of transferring in the operation of the machine in both addition and subtraction.

*Operating gearing.*—The main shaft 65 is rotated once at each operation of the machine and this shaft is provided with a gear 112, (see Fig. 38) which meshes with a gear 113 secured to the operating handle 114 through intermediate gears 115 and 116, which are suitably supported upon the right hand side frame 59 of the machine. The gear 113 is half the diameter of the gear 112, so that it requires two rotations of the crank handle for a complete rotation of the main shaft 65.

*Multiple totalizers.*—In the drawings there are shown five totalizers arranged in two groups, the upper group representing "received on account", "charge", and "paid out", and the lower group "cash on hand" and "balance charged". The denominational elements of the various totalizers are arranged in sets, that is, all of the units elements of the various totalizers of each group are arranged together and all the tens, hundreds, and so on are also arranged in sets. By reference to Figs. 17 and 19 it will be seen that the elements of the lower two totalizers are in the same planes as elements of two of the totalizers in the upper group, so that the actuators 110 and 111 may actuate the elements of a totalizer of the upper group and the elements of a totalizer of the lower group simultaneously during the movement of the differentially movable elements 50 in either direction. Normally the right hand elements of each set of denominational elements, as viewed in Fig. 17, are in position to be rocked into engagement with the actuators carried by the differentially movable elements.

When a cash transaction is entered in the machine the right hand elements of the lower group of totalizers are engaged by the actuators and the amount of the transaction entered thereon. When a charge transaction is entered in the machine, the frame is shifted so as to bring the second elements of each group of denominational elements into position and after the differential elements 50 and actuators 110 and 111, carried thereby, have been adjusted, the totalizer elements previously positioned will be rocked into engagement with the actuators 110 and 111, so that upon the return of the differentially movable elements to normal position the actuators 110 and 111 carried thereby will actuate the elements of the "charge" and "balance charged" totalizers, and after the operation of these totalizers by the return of the differentially movable elements the frame carrying the totalizers will be returned to normal position, that is, with the right hand elements of each set of denominational elements, as viewed in Fig. 17, in position to be engaged by their respective actuators.

Upon an operation of the machine to have entered therein a "received on account" transaction, both groups of totalizers are shifted so as to bring the elements of the "balance charged" totalizer into position to be rocked into engagement with the actuators, before the same are moved from normal position, so that when the latter are moved from normal position they will rotate the elements of the "balance charged" totalizer in a direction to subtract from said totalizer. After the elements 50 have been differentially adjusted the totalizers will be shifted back to normal position and then the elements of the "received on account" totalizer rocked into engagement with the actuators 110 of the differentially movable elements 50, so that as the latter are returned the amount of the transaction will be added to the "received on account" totalizer.

When a "paid out" transaction is entered in the machine, the "balance cash" totalizer will be rocked into engagement with the actuators 111 previous to the upward movement of the differential elements 50 so that as the latter elements move upwardly the actuators 111 carried thereby will rotate the elements of the "balance cash" totalizer in a rearward direction and thereby subtract from said totalizer, after which the totalizers will be shifted as a unit to bring the elements of the "paid out" totalizer into position to be engaged by the actuators 110 of the differential elements 50, so that upon the return of the latter the amount of the transaction will be registered upon the "paid out" totalizer.

With this general description of the movement of the totalizers and actuators it is thought that the detailed description about to be given will be easier to follow.

As previously described the differentially movable element 50 controlled by the special keys 79 carries therewith a rack 109 which meshes with a gear 117, (see Figs. 3 and 17) secured to a shaft 118, one end of the latter being supported in a boss 119 on a plate 120 which is secured to the side frame 59 of the register. The other end of the shaft 118 is supported by a set screw 121 which is suitably mounted in a boss similar to the boss 119 and which projects from a plate similar to the plate 120 which in turn is fastened to the left hand side frame 59 of the machine. The purpose of the set screw adjustment just described is to permit the free rotation of the shaft 118 and to take up lost motion caused by the wearing of the parts. The left hand side frame 59 and the plate 120 are provided with suitable recesses through which an instrument may be inserted to rotate the set screw 121. This shaft 118 (see Fig. 17) has secured thereto a worm gear 122 which engages with teeth formed within the interior of a hub 123 of a side arm 124 of a transversely movable frame 125 which is provided with an arm similar to the arm 124 at the opposite end of said frame. This frame 125 is supported by the shaft 118 and shafts 126 and 127 which in turn are supported at their left hand ends by bosses 128 projecting from a plate 120 and at their right hand ends in a corresponding plate 120. The plates 120 are secured to the side frames 59 of the machine. From this it will be seen that as the element 50 of the transaction bank is differentially adjusted it will, through the gear 117 and the worm gear 122, transversely shift the frame 125 and as said element is returned to normal position the frame will be returned therewith.

Pivotally mounted upon the shaft 118 (see Figs. 1, 10, 17 and 19) are arms 129 of a frame 130, which at their upper free ends support a shaft 131 upon which are mounted the elements 132 of the upper group of totalizers. Pivotally mounted upon the shaft 118 and extending downwardly therefrom are arms 133 of a frame 134 which at their extreme downward ends support a shaft 135 similar to the shaft 131, and which in turn support the totalizer elements 136 of the lower group of totalizers. A rod 137 and a cross bar 137ª connect the arms 129 of the frame 130 while a similar rod 138 and cross bar 138ª connect the side arms 133 of the frame 134 carrying the lower group of totalizers. These rods extend through cam slots formed in a pair of arms one for each frame, which are mounted to be actuated at different times to rock the various totalizers, after the same have been positioned properly by the differential element controlled by the special keys, into engagement with the actuators 110 and 111 previously described. Slots are so formed in the right hand side frame 59 and plate 120 that the rods 137 and 138 project into the same when the totalizers are shifted to the right, the slots being provided to permit the shifting of the totalizers and the rocking of the totalizer frames.

*Cash transaction.*—When a cash transaction is entered in the machine the differential element 50 controlled by the special keys does not move as the operation of the cash key 79, which is the upper key in the special bank, does not move the determining member 45 and consequently the roller 54 of the link 55, which forms a part of the device having an invariable movement at each operation of the machine, plays idly in the slot 53 of the differential element 50 corresponding to the bank of special or transaction keys. The actuation of the cash key 79 will elevate a slide 139 (see Figs. 26 and 30), which is adjacent to the previously described slide 101, so that a snap pawl 140 will be moved clockwise by a spring 141 and by this movement carry a link 142 rearwardly so as to rock an arm 144 which is rigidly mounted on the sleeve 142ª loosely mounted upon a shaft 143. This movement of the arm 144 will rock an arm 145 secured thereto by a hub and by a pin 146 projecting from arm 145 into a slot 147 (Fig. 26) of a pitman 148, raise said pitman so that a notch 149 formed in the forward end thereof will engage with a pin 150 projecting from an arm 151 which is fast on and extends downwardly from the shaft 127. This rocking of the arms 144 and 145 by the snap pawl 140, controlled by the slide which is actuated when the cash key is depressed, will render operative mechanism for rocking the lower group of totalizers into coöperative relation with the actuators at different times during an operation of the machine, so as to add to and subtract from said totalizers, which will hereafter be described. As previously described, when a cash transaction is to be entered in the machine the frames are not shifted, so that all that is required is the rocking of the elements 136 of the "cash on hand" totalizer into engagement with the actuators 111, which is accomplished near the end of the operation of the machine and previous to the return movement of the differential elements controlled by the amount keys to normal position. This is accomplished by a disk 152 which is provided with a cam groove 153 into which projects a roller 154 extending from the pitman 148, the said pitman 148 being previously connected to the arm 151. From the shape of the groove 153 it will be seen that the said pitman will be drawn rearwardly so as to rock the arm 151 clockwise, and by cam slots 155, formed in arms 156 secured to the shaft 127, engaging with the rod 138 rock the totalizer frame 134 so as to carry the elements of the "cash on hand" totalizer into engagement with the actuators 111, so that as the differential elements 50 carrying the actuators are returned to normal position they will rotate the elements 136 clockwise to add thereon the amount represented by the depressed keys.

*Charge transaction.*—As it is desirable when a charge transaction takes place to add the amount on the "charge" totalizer which is carried by the frame 130 supporting the upper group of totalizers as well as upon the "balance charged" totalizer which is carried by the lower frame 134, it is necessary to couple the frame 130 with suitable mechanism to rock it so as to carry the "charge" totalizer into engagement with the actuators 110. This is accomplished in the following manner: Referring to Fig. 29 it will be seen that when the "charge" key, which is the second key from the top of the special bank, is depressed it will elevate a slide 157 and thereby permit a snap pawl 158 to be rocked clockwise by a spring 159. This rocking of the snap pawl will move a link 160 rearwardly which in turn rocks arms 161 and 162 clockwise, the said arms forming a bell crank which is loosely mounted upon the shaft 143. The rocking of the arm 162 clockwise will, through a pin 164 projecting from the free end of said arm into a slot 165 formed in a pitman 166, rock this pitman so as to bring a recess 167 formed in the upper end thereof, into engagement with a pin 168 projecting from an arm 169 secured to the shaft 126. This pitman, after being connected to the arm 169, will be drawn downwardly and rock said arm anticlockwise and through one of the walls of cam slots 170 formed in arms 171, which are rigidly secured to the shaft 126, and engage the rod 137 rocks the upper totalizer frame 130 so as to bring the elements 132 of the "charge" totalizer into engagement with the actuators 110 previous to their return movement. This actuation of the "charge" key will also elevate the slide 139, as described in connection with the "cash" key, and by the previously described connections, as shown in Fig. 26 rock the pitman 148 so as to connect it with the arm 151, which rocks the lower totalizer frame, at the same time that the upper totalizer frame is rocked. From this it will be seen that as the differential elements 50, controlled by the amount keys, are returned to their normal position, actuators 110 will rotate the elements of the "charge" totalizer while the actuators 111 will rotate the elements 136 of the "balance charged" totalizer. It is to be understood that in the operation of the machine during the entering of a "charge" transaction, the totalizer frames are first shifted by the differential element 50 controlled by the special keys and after the amount has been entered on the "charge" and "balance charged" totalizers the said totalizers will be returned to their normal position upon the return of the differential element carrying the rack 109.

It is to be understood that when a charge transaction is entered in the machine the amount of said transaction will be accumulated upon both the "charge" and "balance charged" totalizers and, therefore, it is necessary to render the pitman 183 (Fig. 30), which is normally operative, inoperative, and this is accomplished by the pin 146 of the arm 145 which rides in an elongated slot 145a formed in the pitman 183. This arm 145 is secured to the sleeve 142a, and which as previously described, is rocked whenever the "cash" key or the "charge" key is depressed. The rocking of this sleeve 142a will connect the pitman 148 (Fig. 26) to the pin 150 projecting from the arm 151, which is secured to the shaft 127, and disconnect the pitman 183 from said arm, by which means the frame 134 carrying the lower group of totalizers will be rocked into engagement with the actuators 111 after the same have been adjusted and before the return movement of said actuators.

*Received on account transaction.*—When an amount is received on account it is necessary that the amount received be subtracted from the "balance charged" totalizer as well as added upon the "received on account" and "cash on hand" totalizers, so that the proprietor may know at any time the amount of his outstanding credit business and the amount that has been paid on account.

As the differential element 50 controlled by the special keys receives different degrees of movement, depending upon the key depressed, it is necessary to provide some mechanism, which when the "received on account" key is depressed, will shift the frame carrying the totalizers only far enough so as to bring the "balance charged" totalizer into coöperative relation with the actuators 111 while operating the differential element an additional movement to control the positioning of the special indicator to display the wording "Received on account," and to accomplish this the following mechanism has been designed: The inner end of the "received on account" key, which is the third key from the top of the special key bank, extends slightly beyond the rest of the keys so that as the differential element 50 (see Fig. 3) is moved upwardly by the roller 54, in the manner previously described, the inner end of the "received on account" key will contact with the lower end of an arm 172 which is pivoted as at 173 to said element 50 and rock said arm about its pivotal point. Attached to this arm is another downwardly extending arm 174 which is provided at its lower end with a recess 175 into which projects a pin 176 formed in the lower end of a bell crank lever 177 which is also carried by the differentially movable element 50. The upper arm of the bell crank 177 is provided with a shoulder which normally engages with a lug 178 projecting from the rack 109, which, as previously described, meshes with the gear 117 fast to the shaft 118. The above described parts are normally held in the position shown in Fig. 3 by a light coiled spring 179 the ends of which are connected to the arm 174 and the differential element 50. Just as the rack 109, in the upper movement of the differential element 50 carrying said rack, shifts the totalizer frame carrying the "balance charged" totalizer into position to be rocked into engagement with the actuators 111, the inner end of the "received on account" key will contact with the arm 172 and rock said arm, and also the arm 174 connected therewith, about the pivot 173. The rocking of these arms will result in the rocking of the bell crank lever 177 and the withdrawal of the shoulder upon the upper end of the bell crank from engagement with the lug 178 of the rack 109 so as to permit a movement of the special differential element 50 independently of the rack 109 carried thereby. This independent movement is permitted by the slot and pin connection 180 and 181 respectively, as shown in Fig. 3. Upon the return of the special differential element 50 the rack 109, owing to the resistance offered by the totalizer frame, will be held in the adjusted position until the pins 181 of the special differential element 50 contact with the bottom of the slots 180 formed in said rack, and the continued downward movement of the element 50 will then return the rack and the totalizer frame connected thereto to normal position.

To avoid the possibility of the shoulder of the upper arm of the bell crank 177 not snapping under the pin 178, due to lost motion between the rack and the gear 117, a spring 182 holds the bottom of the slots 180 in contact with the pins 181 and thereby insures the proper positioning of the rack to permit the return of the bell crank to the position shown in Fig. 3.

The slide 139, which, as previously described, is elevated by the "cash" and "charge" keys is not affected by the operation of the "received on account" key and consequently the pitman 148, shown in Fig. 26, is not connected to the arm 151, and instead of said pitman rocking the totalizer frame 134 to bring the positioned totalizer into engagement with the actuators 111, a pitman 183 (see Fig. 30) which is normally connected to arm 151 secured to the shaft 127 by a recess 185 formed in the forward end of the pitman 183 which engages with the pin 150 projecting from both sides of the arm 151, rocks the frame. This pitman 183 is also provided with an anti-friction roller 187 which plays in a cam groove 188 formed in the disk 153 on the opposite side from groove 153. The shape of this groove 188 is such that immediately after the totalizer frames have been shifted to bring the proper totalizer into active coöperation with the actuators, and previous to the upper movements of the differential elements carrying the said actuators, the pitman 183 will be drawn rearwardly, which will rock the shaft 127 clockwise and through the arms 156 projecting forwardly therefrom through the cam slots 155 formed therein, rock the totalizer frame 134 so as to bring the "balance charged" totalizer elements 136 into engagement with the actuators 111. Thus as the actuators are moved upwardly, the totalizer elements 136 of the "balance charged" totalizer will be moved in a direction to subtract therefrom.

In order to shift the totalizer frames previous to the upward movement of the differential elements carrying the actuators, the "received on account" key (see Fig. 25) does not actuate the slide 101 and consequently the early acting pitman 84 is left in engagement with the pin 82 of the arm 81 forming a part of the invariably movable device for actuating the differential element 50 controlled by the special keys. After the totalizer frames have been properly positioned by the early acting pitman 84 the cam groove 188 will actuate the pitman 183 to rock the totalizer elements 136 of the "balance charged" totalizer into engagement with the actuators 111, as previously described. After the elements 50 carrying the actuators have been differentially adjusted, the totalizer frames will be returned to normal position by the pitman 84 in which position the elements of the "received on account" totalizer are in the same plane as the actuators 110 carried by the differential elements 50 and the elements of the "cash on hand" totalizer are in the same plane as the actuators 111. From Fig. 29 it will be seen that when the "received on account" key is depressed the slide 157 will be elevated and thereby permit the connection of the pitman 166 with the arm 9, the same as when the "charge" key is depressed, as previously described. It will also be observed from Fig. 30 that the cam groove 188 is constructed to draw the pitman 183 rearwardly after the differentially movable members 50 have been positioned and before they begin their return movement to normal position. Therefore upon the continued operation of the machine the elements of the "received on account" totalizer will be rocked into engagement with the actuators 110 and the elements of the "cash on hand" totalizer will be rocked into engagement with the actuators 111 so that as the differential elements 50 carrying the actuators 110 and 111 are returned to normal position they will rotate the wheels of these totalizers in a direction to add the amount represented by the keys depressed.

*Paid out transaction.*—Whenever a "paid out" transaction is entered in the machine it is necessary to subtract from the "cash on hand" totalizer so that the correct amount of cash on hand shall be indicated on the said totalizer, as well as to bring the "paid out" totalizer into coöperation with the actuators during the same operation of the machine, so that the total amount paid out shall be indicated on the "paid out" totalizer. Whenever an amount is to be subtracted from one of the totalizers this subtracting operation is done upon the upward movement of the differential elements 50 carrying the actuators. As the totalizer frames at the end of each operation of the machine are returned to their normal position with the "received on account" and "cash on hand" totalizers in position to rock into engagement with the actuators 110 and 111 respectively, it will be seen that when a "paid out" transaction is entered upon the machine it is not necessary to shift the frame to bring the "cash on hand" totalizer into position so that its elements will be engaged by the actuators 111 on the up stroke of the differential elements 50, and consequently it is not necessary to have the early acting pitman 84 operate the special differential element 50 that carries the rack 109 for shifting the totalizer frames. By reference to Figs. 26 and 30 it will be seen that when the "paid out" key is depressed the slide 139 will not be affected, and consequently the pitmen 148 and 183 will be left in the position shown in said figures, so that just after the beginning of the operation of the machine the frame 134 carrying the lower group of totalizers will be rocked to bring the "cash on hand" totalizer into engagement with the actuators 111 previous to the upward movement of said actuators. As the actuators are moved upwardly they will rotate the elements 136 of the "cash on hand" totalizer in a direction to subtract therefrom and after the amount has been subtracted therefrom, the pitman 93 (Fig. 25), which has been connected to the pin 82 of the arm 81 by the operation of the "paid out" key, will move the arm 81 and the devices connected thereto so as to shift the totalizer frames to bring the elements 132 of the "paid out" totalizer into position to be rocked into engagement with the actuators 110 of the differential elements 50. After the totalizer elements 132 of the "paid out" totalizer have been positioned in the planes of the actuators 110 they are rocked into engagement therewith by the pitman 166 (Fig. 29), which is connected to the arm 169 by the elevation of the slide 157, as this elevation permits the spring 159 to rock the snap pawl 158 in a clockwise direction and thereby to rock the arm 162 so as to connect the pitman 166 with the arm 169. The rocking of the totalizer elements 132 into engagement with the actuating racks 110 occurs previous to the return movement of said racks, so that when said racks are returned they will move the elements of the "paid out" totalizer in the direction to add thereto.

It will be recalled that the cam groove 188 (Fig. 30) is designed to give the pitman 183 two operations at each operation of the machine. As this pitman is in effective position when a "paid out" transaction is entered in the machine it can be seen that the totalizer frame 134 is rocked twice, the movement of the frame the first time moving the "cash on hand" totalizer into engagement with the actuators 111. The frame 134 is rocked the second time after the totalizers have been shifted to bring the "paid out" totalizer into operative relation with the actuators 110. At this time, however, neither the "balance charged" totalizer nor the "cash on hand" totalizer is in operative relation with the actuators 111 so that upon return movement of the differential members 50 only the "paid out" totalizer is operated.

The frame 125$^b$ between the side arms of which are mounted the totalizer frames 130 and 134, is provided with three recesses 198 (see Figs. 10 and 17) into which the forward end of a plunger 199 is arranged to enter so as properly to aline the frame 125, which in turn insures the proper positioning of the totalizer elements 135 and 136 relative to their respective actuators. In some instances, as previously described, the frame 125 is first shifted to bring one of the totalizers into coöperative relation with the actuators and then returned to bring another of the totalizers into such relation with the actuators and it is therefore necessary that the plunger 199 be moved forwardly twice during each operation of the machine so as properly to aline the different totalizers relative to the actuators. This double movement of the plunger 199 (see Fig. 11) is brought about by a disk 200 secured to the shaft 65 which is provided with a cam groove 201 in which plays a roller 202 projecting from the plunger 199 near its rear end, the extreme rear end of said plunger being forked so as to straddle the shaft 65. The forward end of the plunger 199 is guided by a laterally extending plate 120$^a$, which projects from one of the plates 120 secured to the side frame 59 of the machine, and which supports the shafts 118, 126 and 127.

The snap pawls 91, 140 and 158 are returned to their normal positions at the very end of the operation of the machine by a pin 190 which projects from an arm 191 into the rear of all of the downward extensions of the various snap pawls. The arm 191 (Fig. 27) is loosely mounted at its upper end upon the rod 92 and at its lower end is connected to a pitman 192, the rearward end of which straddles the shaft 65. The high point of a cam disk 193, secured to the shaft 65, engages with a roller 194 on said pitman 192 at the extreme end of the rotation of the shaft 65 and forces the pitman 192 forwardly, and thus returns the various snap pawls to normal position by contact of the pin 190 with the ends of recesses 195 formed in the downwardly extending projections of the different snap pawls. As these snap pawls are returned to their normal positions the slides 101, 139 and 157 will also be returned to their normal positions by springs 196.

In the preferred embodiment of this invention, as above described, the successive coöperative relation between the totalizers and the actuators during an operation of the machine is accomplished automatically, but it is to be understood that applicant is not limited to this exact construction as his invention in its broadest aspect is intended to include all constructions wherein the totalizers are successively actuated by the actuating means.

*Transfer mechanism.*—The transfer mechanism employed is of that type wherein the actuators are moved an additional step to effect the transfer, and the novelty thereof consists mainly in mechanism to move the actuators this additional step in either direction so as to effect the transfers while subtracting as well as while adding.

Referring to Fig. 7, it will be seen that the actuators 110 and 111 are provided with elongated slots 203 and 204 respectively, through which pins 205 and 206 project into the differential element 50. It is by these elongated slots that the different actuators are permitted to move independently of the differential elements to effect the transfer. As the upper set of actuators 110 are used for addition only the slots 203 project in one direction from the pins 205 while with the lower set of actuators 111, which are used for both addition and subtraction, the slots 204 formed therein extend in opposite directions from the pins 206 to permit the movement of said actuators in either direction.

The actuators 110 are latched in their normal positions, as shown in Fig. 7, by bell crank pawls 207 which are pivoted as at 208 to their corresponding differential element 50, while bell crank pawls 209 similar to the pawls 207 and also pivoted to the differential elements 50 latch the actuators 111 in their normal positions, as also shown in said figure. Each of the actuators 110 has extending therefrom near its center a projection 210 to which is pinned one end of a rod 211, the other end of said rod extending through a flange 212 struck up from the differential element 50 carrying said actuator, and interposed between the projection 210 and the flange 212 is a coiled spring 213 which surrounds the rod 211. This spring is normally under tension, so that when the latching pawl 207 for the actuator 110 is tripped the spring 213 will impart an additional movement to the actuator 110. An actuator 110 which has been moved by its spring 213 to effect the transfer, is returned to its normal position, as shown in Fig. 7, at the end of the operation of the machine, by a bell crank lever 214 which is pivoted to the differential element 50 as at 215. One end of this bell crank lever 214 engages with a roller 216 extending from the actuating rack 110, while the other end of said lever 214 is provided with a roller 217 which plays in an elongated slot 218 formed in a slide 219 which is pivoted to links 220 (see Figs. 7 and 9), which in turn are pivoted to one of the side plates 35 of the key bank corresponding to this particular differential element 50. The slide 219 at its lower end is provided with a recess 221 into which plays a roller 222 carried on the free end of the arm 223, the other end of which is fast to a rock shaft 224, the latter being suitably mounted in the side frames 59 of the machine. It is to be understood that there is one of these slides 219 and an operating arm 223 therefore for each of the differential elements 50 carrying the actuating racks 110 and 111 and also for racks similar to the racks 110 and 111 which may be used only for the purpose of transferring where each totalizer is provided with more elements than the machine is provided with banks of keys. Extending downwardly from the shaft 224 is an arm 225 to which is connected the forward end of a pitman 226, the rearward end of which is forked to straddle the shaft 65 (see Fig. 33). Near its rear end the pitman is provided with a roller 227 which plays in a cam groove 228 formed in a disk 229 secured to the shaft 65. The shape of the cam groove 228 is such that when the differential elements carrying the actuators 110 and 111 are moved upwardly, as previously described, the slides 219 will be held in the position shown in Figs. 7, 9 and 10. Just after the differential elements reach their adjusted position, and while they are in such position, the link 226 will be drawn rearwardly which will rock the shaft 224 clockwise and thereby carry the arms 223 downwardly. This movement of the arms 223 will, by the rollers 222 carried at their forward end, lower all of the slides 219, which slides, as they are lowered, will swing about the pivotal point of the links 220 and thereby rock the bell crank levers 214 counter clockwise about their pivots 215. These slides and bell crank levers 214 will be held in their operated position until the differential elements 50 are returned to normal position after which the slides 219 will be returned to their normal position as shown in Figs. 7 and 9, and if a transfer has been effected by the actuators 110 the return of the slides 219 will rock the bell cranks 214 clockwise, so that their free ends will engage with the rollers 216 of the displaced actuating racks 110 and return them against the tension of their springs 213, until said racks are latched in their normal position by the pawls 207. The pawls 207 are drawn into operative position by light coil springs 230.

Each of the lower actuating racks 111 is provided with a rod 231 upon which is loosely mounted a sliding collar 232. This collar 232 is provided on one side with flanges 233, as shown in Fig. 10, between which plays the head of a bell crank lever 234 pivoted to the differential element 50 carrying the actuating rack, and which is similar to the bell crank lever 214. The other end of this bell crank lever 234 is provided with a roller 235 which projects into the elongated slot 218 of the companion slide 219. Between the ends of each of the actuating racks 111 and the collar 232 are springs 236 which impart to the actuating rack its independent movement in either direction to effect the transfer, as previously mentioned. These actuating racks 111 engage with the elements 136 of the lower group of totalizers as the differential elements 50 carrying said actuators are moved upwardly, which movement will subtract from the totalizer in engagement with said actuators. As previously described in connection with the actuators 110, the slides 219 will be held in the position shown on Figs. 7, 9 and 10 during the upward movement of the differential elements 50 and while the slides 219 are held in this position the bell crank levers 234 will hold the collars 232 surrounding the rods 231 slightly elevated so as to compress the springs 236 that are above the said collars and if any of the bell crank latching pawls 209 are tripped while the collars 232 are held in this position, the racks 111 will be given an additional movement to effect the transfer by the springs 236. While the differential elements 50 are in their adjusted positions the slides 219 will be lowered, as previously described, and by this movement of said slides the bell crank levers 234 will be rocked the same as the bell crank levers 214, which movement will lower the collars 232 of the actuators 111, and if any of the actuators 111 have been previously tripped, the said actuator will be first returned to its normal position, in which position it will be latched by its pawl 209 and the collars 232 will continue their downward movement upon the rods 231, which movement will compress the lower springs 236 and relax the tension of the upper springs. When the differential elements are afterward returned to their normal position, if any latching pawls are tripped an additional movement will be imparted to the racks independently of their elements 50, in the opposite direction from that previously described. At the end of the operation of the machine, if any of the racks have been displaced during the return movement of the differential elements 50, the said racks will be returned to their normal positions by the return movement of the slides 219, as previously described in connection with the actuator racks 110, and will be latched in these positions by the pawls 209, these pawls being drawn into locking positions by springs 237.

Each of the differential elements 50 (see Fig. 10) controlled by a bank of amount keys, is provided with a pair of trip arms 238 and 239 with which the elements 132 and 136 of the upper and lower groups of totalizers coöperate respectively. These trip arms are supported by parallel links 240 which are pivoted to the differential elements 50, and are normally held in the positions shown in Fig. 10 by springs 241 which draw one of the links 240 of each pair into contact with pins 242 extending from each one of the elements 50. The trip arm 238 is provided with an inclined flange 243, which, when the arm is moved toward the front of the machine, as hereafter described, will engage with a roller 244 secured to one of the arms of the bell crank latching pawl 207 and rock said pawl about its pivot to withdraw it from engagement with its actuating rack 110, to permit the transfer movement of said rack. Each of the trip arms 239 is provided with a similar incline 245 which engages with a roller 246 secured upon one arm of the bell crank latching pawls 209 for the lower racks 111.

Supported by the plates 120, which are secured to the side frames 59 of the machine, are transverse shafts 247 upon which are supported trip pawls 248 (see Figs. 10, 10ᵃ and 19), which pawls are provided with pins 249 that engage with the rearward edges of the trip arms 238 and 239. These pawls are secured by short sleeves 250 to upright arms 251 which are positioned to be engaged by pins 252 extending laterally from the totalizer elements 132 and 136. These arms 251 are provided with right angled shoulders with which the pins 252 contact as the elements move from "nine" to "zero" in adding and from "zero" to "nine" in subtracting. As these pins contact with said arms they will rock the arms about the shafts 247 and through the sleeves 250 rock the trip arms 248, which in turn will operate the trip plates 238 and 239 depending upon which group of totalizers is being actuated. As the totalizers of each group are, under certain conditions, arranged to be simultaneously operated, it is necessary to provide the double set of actuators, as it is possible when totalizers of both groups are being operated, that a transfer will take place in one and not in the other, therefore if only a single set of actuators were employed this transfer would be effected in totalizers of both groups which, obviously, would be a serious defect in the machine. Leaf springs 253 engage with recesses formed in the sleeves 250 carrying the trip pawls 248 so as to hold said pawls from accidental displacement. The pins 252 of the totalizer elements will all engage with the arms 251 when the totalizers are in mesh with the actuators 110 and 111. As the totalizer frames 130 and 134 are rocked to carry the elements into engagement with the actuators, all of said elements will be engaged by the curved ends of a thin sheet metal plate 254 so as to hold the elements that are not in engagement with the actuators from accidental displacement and thereby insure the proper alining of said elements as they are returned to normal position by the alining plates 197. This sheet metal plate 254 is secured to the front of laterally extending ribs of the plates 120.

*Indicating mechanism.*—The indicating mechanism employed comprises a series of rotating drums which are arranged to display the character of the transaction, the initial of the clerk making it, and the amount of the transaction. These indicator drums are constructed to move directly from one position to another, that is, if "five" is indicated and it is desired to indicate "nine," the indicator will move from "five" to "nine" without returning to zero or a normal starting point.

Each of the differential elements 50 controlled by the amount and clerks' banks of keys is provided near its upper end with a roller 255 (Fig. 1) which plays in a curved slot 256 in a bell crank lever 257, which is pivoted loosely upon a shaft 258 suitably mounted in the side frames 59 of the machine. The downwardly and rearwardly extending arm of each bell crank 257 is provided with an elongated slot 259 and with V-shaped alining notches 260 formed upon the periphery of said arm. As the differential elements 50 move upwardly they will rotate the bell cranks 257 counter clockwise, as shown in Fig. 1, but previous to this movement of any bell crank 257, an alining plate 261 will be permitted to drop out of engagement with the notches 260 so as to allow the movement of said bell crank. After the differential elements 50 have been adjusted, the alining plate 261 will be rocked into engagement with the notches 260 by a cam 262 which is loosely mounted upon a shaft 263 that is supported by the side frames. This cam 262 has a rearwardly extending arm 264 with which the upper end of a link 265 is connected. The lower end of said link is attached to the rearward end of an arm 266 which projects from a hub 267 loosely mounted upon a shaft 268. Extending down from this hub 267 (see Fig. 2) is an arm 269 to which is connected the rear end of a pitman 270, the forward end of said pitman being forked so as to straddle the shaft 65. This pitman 270 is provided with a roller 271 which plays in a cam groove 272 in a disk 273 secured to the shaft 65, and the formation of this groove 272 is such that at the very beginning of the operation of the machine the cam 262 will be rocked out of engagement with the alining plate 261, so as to allow the latter to drop by gravity out of engagement with the notches 260 of the different bell cranks 257, and after the bell cranks have been positioned by the differential elements 50 the cam 262 will be rocked into engagement with the notches of the adjusted bell cranks 257, so as to permit them to control the adjustment of the indicator mechanism, as hereafter described. After the indicators have been properly adjusted the cam 262 is rocked out of engagement with the plates 261, in order that the differential elements and the bell cranks 257 connected thereto may be returned to their normal position, after which the alining plate 261 is again rocked into engagement with the notches 260 of the bell cranks 257, to prevent any displacement of the parts between operations of the machine.

As previously described, each of the bell cranks 257 is provided with an elongated slot 259 in which plays a roller 274 projecting from the upper end of a link 275, the lower end of said link being fastened to the forward end of an arm 276 which is secured to the shaft 268. Also secured to this shaft 268 and extending downwardly therefrom is an arm 277 which is connected at its lower end to one end of a pitman 278, the other end of said pitman being provided with a roller 279 (see Fig. 1) which plays in a cam groove 280, shown by dotted lines in said figure, and which is formed upon the disk 68 upon the opposite side from that of a cam groove 67, also formed in said disk. The formation of this groove 280 is such that when the differential elements have been positioned, and while they are being held in their adjusted position by the alining plate 261, the said cam groove will move the pitman 278 rearwardly, which will rock the arm 277 and the shaft 268 clockwise and thereby carry the arms 276 and the links 275 connected therewith downwardly. By this downward movement of the links 275, the rollers 274 which play in the slots of any of the adjusted bell cranks 257, will engage with one or the other side of a pear shaped slot 281 formed in the lower portion of a plate 282 which is centrally pivoted upon the shaft 258, and rock said plate until the roller 274 is moved to the apex of the slot 281.

Each of the plates 282, of which there is one for each of the amount and clerks' indicators, is provided with teeth 283 at its upper edge which engage with a pinion 284 secured to the corresponding indicator. From this it will be seen that any movement of the actuating plates 282 will rotate the indicators 285 to a position to display the amount and initial of the clerk represented by the depressed keys. Meshing with these pinions 284 are segmental racks 286 which are pivoted upon a shaft 287 located above the indicators 285 and are connected by sleeves 288 to similar segments which mesh with pinions attached to the indicators for displaying the amount of transaction and the initial of the clerk at the rear of the machine.

Owing to the fact that the differential element 50, controlling the special transaction indicator, is operated by different devices at varying times during the operation of the machine, it is necessary to provide a special alining device and operating mechanism for said indicator. Instead of a bell crank 257 independent arms 289 and 290 having together a contour similar to the bell cranks (see Figs. 3 and 5) are provided, which arms are mounted upon the shaft 258. The arm 289 is provided with a curved slot 291 which is similar to the slot 256 formed in the bell cranks 257 and engages with a roller 292 projecting from the differential element 50 controlled by the special bank of keys. The arm 290 is provided with a flange 293 which overlaps the upper edge of the arm 289 so that when the latter arm is rocked counter clockwise by the elevation of its differential element 50, the arm 290 will be rocked in a similar direction. After the arm 290 has been positioned by the arm 289 an alining pawl 294 will be carried into engagement with one of the notches 295 formed upon the arm 290 by a cam 296 which is loosely mounted upon the shaft 265. The hub of this cam 296 has a rearwardly extending arm 297 to which is pivoted the upper end of a link 298, the lower end of said link being fastened to an arm 299 which is attached to a hub 300 loosely mounted upon the shaft 268. Extending downwardly from this hub is an arm 301 (see Fig. 4) to which is pivoted the rearward end of a pitman 302, the forward end of this pitman being slotted so as to straddle the shaft 65. This pitman is provided with a roller 303 which plays in a cam groove 304 formed in one side of a disk 305 which is secured to the shaft 65. The shape of the cam groove 304 is such that immediately after the positioning of the arm 290 by the upward movement of the special differential element 50, the pitman 302 will be moved forwardly so as to rock the arms 299 and 301 counter clockwise. This will lower the link 298 and by the cam 296 rock the alining pawl 294 into one of the notches 295 of the arm 290 and hold said arm in its adjusted position until the shaft 268 has been rocked by the cam groove 280 formed in the disk 68 (see Fig. 1) thereby lowering the links 275 and the rollers 274 carried in the upper ends thereof, there being one of these links 275 for operating the special indicator similar to the links for operating the amount and clerks' indicators. The roller 274 of the link 275 which operates the special or transaction indicator, plays in an elongated slot 306 formed in the arm 290. This roller is arranged to contact with the sides of a pear shaped recess 307 formed in a plate 308, centrally pivoted upon the shaft 258 and having teeth which mesh with a pinion 309, which in turn meshes with the lower end of a double segmental plate 310. The upper end of this plate 310 (see Fig. 6) meshes with a pinion 311 which is attached to one side of an indicator 312 bearing the full words of the different special transactions such as "Cash", "Charge", "Received on account", and "Paid out". This indicator 312 is located above the amount indicators 285 and extends across both the front and back sets of amount and clerks' indicators.

The object of the one-way connection between the arms 289 and 290 is to permit the return of the differential element 50 which is connected to the arm 289 to normal position, while the arm 290 is in its adjusted position. This is necessary, as in some instances the special transaction element 50 is moved upwardly to shift the frames carrying the totalizers, to bring one of the totalizers into position to be actuated by the upward movement of the actuators controlled by the amount banks of keys, and then is moved to return the frames carrying the totalizers to normal position, so as to bring another one of said totalizers into position to be actuated upon the return of the amount actuators, and as this return of the differential element 50, controlled by the special transaction bank of keys, occurs while the rollers 274 of the links 275 are positioning the indicators, the reason for this one-way connection between the arms 289 and 290 will be apparent.

As previously described in connection with the "received on account" transaction under the main heading of "multiple totalizers," the differential element 50 controlled by the special bank of keys, has a movement independent of the rack 109 carried thereby whenever a "received on account" transaction is entered in the machine, for the reason that it is desirable to control the shifting of the totalizer frame, to bring the "balance charged" totalizer into position to have the amount subtracted therefrom by the upward movement of the amount actuators, and as this "balance charged" totalizer is also brought into coöperative relation with the amount actuators by the differential element 50, when a "charge" key is depressed, it will be seen that if an independent movement of the element 50 were not provided, the same indication would appear when the "received on account" transaction key is depressed, but by providing this additional movement of the element 50 independently of the rack 109 carried thereby, which rack controls the shifting of the totalizer frames, the mechanism controlling the special transaction lever is moved a distance greater than when the "charge" transaction key is depressed, although the totalizer frames in each instance are moved the same distance.

*Flash mechanism.*—It is desirable to provide some means of concealing the indicators during an operation of the machine in order to prevent fraudulent manipulation of the machine, which may be accomplished when an amount is desired to be indicated which is less than previously displayed. In such case the clerk would need only to depress his initial key and then turn the handle of the machine, which would move the indicator from the amount previously displayed toward zero position and if some sort of concealing means for the indicator was not provided, the clerk would be able to display any amount less than that previously indicated. The operation of the improved concealing means employed in this invention is as follows: Loosely pivoted upon shaft 313, which is supported by the side frames 59, are a pair of arms 314 (Fig. 5) which carry at their outer ends shields 315, which, as shown in this figure, are normally elevated so as to display at a suitable reading opening in the frame of the machine, the amount of the transaction. The arms 314 have extensions 316 which are provided with pins 317 that project into inclined slots 318 formed in the upper end of a slide 319, suitably supported and guided by the shafts 258, 287, and 313, which pass through elongated slots 320 formed in the said slide. The lower end of the slide 320 (see Fig. 5) is provided with a pin 321 which plays in a recess 322 formed in the rearward end of an arm 323, the forward end of which is fast to a sleeve 324 surrounding the shaft 126. The other end of this sleeve 324 has attached thereto a rearwardly extending arm 325, to which is pivoted the upper end of a pitman 326, the lower end of this pitman being forked so as to straddle the shaft 65. Projecting from the pitman 326 is a roller 327 which plays in a cam groove 328 formed in a disk 329 secured to the shaft 65. During the operation of the machine the pitman 326 will be elevated, which in turn will rock the arms 323 and 325 that are connected by the sleeve 324, clockwise. This movement of the said arms will elevate the slide 319, and by the inclined slots 318 will lower the shields 315 to conceal the amount and clerks' initial indicators. Near the end of the operation of the machine the pitman 326 will be returned to its normal position, as shown in Fig. 5, and this movement of said pitman will return the slide 319 and the shields 315 to the positions shown in that figure.

The slide 319 has an upward extension 330 (see Fig. 6) provided with a slot 331, through which extends a shaft 332 that supports the special transaction indicator 312. Also supported upon this shaft 332 are arms 333 which carry at their outer ends shields 334 for the special transaction indicator 312. The arms 333 are provided with extensions 335 projecting from which are pins 336 that extend into inclined slots 337 formed upon the extension 330 of the slide 319. These inclined slots 337 are similar to the inclined slots 318 previously described, and upon the upward movement of the slide 319 act upon the pins 336 of the arms 333 in a manner similar to the way the inclined slots 318 act upon the pins 317, so as to bring the flashes or shields 334 into position to conceal the special indicator 312.

*Special counters.*—A set of special counters is provided and upon these counters are registered the number of different classes of transactions and the total number of all transactions. A tie bar 340, see Figs. 3 and 20, is secured to the side frames 59 of the machine, and secured to the said tie bar and extending upwardly therefrom are a series of yoke shaped frames 341, one for each special counter. The arms of each of these yoke shaped frames support, at their upper ends, a shaft 342 upon which are mounted the wheels 343 comprising the special counter. Mounted loosely upon the right hand end of each of the shafts 342 is an arm 344 (see Fig. 22) which carries a pawl 345 which in turn engages with a ratchet wheel 346 secured to the units wheels of the counter. Each of these arms 344 and its pawl 345 is held in position as shown in Fig. 22, by a coil spring 347. A series of fingers 348 secured to and projecting forward from a shaft 349 are arranged to engage with the arms 344 and operate them to actuate their respective counters. Only one of these fingers 348 is in position to actuate its corresponding arm 344 at a time with the exception of that one which actuates the customer or total counter. This finger 348 is provided with an offset $349^a$ (Fig. 20) so that no matter in what position the shaft is, this offset $349^a$ will engage with the arm 344 of the customer counter while one of the other fingers 348 is in engagement with its respective arm 344.

Rigidly mounted upon the right hand end of the shaft 313, to which is also secured the pinion 309 actuated by rack plate 308, is a pinion 350 which engages with an intermediate gear 352 which in turn meshes with a pinion 353 mounted upon a stub shaft 354, see Figs. 20 and 21, the outer end of the latter having a screw thread 355. The pinion 353 is internally threaded to engage with the screw 355. The shafts 349 and 354 are united by a coupling device 356, (Figs. 21 and 24) which permits of a slight oscillatory movement of the shaft 349 independent of the shaft 354. That portion of the shaft 354 upon which is formed the screw 355 is provided with a longitudinal groove 357 into which projects a finger 358 of greater width than the pitch of the screw 355 and which is secured to the right hand side frame 59 so as to prevent any rocking movement of the shaft 354 when the shaft 349 is oscillated as hereafter described. From this it will be seen that as the special indicator 312 is rotated the shaft 313 and pinion 353 will also be rotated and thereby shift the shafts 354 and 349 laterally to bring one of the fingers 348 into coöperative relation with the arm 344 of the special counter corresponding to the transaction displayed by the indicator 312. The shaft 349 has a collar 1359 splined thereon so as to permit the shaft to move independently of said collar, but when said collar is rocked as hereafter described, it insures the rocking of the shaft 349. This collar 1359 has an arm 1360 extending downwardly therefrom to which is connected the upper forward end of a link 1361, see Fig. 3, the lower rearward end of which is connected to one arm of a bell crank lever 1362 which is loosely mounted upon the shaft 263. The other arm of the bell crank 1362 is connected to the upper end of a link 1363 (see Fig. 4) the lower end of which is fastened to the rearwardly extending arm of a bell crank 1364 loosely mounted upon the shaft 268. The downwardly extending arm of the bell crank 1364 is connected to the rear end of a pitman 1365, the forward end of which is forked and straddles the shaft 65 and is provided with a roller 1366 playing in a cam groove 1367 formed in the disk 505. The shape of this cam groove is such that near the end of the operation of the machine, and after the shaft 349 has been positioned, the bell crank 1364 will be rocked counter clockwise and by the links 1363 and 1361 and bell crank 1362 rock the shaft 349 clockwise. This will carry the positioned finger 348 into contact with the arm 344 carrying the pawl 345, and move the units wheel of that particular counter one step. The transfer between the units wheel and the remaining counter wheels of the various special counters may be of any of the various styles of transfers which are well known in the art and which it is thought need not be shown. Each of the shafts 342 of the special counters has secured thereto a knurled knob 1368 on the end opposite from that of the arm 344 and by this knurled knob the counter wheels may be reset to zero through any of the well known resetting devices, such, for instance, as a longitudinal groove formed in the shaft and pawls carried by the wheels.

*Printing mechanism.*

A novel form of printing mechanism is provided whereby each item as indicated is arranged to be recorded upon a record strip which is stored in the machine and also upon a strip which is severed into checks and delivered to the customer as a receipt for his purchase, mechanism being provided to print any suitable advertisement upon the back as well as upon the front of the severed check. A novel form of feeding mechanism for the check strip is provided and also mechanism for automatically reversing the feed of the inking ribbon.

*Setting and alining mechanism for the type carriers.*—The centrally pivoted plates 282 and 308 (Figs. 1 and 5) which actuate the indicators 285 and 312 respectively for indicating the amount and kind of transaction, as well as the initial of the clerk who made the transaction, are provided with rearward extensions 359 to each one of which is pivoted the upper end of a link 360, the lower end of which is secured to the rearward end of an arm 361 which at its forward end is secured to one of a series of transverse shafts 362. These shafts extend to the left hand end of the machine (see Fig. 31) and are provided with rearwardly extending arms 363 to which are pivoted the upper ends of links 364. The lower end of each one of the links 364 is pivoted to the rearward end of an arm 365 that is centrally pivoted upon the shaft 268. The forward end of each of the arms 365 is connected to the lower end of a link 366, the upper end of which is provided with a pin 367 that extends through an elongated slot 368 formed in the rearward extension of a segmental rack plate 369. These segmental rack plates are pivoted upon a rod 370 and mesh with gears 371 fast to type carriers 372, each of which is provided with two sets of type for recording upon a record strip and a check strip, as hereafter described. The lower shaft 362 is actuated directly upon the operation of a separate manipulative device for controlling the printing of the totals as hereinafter described and this shaft controls the setting of a type carrier for printing a special character designating the total upon the record strip in a manner similar to the setting of the previously described type carriers 372. The type carriers 372 are loosely mounted upon a rod 373, and the gears 371 attached to the type carriers have a portion of their periphery provided with V shaped notches 374 into which are arranged to project fingers 375 of an alining plate 376 so as properly to aline the type carriers 372 previous to the taking of impressions therefrom. The alining plate 376 has side arms 377 which are provided with elongated slots 378 through which project the rods 370 and 373 so as to guide said arms and the plate 376. Upon the beginning of the operation of the machine a cam 379 projecting from a hub 380 which is loosely mounted upon a rod 381, is rocked out of engagement with the plate 376 and a spring 382, the ends of which are secured to one of the arms 377, and to the rod 373 will withdraw the fingers 375 of the alining plate 376 out of engagement with the notches 374 of the gears 371. The hub 380 carrying the cam 379 has a forwardly extending arm 383 to which is pivoted the upper end of a link 384, the lower end of which is attached to one of the prongs of a three pronged lever 385 loosely mounted upon a rod 386 (see Figs. 31 and 34). The upwardly extending prong of the lever 385 has secured thereto the forward end of a pitman 387 the rear end of which is forked so as to straddle the shaft 65. Extending from this pitman 387 is a roller 388 which projects into a cam groove 389 formed in a disk 390 secured to the shaft 65. The shape of the groove 389 is such that at the beginning of the operation of the machine the lever 385 will be rocked counter clockwise, which will rock the hub 380 carrying the arm 379 clockwise by the pitman 384, and thereby withdraw the cam 379 out of engagement with the alining plate 376, to permit the spring 378 to withdraw the fingers 375 out of engagement with the notches 374 in the gears 371. The continued operation of the machine will adjust the type carriers to a position to record the amount represented by the depressed keys, after which the cam 379 will force the alining plate 376 and the fingers carried thereby upwardly into engagement with the notches 374 so as correctly to aline the adjusted type carriers.

To insure equal degrees of movement being imparted to the type carriers 372, as they successively bring the different types carried thereby into printing position, the upper ends of the links 366 which connect the segmental plates 369 to the pivoted arms 365, are provided with inclined slots 408 through which projects a pin 409 extending from the printer frame. The inclinations in the slots 408 are such that when the links 366 are elevated the pins 367 moving in the elongated slots 368 will impart to the segmental plates 369 movement in equal steps, which is conveyed to the type carriers 372 through the gears 371, and any improper adjustment thereof, due to lost motion, will be corrected by the fingers 375 carried by the alining plate 376.

*Feed devices for the record strip.*—The other prong of the lever 385, is provided with a pawl 391 which is pressed into engagement with the teeth of a ratchet wheel 392 by a spring 393. This ratchet wheel 392 is secured to the side of a roller 394 normally in contact with the surface of a ring 395 surrounding a roller 396, which has an eccentric bearing 397 suitably mounted in the frame of the printing mechanism. Between the roller 394 and the ring 395 passes the free end of a record strip 398 which extends from a supply roll 399 over a guide pin 400, and thence between the type carriers 372 and a platen 401 to the roller 394 and the ring 395, from whence it passes to a suitable storage compartment. From this it will be seen that as the three prong lever 385 is oscillated at each operation of the machine by the pitman 387 and the cam disk 390, it will first withdraw the cam 379 from engagement with the alining plate 376, and then move it again into engagement with the said plate to aline the adjusted type carriers. During this operation of alining the type carriers the pawl 391 carried by one of the prongs of the lever 385 will rotate the ratchet wheel 392 and the roller 394 to which it is attached in a clockwise direction and thereby feed the record strip.

After the type carriers 372 have been alined and the record strip fed forward an impression will be taken from said type carriers upon the record strip by the impression roller 401 hereafter more fully described.

The hub of the eccentrically mounted roller 396 is fastened to a downwardly extending arm 402 to which is connected the rear end of a link 403. This link is provided near its center with an elongated slot 404, through which a pin 405 extends from the printer frame so as to guide the movement of said link. A spring 406, the ends of which are connected to the pin 405 and to the link 403, holds the forward end of the slot 404 in contact with the pin 405, and through the arm 402, holds the ring 395 mounted upon the roller 396 in contact with the roller 394. When it is desired to insert the end of the record strip 398 between the roller 394 and the ring 395 the link 403 is pulled forwardly by a flange 407 projecting laterally from the forward end of said link, which will rotate the roller 396 about its eccentric bearings 397 and thereby withdraw the ring 396 from contact with the roller 394, so that the end of the record strip may be readily inserted between the roller 394 and the ring 395, after which the flange 407 of the link 403 is released and the spring 406 returns the link 403 and the roller 396 carrying the ring 395 back to normal position, that is, in contact with the roller 394.

*Feed devices for the check strip.*—A novel form of feeding devices for the check strip is employed, wherein a gripping device mounted upon a plate is first moved independently of said plate to grip a check strip between said device and a roller also carried by the plate, and then the movement of the gripping device is continued, which movement will also move the plate carrying the roller. A retarding device is also employed to prevent any movement of the plate carrying the roller independent of the gripping device during the feeding operation, this retarding device acting to separate the roller and the gripping device previous to the return movement of the plate carrying the roller, so as to insure the separation of the gripping device and the roller during return movement of the check feeding mechanism.

Referring now to Figs. 31 and 33, it will be seen that a plate 410 has pivoted thereto by a pin 417 a plate 411 which is equipped with a serrated edge as at 412, the plate 410 also carrying a roller 413. This plate is provided with pins 414, supported upon which are rollers 415 that play in an elongated slot 416 formed in the printer side frame so as to guide the up and down movement of said plate. The gripping plate 411 is provided with an elongated slot 418 in which plays a roller 419 projecting from the upper end of an arm 420 which is loosely mounted upon a stub shaft 421 projecting from the printer frame. This arm 420 is provided with a hub from which extends a forwardly extending arm 422 the outer end of which is connected to the rearwardly extending arm of a bell crank lever 424 loosely mounted upon the shaft 268 by a link 423. A downwardly extending arm of the bell crank lever 424 has connected thereto the rearward end of a pitman 425, the forward end of which is forked so as to straddle shaft 65. Projecting from this pitman 425 is a roller 426 which plays in a cam groove 427 formed in disk 229 in the opposite side of which is formed the cam groove 228 for restoring the actuators 110 and 111 after a transfer has been effected. The shape of the groove 427 formed in the disk 229 is such that upon the beginning of the operation of the machine the bell crank 424 will be rocked counter clockwise and thereby draw the link 423 downwardly. This movement of the link 423 will rock the arms 420 and 422 clockwise, and by the roller 419 mounted in the upper end of the arm 420, rock the gripping plate 411 until the serrated edge 412 of said plate grips that portion of the check strip 428 between it and the roller 413. By this time a stud 429 projecting from the gripping plate 411 will contact with the lower end of a slot 430 formed in the plate 410 and the continued clockwise movement of the arm 420 will, by the stud projecting from the gripping plate 411, move the plate 410 downwardly thereby to feed the check strip through a chute 431 from a suitable supply roll (not shown).

The first part of the movement of the plate 410 will carry the lower guide pin 415 of said plate into contact with a bevel edge 432 formed upon a bell crank lever 433 which is pivoted to the printer side plate as at 434 but on the opposite side thereof from the plate 410. This movement of the plate 410 will rock the bell crank 433 by the pin 415 against the tension of a spring 435 which is interposed between one end of said bell crank 433 and the end of another bell crank 436 which is similar to it. The opposite ends of the bell cranks 433 and 436 are connected by a link 437. After the pin 415 passes below the bevel portion 432 of the bell crank 433 it will bear against the forward end of the link 437 and thereby continue the tension upon the spring 435. The friction caused by the pin 415 bearing against the forward edge of the link 437 is sufficient to prevent any movement of the plate 410 due to gravity, independent of the gripping plate 411 in the downward movement of the said plate 410. Upon the return movement the pin 415 will contact with the bevel edge of the bell crank 436 and temporarily hold said pin and the plate 410 until the roller 419 withdraws the serrated edge 412 from engagement with the check strip 428, by which time the stud 429 carried by the gripping plate 411 is in contact with the upper edge of the slot 430 formed in the plate 410, and the continued counter clockwise movement of the arm 420 by the cam 229 and connecting mechanism will elevate the plate 410, which movement will rock the bell crank 436 against the tension of the spring 435, so as to provide sufficient friction between the pin 415 and the link 437 to insure the continued separation of the serrated edge 412 of the gripping plate 411 and the roller 413 during the return movement of the plate 410. The bell cranks 433 and 436 are limited in their movement due to the spring 435 by a plate 438 which is fastened to the printer side frame and has flanges 439 extending over the edges of the said bell cranks. This movement of the check strip feeding mechanism feeds the check strip from the check severing mechanism hereafter described between the type carriers 372 and impression platen 440 by which an impression is taken from said type carriers, as hereafter fully described.

*Impression mechanism for the record and check strips.*—The check strip platen 440 (Figs. 31 and 35) is provided with rollers 441 which project through elongated slots 442 (only one being shown) formed in the printer frame so as to guide the movement of the platen 440 into contact with the type carriers 372. One end of one member 443 of a pair of toggle levers is connected to the impression platen 440, the other end of said member being connected to one end of the other lever 444 by a pin 445, the other end of the lever 444 being secured to a rod 446 which is adjustably mounted in the printer side frames. This rod 446 passes through slots 447 formed in the printer side frame and the ends thereof are supported in the arms of a yoke shaped frame 448, which is secured to the printer frames by adjusting screws 449. The ends of these adjusting screws extend through the slots 447 into contact with the ends of the rod 446, and surrounding these screws 449 are springs 450 which are interposed between the frame 448 and the side frames of the printer. By reference to Fig. 31 it will be seen that the slots 447 in which the ends of the rods 446 move, are inclined so that when the adjusting screws 449 are turned so as to elevate the rods 446 the angle between the levers 443 and 444 will be increased, so that when the said levers are straightened to take an impression a firmer impression will be taken from the type carriers than when the rod 446 is in a lower position. There are provided suitable electro-plates 451, from which the impression platen 440 takes an impression above and below the impression taken from the type carriers 372. These electroplates may bear the address, or any other suitable advertising matter.

It is a desirable feature in check printing accounting machines to use all of the available space upon the check for advertising purposes, and a novel form of mechanism has been provided for printing upon the opposite side of the check from that on which the amount is recorded. This mechanism is as follows: Side flanges 452 of a frame 453 are connected by a cross bar 454, which bar has a dove tail groove in which may be slid an electro-plate 455 bearing any suitable advertising matter. Toggle levers similar to the toggle levers 443 and 444 heretofore described, are connected to the frame 453 and to a rod which is similar to the rod 446, and these toggle levers are in turn connected to the lower set of toggle levers by a link 456, so that both sets of toggle levers move in unison, and adjusting mechanism for the upper rod 446 is provided which is similar to the mechanism described in connection with the lower rods 446. Between the side arms 452 and above the cross rod 454 is mounted a rod 457 upon which is loosely mounted a series of consecutive numbering wheels 458 and dating wheels 459. Each of the dating wheels 459 is provided with a pinion 460 with which meshes an intermediate pinion 461 engaging a segment 462. The wheels 461 and the segments 462 are mounted upon rods 463 and 464 respectively, which are supported by the side flanges 452 of the frame 453, the segments 462 having extending forwardly therefrom arms 465 which play through slots 466 formed in a plate 467 secured to the printer frame. Adjacent to these slots are characters (not shown) to indicate the day, the month, and the year to which the arms 465 may be adjusted so as to set up the corresponding date upon the wheels 459.

Adjacent to the units consecutive numbering wheel 458 (Fig. 32), which is the only one shown, it being understood that there may be employed as many of these wheels as may be required, is a disk 468 which is loosely mounted upon the rod 457. This disk carries a pawl 469 which engages with a ratchet wheel 470 secured to the units consecutive numbering wheel 458. This disk 468 also carries a pin 471 which projects into a recess 472 formed in the rear end of a slide 473 which is provided with elongated slots 474 through which pass pins 475 projecting from the printer frame so as to guide the said slide. This slide is normally held in the position shown in Fig. 32 by a coil spring 476, the ends of which are connected to the slide 473 and to a pin 477 projecting from the printer frame. Upon the downward movement of the plate 410 forming a part of the check feeding mechanism, as previously described, the lower end of said plate will contact with the upper end of the slide 473 as the plate 410 nears the limit of its downward movement and thereby move said plate 473 downwardly against the tension of its spring 476. This downward movement of the slide 473 will rotate the disk 468, and by the pawl 469 carried by said disk rotate the units ratchet wheel 458. The pawl 469 is held in engagement with the ratchet wheel by a leaf spring 478. Any well known transfer mechanism may be employed between the units consecutive numbering wheel 458 and the rest of the consecutive numbering wheels but as various forms of transfer mechanism are old and well known in the art, it is thought one need not be shown. A cross frame 479 (see Fig. 31) supports a platen 480, against which the frame 453 carrying the electro-plate 455 and the consecutive numbering and the dating wheels is arranged to move, to take an impression on the check strip on the opposite side from that on which the amount is recorded. This latter impression mechanism is mounted above the impression mechanism for recording the amounts on the check strip, and as the check severing devices hereafter described are interposed between the two impression mechanisms, it will be seen that the check bearing data which is printed upon the back thereof will not be issued until the succeeding operation of the machine, at which time the amount will be printed on the face of the check and simultaneously therewith will be printed the advertising data upon the back of the next check to be issued.

From the above description it will be seen that when the lower toggle levers 443 and 444 are straightened the upper toggle levers will also be straightened by the link 456 which connects the sets of toggle levers. The straightening of the upper set of toggle levers will move the frame 453 bearing electro-plate 455 and the consecutive numbering wheels 458 and the dating number wheels 459 into contact with the impression platen 480. The straightening of the toggle levers is brought about in the following manner: Connected to the pin 445 which connects the lower set of toggle levers 442 and 444, is the upper end of a link 481, the lower end of which is connected to an arm 482, which is loosely mounted upon a stub shaft 483 projecting from the printer frame. This arm 482 is provided with a hub, extending downwardly from which is an arm 484 to which is connected the forward end of a pitman 485 (see Figs. 31 and 35), the rearward end of which is forked so as to straddle a collar 486 surrounding the shaft 65. Extending from the pitman 485 near its rear end is a roller 487 which plays in the slot of a cam groove 488 formed in a disk 489 secured to the shaft 65. The shape of the groove 488 is such that after the printer wheels 372 have been properly adjusted and alined, the pitman 485 will be drawn rearwardly, which will rock the arms 482 and 484 in a clockwise direction, and thereby through the link 481 straighten the lower toggle levers 443 and 444 and by the link 456 straighten the upper set of toggle levers so as simultaneously to record upon both the front and back of the check strip.

The pitman 485 near its center has struck up therefrom a flange 490 through which extends a screw 491 upon which are mounted adjusting nuts 492. As the pitman 485 is drawn rearwardly, as previously described, by the cam disk 489, the screw 491 will contact with the downwardly extending arm of a bell crank lever 493, and rock said bell crank lever counter clockwise about a stub shaft 494, so as to move the platen 401 carried by the upwardly and rearwardly extending arm of the bell crank into contact with the type carriers 372, to take an impression upon the record strip 398. The bell crank 493 carrying the platen 401 is normally held in a position as shown in Figs. 31 and 35, against a pin 495 projecting from the side frame of the printer, by a coiled spring 496, the ends of which are secured to the downwardly extending arm of the bell crank and to a pin 497 projecting from the printer frame.

*Check severing mechanism.*—The disk 489 (see Fig. 35) is provided on the opposite side from the groove 488 with a second cam groove 498 shown in dotted lines. This groove has playing therein a roller 499 projecting from a pitman 500, the upper end of which is connected to an arm 501 which is secured to a shaft 502. This shaft is supported in the printer frame and has extending downwardly therefrom (see Fig. 36) a pair of arms 503, the lower ends of which extend into recesses 504 formed upon the opposite sides of a movable knife 505. This knife 505 is provided with elongated slots 506 through which project pins 507 extending from a stationary knife 508. The stationary knife is provided with a recess 509 through which the check strip passes, when being fed to have an impression taken thereupon from the type carriers 372. Normally the movable knife 505 is in the position shown in Fig. 36 and the shape of the groove 498 in the disk 499 is such that after the check strip has been fed into position to have an impression taken thereon from the type wheels 372, the knife 505 will be moved across the recess 509, which forms a knife edge on the stationary knife 508, and thereby sever the lower portion of the check strip, which will then drop through a chute 510 to the position shown in Fig. 31 from which it may be removed by the operator of the machine.

*Inking mechanism and feeding devices therefor.*—By a reference to Fig. 31 it will be seen that two inking ribbons are employed, through one of which impressions are made upon the record strip and the face of the check strip, while through the other impressions are made upon the back of the check strip. The ends of each of these ribbons are suitably fastened to two spools and each ribbon is fed from one spool to another and thereafter automatically reversed and fed back on the spool from which it was first fed. A common operating mechanism is provided for feeding both of the ink ribbons, but they may be reversed independently of each other. A ribbon 512 for the record strip and the face of the check strip is fed from an upper spool 511 around guide pins 513 and thence to a lower spool 511. The ribbon 514, through which impressions are taken on the back of the check strip, is fed from one of the spools 515 around guide pins 516 to the other spool 515.

The shaft 65 has secured thereto a disk 517 which is provided with a cam groove 518 into which plays a roller 519 projecting from a pitman 520 (see Fig. 37). The lower end of this pitman is forked and straddles the shaft 65, while the upper end of the pitman is connected to a forwardly extending arm 521, which is loosely mounted upon a stub shaft 522 projecting from the printer frame. The inner end of this arm is secured to one end of a sleeve 523, the other end of which is secured to the center of a lever 524. Each end of the lever 524 carries a roller 525, which roller performs the same function in connection with the feed of both of said ribbons and it is thought that the description of the roller 525 in connection with one of said ribbons will suffice for the description of the feed of both said ribbons. The lever 524 is given a constant excursion at each operation of the machine by the cam disk 517, and is moved first in a clockwise direction and then returned to its normal position. The pin 525 carried by the forward end of the lever 524 plays in a recess 526 formed in the rearward edge of a slide 527 and which is guided upon a plate 546 secured to the printer frame by studs 528 which play in elongated slots 529 formed at the upper and lower ends of the slide 527. The studs 528 also act as supports for the ribbon spools 515. The slide 527 has near its center a projection 530 which extends forwardly from said slide, and at its extreme end has a flange 531 bent at right angles to the main portion of said projection. A reduced portion 532 of a plunger 533 passes through the flange 531, while a pin 534 projecting from the plunger 533 passes through an elongated slot 535 formed in the projection 530 and thus guides the said plunger 533 in its longitudinal movement. A spring 536 is interposed between a shoulder 537 of the plunger 533 and the flange 531 and thereby keeps the spear shaped head of the plunger 533 in one or the other of the V shaped notches 538 formed in the forward end of a slide 539 which is mounted upon the previously mentioned slide 527 and guided thereon by pins 540 which extend through elongated slots 541 formed in the slide 539. These pins 540 also act as pivotal points for levers 542 which lie adjacent to the upper edge of the slide 539 and carry pins 543 which project into the slots 541 in the slide 539. The slide 539 carries a pair of feeding pawls 544 which are arranged alternately to engage with ratchet wheels 545, secured to the spools 515 so as to feed the ribbon in one direction and then in the opposite direction. The plate 546 carries two retaining pawls 547 which are arranged alternately to engage with the ratchets 545 of the spools 515 so as to hold said spools in their advanced positions. There is one of the feeding pawls 544 and a retaining pawl 547 for each ratchet wheel 545, and a spring 548 for each pair of said pawls normally holds the pawls in position to engage with their respective ratchet wheels 545.

When the lever 524 is rocked clockwise by the cam disk 517 the slide 527 will be lowered and through the plunger 533 which engages with the upper V shaped notch 538 formed in the slide 539 also lower the latter slide. As this slide 539 is lowered the lower feed pawl 544 will engage with the ratchet 545 and rotate said ratchet in the direction of the arrow shown in Fig. 37 and when the slides 527 and 539 are returned to their normal position by the lever 524 the retaining pawl 547 will hold the lower ratchet wheel 545 and the spool 515 connected thereto in their advanced position.

The ends of the ribbon 514 are secured to the spools 515 by pins 549 which are mounted in grooves formed in said spool. When the ribbon is entirely drawn from the upper roller 515 and fed to the lower roller, as shown in Fig. 37, the said ribbon at the succeeding operation of the machine will offer enough resistance to overcome the strength of the spring 536 so that the slide 527, which carries the plunger 533 and which has a constant movement at each operation of the machine, will move said plunger from the upper notch 538 to the lower notch formed in the slide 539. This movement of the slide 527 independently of the slide 539 will carry the levers 542 downwardly through the slots 541 formed in the lever 539. That portion of the slots 541 through which the pins 543 carried by the levers 542 play are set at an angle to the remaining portion of the slots 541 so that when the slide 527 is moved independently of the slide 539, as described above, the levers 542 will swing around their pivotal pins 540. This swinging movement will carry an enlarged portion 550 of the lower lever into contact with the retaining pawl 547 that is in operative relation with the lower ratchet wheel 545, and force said pawl out of engagement therewith, while the enlarged portion 550 of the upper lever 542 will be swung out of engagement with the retaining pawl 547, so that the spring 548 may bring the retaining pawl 547 into operative engagement with the upper ratchet 545. Simultaneously with the engagement of the enlarged portion of the lower lever 542 with the retaining pawl 547 the head of the said lever 542 will engage with a projection 551 on the lower feed pawl 542 and rock it out of engagement with the ratchet 545 of the lower roller 515 against the tension of the spring 548. This movement of the slide 527 will also carry the head of the upper lever 548 out of engagement with the projection 551 of the upper feed pawl 544 so that said pawl will be drawn into cooperative engagement with the ratchet 545 of the upper roller 515 by its spring 548. Thus it will be seen that the independent movement of the slide 527 will render inoperative the lower set of arms 544 and 547, while the upper set of pawls will be rendered operative so that the ribbon will be fed from the lower spool to the upper one. When the ribbon is entirely fed from the lower to the upper spool the plunger 533 will automatically be carried to the upper notch 538 so that upon the succeeding operations of the machine the ribbon will be fed from the upper to the lower roll.

As the feed of the ribbon 512, through which impressions are taken from the type wheels 372, is identical with the feed of the ribbon 514 just described, and as the same reference numerals are used to identify similar parts in both feeding mechanisms, it is thought that the description given above will suffice for both, it being necessary only to state that the lever 524, owing to its being centrally pivoted, will move the slide 527 operating the ribbon 512 upwardly, while the slide 527, feeding the ribbon 514, will be moved downwardly and vice versa.

*Turn to zero and total printing mechanism.*

The "turn to zero" mechanism is of that type wherein the elements of the totalizers are backwardly restored to zero position instead of being rotated forwardly. These elements are constructed to be returned by an operation of the machine, and previous to their return to normal position they are coupled to the actuators carried by the differentially movable elements, so that when they are returned they will move the differentially movable elements proportionate distances and thereby may control setting of the type carriers to record the total upon the record strip, and also the actuation of the indicating mechanism to display the total.

The shafts 131 and 135 which support the totalizer elements 132 of the upper group and the elements 136 of the lower group respectively, have secured to the extreme left hand ends, looking from the front of the machine, pinions 552, see Figs. 5 and 17, which pinions are engaged by a gear wheel 553 that is loosely mounted upon the shaft 118. This gear wheel 553 has fast thereto a pinion 554 with which meshes a rack 555 that is suitably mounted within the framework of the machine. The lower end of this rack plate 555, see Fig. 5, is forked and straddles the shaft 65 and a pin 556 projects from this rack plate into a cam groove 557 formed in the disk 329, which as previously described, is connected to the main shaft 65. Upon the operation of the machine this rack plate 555 is reciprocated, which imparts an oscillatory movement to the gear 553 and through this gear rotates the pinions 552. This gearing is so proportioned that the pinions 552 are rotated nine-tenths of a complete rotation and returned to normal position at each operation of the machine.

When the machine is at rest an alining pawl 1553 engages with the teeth of the gear 553 so that when the shafts 131 and 135 are shifted, as hereafter described, the said pawl will prevent any turning of said shafts, as the pinions 552 secured to the end of said shaft are constantly in engagement with the gear 553 with which the alining pawl engages. This pawl 1553 is mounted loosely upon the shaft 127 and has extending downwardly therefrom an arm 1554 to which is secured the forward end of a pitman 1555, the rearward end of which is forked so as to straddle the shaft 65. This pitman is provided with a roller 1556 (Fig. 39) which plays in the cam groove 1557 of a disk 1558 secured to the shaft 65. The shape of this cam groove is such that upon the beginning of the operation of the machine the alining pawl 1553 is withdrawn from engagement with teeth of gear 553, to permit said gear to be rotated by the rack plate 555. At the end of the forward movement of the rack plate 555, the pawl 1553 is rocked into engagement with the gear 553 and almost immediately withdrawn therefrom, and then at the end of the operation of the machine it is again rocked into engagement with said gear wheel.

The shafts 131 and 135 have notches 558 (Fig. 18) cut therein corresponding to the greatest number of elements comprising any one of the totalizers mounted upon said shafts. These notches 558, when the shafts are in normal position, lie adjacent to pawls 559 carried by the totalizer elements that are in position to engage with their actuators, see Fig. 10. These pawls 559 extend through recesses 560 cut in collars 561 of the totalizer elements and are normally held in contact with the totalizer shaft by light springs 562. From this it will be seen that when the shafts 131 and 135 are rotated upon the operation of the machine, when a transaction is entered upon one of the totalizers, the notches 558 will not engage with the pawls 559. When it is desired to reset any one of the totalizers, the shaft upon which the elements of said totalizer are mounted is shifted longitudinally by the movement of a manipulative device 563, such as a hand lever, as shown in Figs. 5, 12 and 17. This lever 563 is provided at its inner end with a hub 564 mounted upon the shaft 118. Projecting forwardly from this hub 564 are two rollers 565 which play in cam slots 566 (Fig. 13) formed in levers 567 which are centrally pivoted upon brackets 568 which in turn are supported by the shafts 126 and 127 and also by arms 569 loosely mounted on shaft 118. Each of the shafts 131 and 135 is provided with an annular groove 570, see Figs. 12 and 17, into which project pins 571 that are mounted in the forked ends of the levers 567. If it is desired to reset the elements of one of the totalizers mounted upon the upper shaft 131, the lever 563 will be moved upwardly and by the roller 565 playing in the cam slot 566 of the lever 567, rock said lever about its pivot and shift the shaft 131 longitudinally by the pins 571 which play in the annular groove 570 of said shaft. This shifting of the shaft 131 will bring the notches 558 in position to engage with the pawls 559 carried by the elements of the totalizer that is to be reset and by imparting only nine-tenths of a rotation to the shafts, as previously described, it will be seen that the elements of the totalizer that are in zero position will not be moved, but any of the other elements that are displaced from zero position will be returned to zero position by the rotation of the shaft.

In a resetting operation it is necessary to depress the proper special transaction key 79 in order that the desired totalizer may be brought into position to be reset, and also for the purpose of recording a character upon the record strip to designate which totalizer has been reset, but as these keys control the snap pawls 140 and 158, which in turn control the various pitmen for rocking the selected totalizer into engagement with the actuators, and as the cams for actuating the pitmen are not timed correctly for resetting operations, it is essential to block these snap pawls during resetting operations, and also under certain conditions to block the snap pawl 91 which controls the connection of the differentially timed pitmen 84 and 93 which control the shifting of the totalizers. To accomplish this the following mechanism has been designed: The rear surface of the hub 564 is provided with two notches 572 formed in different planes on said hub and with which engage snap pawls 573. When it is desired to reset one of the totalizers mounted upon the upper shaft 131, the lever 563 is moved upwardly, by which movement the upper notch 572 formed upon the surface of the hub 564 will be brought into cooperative relation with one of the snap pawls 573, while if one of the totalizers on the lower shaft 135 is to be reset the lever 563 is moved downwardly and the lower notch 572 will be brought into the path of the nose of the other snap pawl 573. These snap pawls 573 are mounted upon the shaft 127 and each one has a downward extension 574 (Figs. 12 and 16) which is provided with an elongated slot 575 into which extends a pin 576 projecting from the opposite sides of a link 577. The forward end of this link is provided with an elongated slot 578 and a recess 579 in the former of which a pin 580 projecting from the slide 101 plays, while a pin 581 projecting from a lockout lever 582 plays in the recess 579. A stout coiled spring 583 holds the upper end of the snap pawls 573 in contact with the surface of the hub 564 and whenever one of the notches 572 formed upon said hub is brought into cooperative relation with the nose of one of the pawls 573 the spring 583 will draw the nose of the pawl into said notch and by so doing draw the link 577 rearwardly, which, through the recess 579 and pin 581, will rock the lockout lever 582 counter clockwise and thereby bring a pin 584 in front of an upwardly extending projection 585 on the snap pawl 91. The spring 583 is much stronger than the spring 107 connected to the snap pawl 91, so that if the slide 101 controlling said snap pawl is lifted by the operation of one of the special keys, the pin 584 projecting from the lockout lever 582 will prevent the operation of said snap pawl 91. This lockout lever 582 is mounted upon the stub shaft 92 and a similar lockout lever 586 is also mounted upon said shaft, see Fig. 14. This lever 586 is connected to the forward end of a link 587, the rearward end of which is pinned to the link 577 so that any rearward movement of the link 577 will also be imparted to the link 587. The lockout lever 586 is provided with a pin 588, which, when the lever 586 is moved counterclockwise by the rearward movement of the link 587, will pass into contact with the forward edge of upward extensions 589 of the snap pawls 140 and 158 which are similar to extensions 585 of snap pawl 91, and lock said snap pawls from movement even though the slides controlling said pawls are lifted. From this it will be seen that the snap pawls 91, 140, and 158 will have no effect upon the pitmen controlled by said pawls and consequently other means have to be provided for rocking the totalizer that is to be reset into engagement with the actuators in order that the proper types may be positioned.

Connected to the lower extension 574 of the pawl 573 which cooperates with the upper notch 572 formed in the hub 564 is a link 590 which extends rearwardly and is connected to a downwardly extending arm of a bell crank lever 591 (Figs. 12, 15 and 16) which is pivoted upon the shaft 143. The rearwardly extending arm of the bell crank lever 591 is provided with a pin 592 which plays in a slot 593 in a pitman 594, see Fig. 3. This pitman is forked at its lower end so as to straddle the shaft 65 and at its upper end is provided with a reversed L shaped slot 595. Near its lower end the pitman has a roller 596 projecting therefrom and which plays in a cam slot 597 formed in a disk 598 secured to the shaft 65. The cam groove 597 is so shaped that, just after the beginning of the operation of the machine, the pitman 594 will be lowered. From this it will be seen that when the lever 563 is moved upwardly, one of the pawls 573 will pass into engagement with its notch 572 and through the link 590 rock the bell crank 591 clockwise. This movement of the bell crank 591 will rock the pitman 594 so as to bring the horizontal portion of the slot 595 into engagement with a pin 599 projecting from an arm 600 which is rigid on the shaft 126, so that upon the rotation of the shaft 65 the pitman 594 will rock the arm 600 counter clockwise, and, by the cam slot 170 formed in the arm 171 projecting forwardly from the shaft 126, rock the frame 180 and thereby carry the elements of the totalizer into engagement with the actuators 110. As the snap pawl 158 is rendered inoperative by the pin 588 of the lockout lever 586 the pitman 166, which during the ordinary transaction of the machine operates the frame 130 carrying the upper group of totalizers, will also be rendered inoperative.

As the pitman 183, see Fig. 30, which operates the frame 134, carrying the lower group of totalizers, is normally in operative position, it is desirable to render it inoperative when any one of the upper set of totalizers is to be reset, as otherwise the elements 136 of one of the lower totalizers might be rocked into engagement with the actuators 111 while the same are being elevated during the resetting of the upper totalizer, and thus in turn reset the lower group of totalizers and thereby render the machine defective. Each one of the snap pawls 573 (Figs. 12 and 16) is provided with a slot 601 into which projects a pin 602 extending on the opposite sides of a link 603 which is connected at its rearward end to an upwardly extending arm which is secured to one end of a sleeve 604ª surrounding the shaft 143. The other end of the sleeve 604ª is provided with a downwardly extending arm 604ᵇ equipped with a pin 605 which plays in an enlarged slot 1450 formed in the pitman 183 (Fig. 30). From this it will be seen that as either of the pawls 573 snap into the notches 572 of the hub 564, arm 604 will be rocked clockwise and by the pin 605 and the slot 1450 raise the forward end of pitman 183 and thereby render the same inoperative. As the pitman 148, which also rocks the frame carrying the lower set of totalizers, is normally in inoperative position, and as the snap pawl 140 controlling said pitman is blocked by the lockout lever 586, the said pitman will be held in inoperative position even although the slide 139, controlling the snap pawl 150, is operated. As both of these pitmen 148 and 183 are rendered inoperative, an additional means must be provided for rocking the frame 134 when it is desired to reset the lower group of totalizers, and this means is as follows: Connected to the snap pawl 573, which coöperates with the lower slot 572 is a link 607, (Figs. 12, 15 and 16), the rearward end of which is connected to the upper arm of a lever 608 (see also Fig. 40) which is loosely mounted upon a sleeve 604ᶜ, and the lower arm of the lever 608 is provided with a pin 609 which plays in an elongated slot 610 formed in a pitman 611. The forward end of this pitman 611 is provided with another elongated slot 612 which has an offset 613. When the pawl 573 snaps into the lower notch 572 upon the lowering of the manipulative device, the lever 608 will be rocked clockwise and through the pin 609 elevate the forward end of the pitman 611, so that the offset 613 will embrace a pin 614 projecting from an arm 615 secured to and extending downwardly from the shaft 127. Upon the operation of the machine the pitman 611 will rock the arm 615 and shaft 127 clockwise, and through the cam slot 155 in the arm 156 engaging with the rod 138, rock the frame so as to carry the positioned totalizer into engagement with the actuators 111. The pitman 611 is provided with a roller 616 which plays in a cam groove 617 of a disk 598 secured to the shaft 65 and this pitman is reciprocated upon each operation of the machine.

As previously mentioned, the lowest one of the shafts 362, which control the setting of the type carriers 372, controls a type carrier for recording upon a record strip a special character 372ª, Fig. 42, to indicate that the total is recorded. This lowest shaft 362 (see Fig. 12) has secured thereto an arm 625 which is connected to the rear end of a link 626, the forward end of which is connected to the side of the hub 564 of the special total manipulative device 563. From this it will be seen that as the total manipulative device 563 is moved upwardly or downwardly it will oscillate the shaft 362 which in turn will control the setting up of a special character on one of the type carriers 372 (see Fig. 31).

It has been stated that upon the movement of the total manipulative device 563 in either direction, one or the other of the shafts 131 and 135 will be shifted longitudinally by the rocking of the lever 567 so as to bring the notches 558 in said shaft into coöperative relation with the pawls 559 carried by the totalizer elements. When the shafts 131 and 135 are rocked so as to carry the elements of the positioned totalizer into engagement with their respective actuators, it is necessary to prevent any accidental displacement of said shaft for the reason that if this did occur and the shafts were then rotated, the selected totalizers would not be reset because the notches 558 had moved out of coöperative relation with the pawls 559 of the totalizer elements. This is overcome by the employment of additional pins 630 (see Fig. 12) in the formed ends of the levers 567, so positioned that when the shafts 131 and 135 are rocked, these pins will engage with annular grooves 570 formed in said shafts, but the previously described pins 571 will pass out of said grooves. These pins 630 also engage with the annular grooves 570 during ordinary operations of the machine in which items are indicated and recorded.

In the usual operation of the machine, when a "received on account" transaction is entered therein, the frames carrying the totalizers are shifted so as to bring the "balance charged" totalizer into position to be actuated upon the upward movement of the differential elements 50, so as to subtract from said "balance charged" totalizer, after which the frames are returned to normal position to bring the "received on account" totalizer into position to be actuated upon the return movement of the differential elements 50. This same movement of the totalizers occurs when the "received on account" totalizer is to be reset and as the "turn to zero" cam is so timed as to rotate the shafts 131 and 135 while the frames carrying the totalizers are in their shifted positions it will be seen that the "balance charged" totalizer would be reset, consequently when resetting the "received on account" totalizer it is necessary to disconnect the early acting pitman 84 and connect the pitman 93 with the pin 82 so as to defer the shifting of the totalizer frames until after the "received on account" totalizer has been reset, this shifting of the frame being an idle operation. In order to accomplish this it is necessary to disconnect the link 577, see Fig. 12, from the lockout lever 582. It will be recalled that the "received on account" transaction is the only one in which the early acting pitman 84 is used in the ordinary operation of the machine, and as this pitman is normally in operative condition it is not necessary to raise the slide 101 controlling the snap pawl 91 upon depressing the "received on account" key, but in resetting, the conditions are just the reverse, as previously explained, and it is necessary to raise said slide. The following mechanism for accomplishing this has been designed: Connected to the snap pawl 573, which coöperates with the upper notch 572, is the rear end of a link 619, the forward end of which is connected to a bell crank lever 620 centrally pivoted upon the slide 101. When the snap pawl enters into the notch 572, the lever 620 will be rocked so as to bring the underside of the forwardly extending arm in the path of the movement of the pin 41 of the "received on account" key, so that when said key is depressed the slide 101 will be elevated by the key pin 41 contacting with the lower inclined edge of the lever 620, and this raising of the slide 101 will, through the pin 580 and the slot 578, carry the notch 579 formed in the forward end of the link 577, out of engagement with the pin 581 of the lock out lever 582, and thereby permit the snap pawl 91 to be rocked clockwise about the shaft 92 by its spring 107, so as to withdraw the pitman 84 from engagement with the pin 82, and to carry the pitman 93 into engagement therewith, as heretofore fully described. This raising of the forward end of the link 577 and the disengagement thereof from the lockout lever 582 will have no effect upon the other lock out lever 586, and thus the snap pawls 140 and 158, controlled by the lever 586, will still be held from operation. The forward edge of the lever 620, when the same is rocked, forms a more acute angle than the slots 104 of the slide 101, so that while the slide 101 will be elevated upon the operation of any of the special keys 79, it will not be elevated far enough to disconnect the forward end of the link 577 from the pin 581 of the lock out lever 582, and consequently the early acting pitman 84 will still remain in engagement with the pin 82 of the invariably movable device coöperating with the special bank of keys.

This completes the detailed description of the invention, and now a résumé of the complete operation of the machine will be given, taking as an example a "received on account" transaction which transaction requires the operation of both the adding and subtracting mechanisms. The clerk, having depressed the key corresponding to the amount of the transaction, his initial key, and the "received on account" key, rotates the crank handle 114 and through suitable intermediate gearing imparts a complete rotation to the shaft 65. The depression of the "received on account" key will not elevate the slide 101 (Fig. 25) and consequently the early acting pitman 84 is left in engagement with the pin 82 of the invariably movable device coöperating with the special bank of keys, which device will, upon the very beginning of the operation of the machine, carry up the differential element 50 controlled by the special keys, and through the rack 109 rotate the shaft 118 which will, by means of the screw 122, secured to said shaft 118, shift the frames carrying the totalizers so as to bring the elements of the "balance charged" totalizer into position to be rocked into engagement with the actuators 111. After the "balance charged" totalizer has been positioned, the elements thereof will be rocked into engagement with the actuators 111 by the cam disk 152 (Fig. 30) and the pitman 183. The cam disk 68 (Fig. 1) will then draw the pitman rearwardly which will rock the shaft 58 counter clockwise, and through the arms 60 elevate the differentially movable elements 50 distances depending upon the amount and the clerks' keys depressed. This movement of the differential elements 50 controlled by the amount keys, will rotate the elements 136 of the "balance charged" totalizer in a direction to subtract therefrom. After the differential elements 50, carrying the actuators, have been adjusted, the arm 80 actuated by the early acting pitman 84, will be returned to normal position, and thereby return the differential element 50 controlled by the special bank of keys also to normal position.

This return of the special differential element will, through the rack 109 and the gear 117, shift the frame carrying the totalizers back to normal position, in which position the elements of the "received on account" totalizer are in operative relation with the actuators 110. Immediately after the totalizers have been shifted to their normal position the pitman 166 (Fig. 29) will be lowered, which movement will rock the frame 130 carrying the elements 135 of the "received on account" totalizer into engagement with the actuators 110. Now upon the return movement of the displaced differential elements 50 carrying the actuators 110, the amount represented by the keys depressed will be added upon the elements 135 of the "received on account" totalizer.

When the special differential element 50, carrying the rack 109 has been moved up far enough to bring the "balance charged" totalizer into coöperative relation with the actuators 111, the inner end of the depressed "receive on account" key will engage with the pivoted pawl 172 (Fig. 3) and rock said pawl and companion lever 174 about the pivot 173, and the lever 174 will in turn rock bell crank lever 177 so as to disconnect the latter from engagement with the lug 178 carried by the rack 109. The disengagement of the bell crank lever 177 from the lug 178 will permit an independent movement of the special differential element 50, this independent movement of the element 50 being for the purpose of bringing characters representing "received on account" into position to be displayed by the special indicator 312, while the "balance charged" totalizer is brought into coöperation with the actuators.

The differential elements 50 controlled by the amount and clerks' bank of keys, are provided with pins 255, (see Fig. 1), which rock bell crank levers 257 about the shafts 258 as said elements move upwardly. While these differential elements are held in their adjusted positions, an alining plate 261 will be rocked into notches 260 formed upon the bell crank levers, after which the roller 274, mounted in the upper ends of links 275, will be moved downwardly through the elongated slots 259 in said bell crank levers. This downward movement of the rollers 274 will contact with the sides of the pear shaped slots 281 formed in the plates 282 which are centrally pivoted upon the shaft 258 and rotate said plates about said shaft. The upper ends of these plates 282 are provided with rack teeth, which, as they are moved as before described, will rotate the pinions 284 secured to the amount and clerks' indicators 285 to exhibit at the front of the machine the amount of the transaction and the initial of the clerk making the transaction. These indicators 285 are connected by the segmental racks 286 and nested sleeves 287 to similar indicators for indicating at the back of the machine. The differential element 50 controlled by the special bank of keys, operates a special indicator 312 located above the amount and clerks' initial indicators in a somewhat similar manner, the only difference being that instead of employing a rigid bell crank similar to the bell crank 257, it is divided into two arms 289 and 290 with a one-way connection between said arms, this one-way connection between the arms 289 and 290 being necessary on account of the timing of the movement of the special differential element 50, which is different for the several transactions.

The centrally pivoted plates 282, which actuate the indicators as previously described, are connected by links 360 to the arms 361 projecting rearwardly from the horizontal shafts 362. These shafts at the extreme left hand end looking from the front of the machine, are provided with arms 363 which are similar to the arms 361 (Fig. 31) and to these arms 363 are connected links 364 which are also connected to the centrally pivoted levers 365 mounted upon the shaft 268. The forward ends of the levers 365 are connected to the lower ends of the links 366 which in turn are connected at their upper ends to the segmental rack plates 269, these rack plates meshing with the gears 371 connected with the type carriers 372. During the setting of the type carriers 372 a portion of the check strip 428 will be brought into position to have an impression taken thereon from the type carriers by the platen 440 while the platen 401 will record the transaction upon a record strip 398. After the impression mechanism is operated the lower portion of the check is severed by the knife 505 and the severed portion of the check strip drops by gravity through the chute 510 to the position shown in Fig. 31, from which it may be removed by the operator and given to the customer as a receipt. Upon the opposite side of this check from that in which the amount is recorded is printed any suitable advertisement and the date and consecutive number of the transaction.

When it is desired to reset the totalizers, the lever 563 is moved either upward or downward according to the totalizer that is to be reset. When moved in an upward direction the shaft 131 carrying the upper group of the totalizer elements 132 will be shifted longitudinally, so as to bring the notches 558 formed in said shaft, in coöperative relation with the pawls 559 carried by the totalizer elements 132. Upon the operation of the machine the gear 552 secured to the left hand end of the shaft 121 will be rotated by the gear 553 which in turn is rotated by the rack 555. Previous to this rotation of the shaft 131 the totalizer that is to be reset, is brought into coöperative relation with the actuators 110 carried by the differential elements 50, so that upon the return of the totalizer elements 132 to normal positions, the differential elements 50 carrying the actuating racks 110 will be elevated an extent determined by the movement of the elements 132 to normal zero position. This movement of the differential elements 50 will adjust, through suitable mechanism, the amount indicators 285 and the type carriers 372, after which the elements 132 are rocked out of engagement with the actuators and the latter restored to their normal position. If a totalizer of the lower group is to be reset, the same operation is gone through, with the exception that the lever 563 is moved downwardly, which movement will shift the shaft 135 to bring the notches 558 into coöperative relation with the pawls 559 of the totalizer elements 136. When the lever is moved in either direction the lockout levers 582 and 586 engage with the various snap pawls controlled by the slides actuated by the special keys, and thereby prevent the operation of the various pitmen which are brought into play during an operation of the machine, other than an operation in which one of the totalizers is reset. When the lever 563 is moved upwardly, the additional pitman 594 (Figs. 3 and 12) is brought into operative position to rock the totalizer frame 130 carrying the upper group of totalizer elements 132. When the lever 563 is moved downwardly, the additional pitman 611, see Fig. 40, is brought into position to actuate the frame 134 carrying the lower group of totalizer elements 136 while all of the other pitmen for actuating said frame are rendered inoperative.

With the above type of machine it will be seen that a complete auditing system is provided for any mercantile establishment; a system that enables the merchant to note the outstanding charges and the cash on hand, as well as the cash paid out, the cash received on account, and the credit sales. The object of having the "charge" totalizer and the "balance charged" totalizer is to enable the merchant to know exactly how much credit business has been done for a certain length of time, such as a day, week, or month; while the "balance charged" totalizer may represent at all times the outstanding credit business.

While the form of mechanism herein shown and described is admirably adapted to fulfil the objects primarily stated it is to be understood that it is not intended to confine the invention to the one form of embodiment herein shown and described as it is susceptible of embodiment in various forms all coming within the scope of the claims which follow.

What is claimed is:

1. In an accounting machine, the combination with a plurality of totalizers, of a set of differentially movable actuators therefor constructed to be moved from normal position and returned thereto during an operation of the machine, means for bringing one of said totalizers and actuators into coöperative relation previous to the movement of said actuators from normal position and for bringing another one of said totalizers and actuators into coöperative relation previous to the return movement of said actuators, and amount manipulative devices controlling the extent of movement imparted to the totalizer by the actuators.

2. In an accounting machine, the combination with a plurality of totalizers, of a set of differentially movable actuators therefor constructed to be moved from normal position and returned thereto during an operation of the machine, means for moving one of said totalizers into engagement with said actuators previous to the movement of the latter from normal position and for moving another of said totalizers into engagement with said actuators previous to the return movement of said actuators, and amount manipulative devices controlling the extent of movement imparted to the totalizer by the actuators.

3. In an accounting machine, the combination with a movable frame and a plurality of totalizers carried thereby, of a set of differentially movable actuators common to said totalizers and constructed to be moved from normal position and returned thereto during an operation of the machine, and means for moving the frame to bring one of the totalizers into position to be actuated by the actuators previous to the movement of the latter in one direction, and for moving the frame to bring another one of the totalizers into position to be actuated by the actuators previous to the movement of said actuators in the opposite direction.

4. In an accounting machine, the combination with a movable frame and a plurality of totalizers carried thereby, of a set of differentially movable actuators common to said totalizers and constructed to be moved from normal position and returned thereto during an operation of the machine, means for moving the frame to bring one of the totalizers into position to be actuated by the actuators previous to the movement of the latter in one direction and for moving the frame to bring another one of the totalizers into position to be actuated by the actuators previous to the movement of said actuators in the opposite direction, and means for rocking the positioned totalizers into engagement with the actuators.

5. In an accounting machine, the combination with a shiftable frame and a plurality of totalizers carried thereby, of a set of differentially movable actuators common to said totalizers and constructed to be moved from normal position and returned thereto during an operation of the machine, a worm gear for shifting the frame to bring one of the totalizers into position to be actuated by the actuators previous to the movement of the latter in one direction and for shifting the frame to bring another one of the totalizers into position to be actuated by the actuators previous to the movement of said actuators in the opposite direction, and means for rocking the positioned totalizers into engagement with the actuators.

6. In an accounting machine, the combination with a shiftable frame and a plurality of totalizers carried thereby, of a set of differentially movable actuators common to said totalizers and constructed to be moved from normal position and returned thereto during an operation of the machine, a worm gear for shifting the frame to bring one of the totalizers into position to be actuated by the actuators previous to the movement of the latter in one direction and for shifting the frame to bring another one of the totalizers into position to be actuated by the actuators previous to the movement of said actuators in the opposite direction, and means for rocking the frame and thereby carrying the positioned totalizers into engagement with the actuators.

7. In an accounting machine, the combination with a shiftable frame and a plurality of totalizers carried thereby, of a set of differentially movable actuators common to said totalizers and constructed to be moved from normal position and returned thereto during an operation of the machine, means for shifting the frame to bring one of the totalizers into position to be actuated by the actuators previous to the movement of the latter in one direction and for shifting the frame to bring another one of the totalizers into position to be actuated by the actuators previous to the movement of said actuators in the opposite direction, and means controlling the shifting of the frame.

8. In an accounting machine, the combination with a shiftable frame and a plurality of totalizers carried thereby, of a set of differentially movable actuators common to said totalizers and actuated to be moved from normal position and returned thereto during an operation of the machine, means for shifting the frame thereby bringing one of the totalizers into position to be actuated by the actuators previous to the movement of the latter in one direction and for shifting the frame thereby bringing another one of the totalizers into position to be actuated by the actuators previous to the movement of said actuators in the opposite direction, a manipulative device controlling the shifting of the frame, and means for rocking the frame and thereby carrying the positioned totalizers into engagement with the actuators.

9. In an accounting machine, the combination with operating mechanism, of a plurality of totalizers, a set of differentially movable actuators therefor normally out of engagement therewith and constructed to be moved from normal position and returned thereto during an operation of the machine, and means for establishing a coöperative relation between the actuators and different totalizers at different times during an operation of the machine.

10. In an accounting machine, the combination with operating mechanism, of a plurality of totalizers, a set of differentially movable actuators therefor and normally out of coöperative relation therewith, and means for establishing a coöperative relation between the actuators and different totalizers at different times during an operation of the machine.

11. In an accounting machine, the combination with operating mechanism, of a plurality of totalizers, a set of differentially movable actuators therefor and normally out of engagement therewith, and means for moving different totalizers into engagement with the actuators at different times during an operation of the machine.

12. In an accounting machine, the combination with operating mechanism, of a movable frame, and a plurality of totalizers carried thereby, a set of differentially movable actuators for said totalizers, and means for moving the frame to carry different totalizers into position to be actuated by the actuators at different times during an operation of the machine.

13. In an accounting machine, the combination with a frame movable in different directions and a plurality of totalizers carried thereby, of a set of differentially movable actuators for said totalizers, and means for moving the frame to carry different totalizers into position to be actuated by the actuators and then moving the frame to carry the positioned totalizers into engagement with the actuators at different times during an operation of the machine.

14. In an accounting machine, the combination with a plurality of totalizers each comprising a plurality of denominational elements, the same denominational elements of all of the totalizers being grouped, of a set of actuators common to the elements of the totalizers, and means for establishing a coöperative relation between the actuators and different totalizers at different times during an operation of the machine.

15. In an accounting machine, the combination with a plurality of totalizers each comprising a plurality of denominational elements, the same elements of all the totalizers being grouped, of a set of actuators common to the elements of the totalizers, and means for moving different totalizers into engagement with the actuators at different times during an operation of the machine.

16. In an accounting machine, the combination with a movable frame and a plurality of totalizers carried thereby, each of said totalizers comprising a plurality of denominational elements, of a shaft supporting the same denominational elements in groups, a set of actuators common to the elements of the totalizers, and means for moving the frame to carry different totalizers into position to be actuated by the actuators at different times during an operation of the machine.

17. In an accounting machine, the combination with a movable frame and a plurality of totalizers carried thereby, each of said totalizers comprising a plurality of denominational elements, of a shaft supporting the same denominational elements in groups, a set of actuators common to the elements of the totalizers, and means for moving the frame to carry different totalizers into position to be actuated by the actuators and then moving the frame to carry the elements of the positioned totalizers into engagement with the actuators at different times during an operation of the machine.

18. In an accounting machine, the combination with operating mechanism, of a pair of totalizers, a set of differentially movable actuators therefor, and means for establishing coöperative relation between the actuators and the totalizers at different times during an operation of the machine so as to add on one of the totalizers and to subtract from the other.

19. In an accounting machine, the combination with operating mechanism, of a pair of totalizers, of a set of differentially movable actuators therefor, and means for moving the totalizers into engagement with the actuators at different times during an operation of the machine so as to add on one of the totalizers and to subtract from the other.

20. In an accounting machine, the combination with operating mechanism, of a movable frame and a pair of totalizers carried thereby, a set of differentially movable actuators for said totalizers, and means for moving the frame to carry the totalizers into position to be actuated by the actuators at different times during an operation of the machine so as to add on one of the totalizers and to subtract from the other.

21. In an accounting machine, the combination with a movable frame and a pair of totalizers carried thereby, of a set of differentially movable actuators for said totalizers, and means for moving the frame, thereby positioning the totalizers relative to the actuators, and then moving the frame to carry the positioned totalizers into engagement with the actuators at different times during an operation of the machine so as to add on one of the totalizers and to subtract from the other.

22. In an accounting machine, the combination with a movable frame and a pair of totalizers carried thereby, each of said totalizers comprising a plurality of denominational elements, of a shaft supporting the elements of the same denominations in groups, a set of actuators common to the elements of the totalizers, and means for moving the frame, thereby positioning the totalizers relative to the actuators, and then moving the frame to carry the elements of the positioned totalizers into engagement with the actuators at different times during an operation of the machine so as to add on one of the totalizers and to subtract from the other.

23. In an accounting machine, the combination with a pair of totalizers representing "balance charged" and "cash on hand", of a set of differentially movable actuators common to said totalizers and constructed to be moved from normal position and returned thereto during an operation of the machine, and means for establishing a coöperative relation between the actuators and the totalizers at different times during an operation of the machine so as to add to the "cash on hand" totalizer while the actuators are moving in one direction and to subtract from the "balance charged" totalizer while the actuators are moving in the opposite direction.

24. In an accounting machine, the combination with a pair of totalizers representing "balance charged" and "cash on hand", of a set of differentially movable actuators common to said totalizers and constructed to be moved from normal position and returned thereto during an operation of the machine, and means for moving the totalizers into engagement with the actuators at different times during an operation of the machine so as to add to the "cash on hand" totalizer while the actuators are moving in one direction and to subtract from the "balance charged" totalizer while the actuators are moving in the opposite direction.

25. In an accounting machine, the combination with a movable frame and a pair of totalizers representing "balance charged"

and "cash on hand" carried thereby, of a set of differentially movable actuators common to said totalizers and constructed to be moved from normal position and returned thereto during an operation of the machine, and means for moving the frame, thereby positioning the totalizers relative to the actuators, and then moving the frame to carry the positioned totalizers into engagement with the actuators at different times during an operation of the machine, so as to add to the "cash on hand" totalizer while the actuators are moving in one direction and to subtract from the "balance charged" totalizer while the actuators are moving in the opposite direction.

26. In an accounting machine, the combination with a frame and a plurality of totalizers mounted thereon in axial alinement, of a set of actuators common to said totalizers, a plurality of cams and connections for shifting the frame to bring the totalizers into position to be actuated by the actuators, and a series of keys for determining which cam is to be used in shifting the frame.

27. In an accounting machine, the combination with a frame and a plurality of totalizers carried thereby, of a set of actuators common to said totalizers, a worm gear for shifting the frame to bring the totalizers into position to be actuated by the actuators, a differentially movable rack bar for rotating the worm gear, a plurality of cams for driving the rack bar, and a series of keys for determining which cam is to be used in driving the rack bar.

28. In an accounting machine, the combination with a frame and a plurality of totalizers carried thereby, of a set of actuators common to said totalizers, means for shifting the frame to bring any one of the totalizers into position relative to the actuators and then rocking the frame to swing the totalizer into engagement with the actuators, and a series of keys controlling the shifting and the rocking of the frame.

29. In an accounting machine, the combination with a frame and a plurality of totalizers carried thereby, of a set of actuators common to said totalizer, a cam and connections for shifting the frame to bring any one of the totalizers into position relative to the actuators, a second cam and connections for rocking the frame to carry the positioned totalizer into engagement with the actuators, and a series of keys controlling the shifting and rocking connections of the frame.

30. In an accounting machine, the combination with a frame and a plurality of totalizers carried thereby, of a set of actuators common to said totalizers, a plurality of cams and connections for shifting the frame to bring the totalizers into position relative to the actuators, means for rocking the frame to carry the positioned totalizer into engagement with the actuators, and a series of keys for determining which cam is to be used in shifting the frame and for controlling the rocking means for said frame.

31. In an accounting machine, the combination with a pair of movable frames and a plurality of totalizers carried by each frame, of differentially movable elements, a pair of actuators carried by each element, means for shifting the frames as a unit to bring one of the totalizers into coöperative relation with one set of actuators and then moving the frames to bring another of the totalizers into coöperative relation with the second set of actuators.

32. In an accounting machine, the combination with a pair of movable frames and a plurality of totalizers carried by each frame, of differentially movable elements, a pair of actuators carried by each element, means for shifting the frames as a unit to bring one of the totalizers into position relative to one set of actuators and then shifting the frames to bring another of the totalizers into position relative to the second set of actuators, and means for rocking the positioned totalizers into engagement with their respective actuators.

33. In an accounting machine, the combination with a pair of movable frames and a plurality of totalizers carried by each frame, of differentially movable elements, a pair of actuators carried by each element, manipulative devices controlling the extent of movement of the differentially movable elements, means for shifting the frames as a unit to bring one of the totalizers into coöperative relation with one set of actuators and then moving the frames to bring another of the totalizers into coöperative relation with the second set of actuators, and additional manipulative devices controlling the shifting of the frames.

34. In an accounting machine, the combination with a pair of movable frames and a plurality of totalizers carried by each frame, of differentially movable elements constructed to be moved from normal position and returned thereto during an operation of the machine, a pair of actuators carried by each element and means for shifting the frames as a unit to bring one of the totalizers into coöperative relation with one set of actuators previous to the movement of the differentially movable elements in one direction, and then shifting the frames to bring another of the totalizers into coöperative relation with the second set of actuators previous to the movement of the differential elements in the opposite direction.

35. In an accounting machine, the combination with a group of totalizers, of a set of actuators common thereto, a second group of totalizers, a second set of actuators common to the second group of totalizers, differentially movable elements carrying both sets of actuators, and means for establishing a coöperative relation between a totalizer of each group and its set of actuators during an operation of the machine.

36. In an accounting machine, the combination with a group of totalizers, of a set of actuators common thereto, a second group of totalizers, a second set of actuators common to the second group of totalizers, differentially movable elements carrying both sets of actuators, manipulative devices controlling the movement of the differentially movable elements, and additional manipulative devices for determining the totalizers that are to be actuated by the sets of actuators during an operation of the machine.

37. In an accounting machine, the combination with a group of totalizers, of a set of actuators common to the totalizers, a second group of totalizers, a second set of actuators common to the second group of totalizers, differentially movable elements carrying both sets of actuators, and a manipulative device controlling the operative engagement of one of the totalizers of the first mentioned group with its actuators and controlling the operative engagement of one of the totalizers of the second mentioned group with its actuators during an operation of the machine.

38. In an accounting machine, the combination with a movable frame and a group of totalizers carried thereby, of a set of actuators common to the totalizers, a second movable frame and a group of totalizers carried thereby, a second set of actuators common to the second group of totalizers, differentially movable elements carrying both sets of actuators, a manipulative device for controlling the shifting of the frames as a unit to bring one of the totalizers of the first mentioned frame into position to be operated by its actuators and then controlling the shifting of the frames to bring one of the totalizers of the second mentioned frame into position to be actuated by its actuators, and means for shifting the frames.

39. In an accounting machine, the combination with a plurality of totalizers upon which are registered cash received on account, credit sales, and cash sales, of a set of actuators for the cash received on account totalizer, a second set of actuators common to the credit sales and cash sales totalizers, and means for operating the actuators during an operation of the machine so as to add on the cash received on account and cash sales totalizers and subtract from the credit sales totalizer.

40. In an accounting machine, the combination with a plurality of totalizers upon which are registered cash sales, credit sales and cash received on account, of a plurality of differentially movable elements, two sets of actuators carried by said elements, and means for establishing coöperative relation between the totalizers and their respective actuators at different times during an operation of the machine so as to subtract from the credit sales totalizer and add to the cash sales and cash received on account totalizer.

41. In an accounting machine, the combination with a plurality of totalizers upon which are registered cash sales, credit sales, and cash received on account, of a plurality of differentially movable elements constructed to be moved from normal position and returned thereto during an operation of the machine, two sets of actuators carried by said elements, and means for establishing coöperative relation between the credit sales totalizer and one set of actuators previous to the movement of the differentially movable elements in one direction and for establishing coöperative relation between the cash sales and cash received on account totalizers and the other set of actuators previous to the movement of the differentially movable elements in the opposite direction so as to subtract from the credit sales totalizer and add to the cash sales and cash received on account totalizers.

42. In an accounting machine, the combination with a plurality of totalizers upon which are registered cash sales, credit sales, and cash received on account, of a plurality of differentially movable elements constructed to be moved from normal position and returned thereto during an operation of the machine, two sets of actuators carried by said elements, means for rocking the credit sales totalizer into engagement with one set of actuators previous to the movement of the differentially movable elements thereby subtracting from the totalizer as said elements are moved from normal position, and means for rocking the cash sales and cash received on account totalizers into engagement with the other set of actuators previous to the return movement of the differentially movable elements thereby adding to said totalizers as said elements are returned to normal position.

43. In an accounting machine, the combination with two totalizers upon which are registered cash sales and cash paid out, of actuators for each totalizer, differentially movable elements carrying both sets of actuators and constructed to be moved from normal position and returned thereto during an operation of the machine, and means for establishing coöperative relation between the totalizers and their respective actuators during the movement of the said actuators in different directions so as to subtract from the cash sales totalizer and to add to the cash paid out totalizer.

44. In an accounting machine, the combination with two totalizers upon which are registered cash sales and cash paid out, of actuators for each totalizer, differentially movable elements carrying both sets of actuators and constructed to be moved from normal position and returned thereto during an operation of the machine, and means for moving the totalizers into engagement with their respective actuators during the movement of the differentially movable elements in opposite directions so as to subtract from the cash sales totalizer and to add to the cash paid out totalizer.

45. In an accounting machine, the combination with two totalizers upon which are registered cash sales and cash paid out, of actuators for each totalizer, differentially movable elements carrying both sets of actuators and constructed to be moved from normal position and returned thereto during an operation of the machine, a "paid out" key, and means controlled thereby for establishing coöperative relation between the totalizers and their respective actuators during the movement of the differentially movable elements in different directions so as to subtract from the cash sales totalizer and to add to the cash paid out totalizer.

46. In an accounting machine, the combination with two totalizers upon which are registered credit sales and cash received on account, of actuators for each totalizer, differentially movable elements carrying both sets of actuators and constructed to be moved from normal position and returned thereto during an operation of the machine, a "received on account" key, and means controlled thereby for establishing coöperative relation between the totalizers and their respective actuators during the movement of the differentially movable elements in different directions so as to subtract from the credit sales totalizer and to add to the cash received on account totalizer.

47. In an accounting machine, the combination with two totalizers upon which are registered credit sales and cash received on account, of actuators for each totalizer, differentially movable elements carrying both sets of actuators and constructed to be moved from normal position and returned thereto during an operation of the machine, a "received on account" key, and means controlled thereby for moving the totalizers into engagement with their respective actuators during the movement of the differentially movable elements in opposite directions so as to subtract from the credit sales totalizer and to add to the cash received on account totalizer.

48. In an accounting machine, the combination with a plurality of totalizers, of a set of differentially movable actuators therefor, means for establishing coöperative relation between the totalizers and actuators at different times during an operation of the machine so as to add on one of the totalizers and subtract from another, and means for imparting to said actuators an additional movement to effect a transfer while said actuators are moving in either an adding or a subtracting direction.

49. In an accounting machine, the combination with a plurality of totalizers, of a set of differentially movable actuators therefor constructed to be moved from normal position and returned thereto during an operation of the machine, means for establishing coöperative relation between one of the totalizers and the actuators previous to the movement of the latter from normal position and then disestablishing such relation and establishing coöperative relation between another of the totalizers and the actuators previous to the return movement of the actuators so as to add upon one of the said totalizers and subtract from another, and means for imparting to said actuators an additional movement to effect a transfer while said actuators are moving in either direction.

50. In an accounting machine, the combination with a plurality of totalizers, of a set of differentially movable actuators therefor, means for moving the totalizers into engagement with the actuators at different times during an operation of the machine so as to add on one of the totalizers and subtract from another, and means for imparting to said actuators an additional movement to effect a transfer while said actuators are moving in either an adding or a subtracting direction.

51. In an accounting machine, the combination with a plurality of totalizers, of a set of differentially movable actuators therefor constructed to be moved from normal position and returned thereto during an operation of the machine, means for moving one of the totalizers into engagement with the actuators previous to the movement of the latter from normal position and then removing the totalizer from engagement and moving another of the totalizers into engagement with the actuators previous to the return movement of the actuators so as to add upon one of the said totalizers and subtract from another, and means for imparting to said actuators an additional movement to effect a transfer while said actuators are moving in either direction.

52. In an accounting machine, the combination with a plurality of totalizers, of a set of differentially movable actuators therefor, means for establishing coöperative relation between the totalizers and actuators at different times during an operation of the machine so as to add on one of the totalizers and subtract from another, springs for imparting to said actuators an additional movement to effect a transfer while said actuators are moving in either an adding or a subtracting direction, and means for tensioning said springs.

53. In an accounting machine, the combination with a plurality of totalizers, of a set of differentially movable actuators constructed to be moved from normal position and returned thereto during an operation of the machine, means for establishing coöperative relation between one of the totalizers and actuators previous to the movement of the latter from normal position and then disestablishing such relation and establishing coöperative relation between another of the totalizers and actuators previous to the return movement of the actuators so as to add upon one of said totalizers and subtract from another, springs for imparting to said actuators an additional movement to effect a transfer while said actuators are moving in either direction, means for tensioning the springs, and pawls for latching the actuators while said springs are being tensioned.

54. In an accounting machine, the combination with two totalizers, of actuators for each totalizer, differentially movable elements carrying both sets of actuators and constructed to be moved from normal position and returned thereto during an operation of the machine, means for establishing coöperative relation between one of the totalizers and its actuators as the differentially movable elements are moved from normal position and then disestablishing such relation and establishing coöperative relation between the other totalizer and its actuators previous to the return movement of the differential elements so as to add upon one of the totalizers and subtract from the other, and means for imparting an additional movement to either set of actuators thereby effecting a transfer.

55. In an accounting machine, the combination with two totalizers, of actuators for each totalizer, differentially movable elements carrying both sets of actuators and constructed to be moved from normal position and returned thereto during an operation of the machine, means for moving one of the totalizers into engagement with its actuators as the differentially movable elements are moved from normal position and then removing said totalizer from engagement with its actuators previous to the return movement of the differential elements, so as to add upon one of the totalizers and subtract from the other, and means for imparting an additional movement to either set of actuators thereby effecting a transfer.

56. In an accounting machine, the combination with two totalizers, of actuators for each totalizer, differentially movable elements carrying both sets of actuators, means for establishing coöperative relation between the totalizers and their respective actuators, and independent means for imparting to each set of actuators an additional movement independently of the differentially movable elements thereby effecting a transfer.

57. In an accounting machine, the combination with two totalizers, of actuators for each totalizer, differentially movable elements carrying both sets of actuators, means for establishing coöperative relation between the totalizers and their respective actuators, independent means for imparting to each set of actuators an additional movement independently of the differentially movable elements thereby effecting a transfer, and means for restoring the actuators to their normal positions relative to the differential elements after the transfer has been effected.

58. In an accounting machine, the combination with two totalizers, of actuators for each totalizer, differentially movable elements carrying both sets of actuators, means for establishing coöperative relation between the totalizers and their respective actuators, springs for each set of actuators for imparting thereto an additional movement independently of the differentially movable elements, thereby effecting a transfer, and means common to both sets of actuators for restoring the same to their normal positions relative to the differential elements after the transfer has been effected.

59. In an accounting machine, the combination with a totalizer comprising a plurality of movable elements, of differentially movable actuators for said elements constructed to be moved from normal position and returned thereto during an operation of the machine, means for establishing coöperative relation between the elements of the totalizer and the actuators as the latter are moved in either direction so as to add to or subtract from the totalizer, a pair of springs for each actuator designed to impart an additional movement to the actuators in the same direction in which the actuators are moving to effect a transfer, and means for successively tensioning said springs.

60. In an accounting machine, the combination with a totalizer comprising a plurality of movable elements, of differentially movable actuators for said elements constructed to be moved from normal position and returned thereto during an operation of the machine, means for moving the totalizer elements into engagement with the actuators as the latter are moved in either direction so as to add to or subtract from the totalizer, a pair of springs for each actuator designed to impart an additional movement to the actuators in the same direction in which the actuators are moving to effect a transfer, and means for successively tensioning said springs.

61. In an accounting machine, the combination with a totalizer comprising a plurality of movable wheels, of actuators for said wheels, differentially movable elements carrying said actuators and constructed to be moved from normal position and returned thereto during an operation of the machine, means for rocking the totalizer wheels into engagement with the actuators as the latter are moved in either direction so as to add to or subtract from the totalizer, a pair of springs for each actuator designed to impart an additional movement to the actuators in the same direction they are moving, independently of the differentially movable elements to effect a transfer, means for successively tensioning said springs during each operation, pawls for latching said actuators in normal position relative to the differentially movable elements, and devices carried by the totalizer wheels for tripping the pawls, thereby permitting the springs to effect an additive or subtractive transfer.

62. In an accounting machine, the combination with a determining member, of a series of keys for differentially adjusting said member, a device having an invariable movement at each operation of the machine, and an element operated by said device an extent determined by the determining member and while said member is in its adjusted position.

63. In an accounting machine, the combination with a determining member, of manipulative devices for differentially adjusting said member, means for locking said member in its adjusted position, a device having an invariable movement at each operation of the machine, and an element operated by said device an extent determined by the determining member, and while said member is in its locked adjusted position.

64. In an accounting machine, the combination with a determining member, of manipulative devices for differentially adjusting said member, means for locking said member in its adjusted position, an element constructed to be moved an extent determined by the adjusted position of the determining member, the said element having a slot formed therein and a device playing in said slot and having an invariable movement at each operation of the machine, for moving the element an extent determined by the determining member while the latter is locked.

65. In an accounting machine, the combination with a differentially movable element having a slot formed therein, of a determining member and means for differentially adjusting it across the slot of the movable element, and a device playing in the slot and constructed to move idly therein until it contacts with the determining element after which it imparts the rest of its movement to the differentially movable element, and means for imparting an invariable movement to said device.

66. In an accounting machine, the combination with a differentially movable element, of a device having the same degree of movement at each operation of the machine and normally in the same course, and a differentially adjustable determining member for deflecting the course of the said device and thereby actuating the movable element differentially.

67. In an accounting machine, the combination with a differentially movable element, of a device having the same degree of movement at each operation of the machine and normally in the same course, a differentially adjustable determining member for deflecting the course of said device, thereby actuating the movable element differentially, and means for locking the determining member in its adjusted position.

68. In an accounting machine, the combination with a differentially movable element having an inclined slot formed therein, of a device playing in said slot and having the same degree of movement at each operation of the machine, and a differentially adjustable member for deflecting the course of said device thereby actuating the movable element differentially.

69. In an accounting machine, the combination with a differentially movable element, of a device having the same degree of movement at each operation of the machine and normally in the same course, a differentially adjustable member for deflecting the course of said device thereby actuating the movable element differentially, and means preventing the overthrow of the differentially movable element.

70. In an accounting machine, the combination with a differentially movable element having an inclined slot formed therein, of a device playing in said slot and having the same degree of movement at each operation of the machine, a differentially adjustable member for deflecting the course of said device thereby actuating the movable element differentially, and means preventing overthrow of the differentially movable element.

71. In an accounting machine, the combination with a differentially movable element, of a device having the same degree of movement at each operation of the machine and normally in the same course, a differentially adjustable member for deflecting the course of said device thereby actuating the movable element differentially, and means carried by the deflecting member for preventing overthrow of the differentially movable element.

72. In an accounting machine, the combination with a differentially movable element having an inclined slot formed therein, of a device playing in said slot and having the same degree of movement at each operation of the machine, a differentially adjustable member for deflecting the course of said device thereby actuating the movable element differentially, means for locking the deflecting member in its adjusted position, and means carried by said deflecting member for preventing overthrow of the differentially adjustable member.

73. In an accounting machine, the combination with a differentially movable element, of a totalizer element actuated thereby, means for establishing coöperative relation between said elements, a device for operating the differentially movable element and having the same degree of movement at each operation of the machine, and a differentially adjustable member for deflecting the operating device from its normal course, thereby actuating the differentially movable element.

74. In an accounting machine, the combination with a differentially movable element, of a totalizer element actuated thereby, means for rocking the totalizer element into engagement with the differentially movable element, a device for operating the latter element and having the same degree of movement at each operation of the machine, and a differentially adjustable member for deflecting the operating device from its normal course thereby actuating the differentially movable element.

75. In an accounting machine, the combination with a differentially movable element, of an indicator controlled thereby, a device for operating the differentially movable element and having the same degree of movement at each operation of the machine, and a differentially adjustable member for deflecting the operating device from its normal course thereby actuating the differentially movable element.

76. In an accounting machine, the combination with a differentially movable element, of an operating device therefor having the same degree of movement at each operation of the machine, a differentially adjustable member for deflecting the operating device from its normal course thereby actuating the differentially movable element, an indicator controlled as to its extent of movement by said differentially movable element, and means for moving said indicator subsequently to the movement of the differential element.

77. In an accounting machine, the combination with a differentially movable element having an inclined slot formed therein, of an operating device therefor playing in said slot and having the same degree of movement at each operation of the machine, a differentially adjustable member for deflecting the operating device from its normal course thereby actuating the differentially movable element, an indicator controlled as to its extent of movement by said differentially movable element, and means for moving the indicator subsequently to the movement of the differential element.

78. In an accounting machine, the combination with a differentially movable indicator, of a frame carrying a plurality of totalizers, a set of actuators common to the totalizers, means for controlling this movement of the frame to bring any one of the totalizers into coöperative relation with the actuators and for controlling the indicator to display a character designating the totalizer that is in such relation, and means permitting movement of the totalizer frame controlling means independently of the totalizer frame for the purpose described.

79. In an accounting machine, the combination with a frame carrying a plurality of totalizers, of a set of actuators common thereto, an indicator bearing a plurality of characters, and means common to the totalizer frame and the indicator for moving the frame to bring the same totalizer into coöperative relation with the actuators upon successive operations of the machine at the same time moving the indicator to display different characters.

80. In an accounting machine, the combination with a frame carrying a plurality of totalizers, of a set of actuators common thereto, an indicator bearing a plurality of characters for designating which totalizer is in coöperative relation with the actuators, means for moving the frame successively to bring the totalizers into coöperative relation with the actuators during an operation of the machine, and means controlled by the moving means for the totalizer frame for actuating the indicator to display a character designating one only of the totalizers brought into coöperative relation with the actuators.

81. In an accounting machine, the combination with a frame carrying a plurality of totalizers, of a set of actuators common thereto, a differentially movable element for moving the frame successively to establish coöperative relation between the totalizers and the actuators during an operation of the machine, an indicator bearing a plurality of characters for designating the totalizer brought into coöperative relation with the actuators, the said indicator being controlled by the differentially movable element, and means permitting a movement of the differentially movable element independently of the totalizer frame for the purpose described.

82. In an accounting machine, the combination with a plurality of totalizers, of a set of actuators common thereto, means for successively establishing coöperative relation between the totalizers and the actuators during an operation of the machine, and means for displaying a character designating one only of the totalizers with which coöperative relation with the actuators has been established.

83. In an accounting machine, the combination with a totalizer constructed to have added thereon credit sales and to have subtracted therefrom cash received on account, of a second totalizer constructed to have added thereon cash received on account only, a set of actuators common to both of said totalizers, means, when a cash received on account transaction is to be entered in the machine, for successively establishing coöperative relation between said totalizers and actuators so as to subtract from the credit sales totalizer and to add on the cash received on account totalizer, and an indicator controlled by the means for establishing coöperative relation between said totalizers and the actuators for displaying "Received on account" only although coöperative relation is established between both totalizers and the actuators during an operation of the machine.

84. In an accounting machine, the combination with a totalizer constructed to have added thereon credit sales and to have subtracted therefrom cash received on account, of a second totalizer constructed to have added thereon cash received on account only, a set of actuators common to both of said totalizers, a differentially movable element and connections, when a cash received on account transaction is entered in the machine, for successively establishing coöperative relation between said totalizers and actuators so as to subtract from the credit sales totalizer and to add on the cash received on account totalizer, an indicator, bearing a plurality of characters for designating which totalizer is in coöperative relation with the actuators, and controlled by the differentially movable element, and means permitting independent movement of the differentially movable element after it has established coöperative relation between the credit sales totalizer and the actuators for the purpose described.

85. In an accounting machine, the combination with a totalizer constructed to have added thereon credit sales and to have subtracted therefrom cash received on account, of a second totalizer constructed to have added thereon cash received on account, a frame supporting said totalizers, a set of actuators common to both of the totalizers, a device for moving the frame to establish coöperative relation between the totalizers and the actuators, a differentially movable element carrying said device and having a movement independent thereof for the purpose described, and means controlling the independent movement of the differentially movable element.

86. In an accounting machine, the combination with a totalizer constructed to have added thereon credit sales and to have subtracted therefrom cash received on account, of a second totalizer constructed to have added thereon cash received on account, a set of actuators common to both of the totalizers, a device having connections for establishing coöperative relation between the totalizers and the actuators, a differentially movable element carrying said device and having a movement independent thereof, means normally preventing such independent movement, and a series of keys controlling the differential movement of the element, one of said keys being constructed to operate the means preventing independent movement of the said element, to permit such movement, for the purpose described.

87. In an accounting machine, the combination with a totalizer constructed to have added thereon credit sales and to have subtracted therefrom cash received on account, of a second totalizer constructed to have added thereon cash received on account, a set of actuators common to both of the totalizers, a device having connections for establishing coöperative relation between the totalizers and the actuators, a differentially movable element carrying said device and having a movement independent thereof, a pivoted latching device normally preventing such independent movement, and a series of keys controlling the differential movement of said element, one of said keys being constructed to trip the latching device and thereby permit the independent movement of the differential element for the purpose described.

88. In an accounting machine, the combination with a frame and a plurality of totalizers carried thereby, of a set of actuators common to said totalizers, a device having connections for moving the frame to establish coöperative relation between the totalizers and the actuators, a differentially movable element carrying said device and having a movement independent thereof, an indicator controlled by the differentially movable element for displaying a character designating the totalizer that is in coöperative relation with the actuators, means normally preventing the movement of the differentially movable element independently of the device carried thereby, and a series of keys controlling the movement of the differential element, one of said keys being constructed to operate the preventing means to permit the independent movement of the differentially movable element.

89. In an accounting machine, the combinations with a plurality of special counters upon which are registered the number of the different classes of transactions entered in the machine, of an actuating device for each of the special counters, a shaft carrying a plurality of fingers one for each actuating device, only one of said fingers being in operative relation with its actuating device at a time, a differentially movable element and connections for shifting the shaft to bring any one of the fingers on said shaft into operative relation with its actuating device during the operation of the machine, a series of keys controlling the movement of the differentially movable element, and means for rocking the shaft after it has been positioned properly.

90. In an accounting machine, the combination with a plurality of special counters upon which are registered the number of the different classes of transactions entered in the machine, of an actuating device for each of the special counters, a shaft carrying a plurality of fingers one for each actuating device, one only of said fingers being in operative relation with its actuating device at a time, an indicator geared to said shaft, a differentially movable element having connections for controlling the movement of the indicator to display the kind of transaction entered in the machine and the shifting of the shaft to bring any one of the fingers on said shaft into operative relation with its actuating device during an operation of the machine, a series of keys controlling the movement of the differentially movable element, and means for rocking the shaft to actuate the counter corresponding to the transaction displayed by the indicator.

91. In an accounting machine, the combination with an operating means therefor, of a stationary platen, a movable frame carrying a plurality of type carriers, normally broken toggle levers connected to said frame, and means actuated by the operating means for straightening said toggle levers to force the type carriers carried by the frame toward the platen to take an impression upon a check strip passing between the type carriers and the platen.

92. In an accounting machine, the combination with an operating mechanism therefor, of a plurality of type carriers, manipulative devices controlling the differential adjustment of said type carriers, a movable platen for taking an impression from said type carriers upon one side of a check strip, a pair of normally broken toggle levers connected to the platen, a movable frame and devices carried thereby for recording upon the opposite side of the check strip, a stationary platen against which the check strip is forced upon the movement of the frame carrying the recording devices, a second pair of normally broken toggle levers connected to the movable frame, and means actuated by the operating mechanism for straightening both pairs of toggle levers to cause impressions to be made upon opposite sides of the check strip.

93. In an accounting machine, the combination with a plurality of type carriers and a movable platen for taking an impression upon one side of a check strip therefrom, of a stationary platen, a movable frame and devices carried thereby for recording upon the opposite side of said check strip, an operating mechanism, and means actuated thereby for moving the platen toward the type carriers and for moving the frame carrying the recording devices toward the stationary platen thereby causing impressions to be made upon opposite sides of the check strip.

94. In an accounting machine, the combination with type carriers, of means for taking an impression therefrom upon a check strip, a movable frame, and devices carried thereby for gripping the check and feeding same upon the movement of said frame.

95. In an accounting machine, the combination with type carriers, of means for taking an impression therefrom upon a check strip, a movable frame, devices carried thereby for gripping the check strip, and means for first operating the gripping devices and then the frame.

96. In an accounting machine, the combination with type carriers, of means for taking an impression therefrom upon a check strip, a movable frame, a roller carried thereby, a pivoted device also carried by the frame, and means for first operating the pivoted device to grip the check against the periphery of the roller and then moving the frame to feed the check strip.

97. In an accounting machine, the combination with type carriers, of means for taking an impression therefrom upon a check strip, a movable frame, devices carried thereby for gripping the check strip, means for operating the gripping devices and by said devices operating the frame, and means retarding the movement of the frame for the purpose described.

98. In an accounting machine, the combination with type carriers, of means for taking an impression therefrom upon a check strip, a movable frame, devices carried thereby for gripping the check strip, means for operating the gripping devices and by said devices operating the frame, and resistant devices for retarding the movement of the frame for the purpose described.

99. In an accounting machine, the combination with a movable member, of devices carried thereby for gripping a check strip, and means for first operating the gripping devices and then the movable member to feed the check strip.

100. In an accounting machine, the combination with a movable member, of devices carried thereby for gripping a check strip, means for operating the gripping devices and by said devices operating the frame to feed the check strip, and means retarding the movement of the frame for the purpose described.

101. In an accounting machine, the combination with operating mechanism, of an inking ribbon, spools carrying said ribbon, an element actuated by the operating mechanism and having an invariable movement at each operation of the machine, a member frictionally driven by the element having a constant movement, pawls carried by the frictionally driven member for feeding the ribbon from one spool to the other, and devices carried by the invariably movable member for acting upon the pawls so as to reverse the feed of the ribbon.

102. In an accounting machine, the combination with operating mechanism, of an inking ribbon, spools carrying said ribbon, a slide actuated by the operating mechanism and having an invariable movement at each operation of the machine, a second slide and pawls carried thereby for feeding the ribbon from one spool to the other, a frictional device carried by the first slide for driving the second slide, and pivoted blocks carried by the first slide and playing in angled slots formed in the second slide for acting upon the feeding pawls and controlling the direction of feed of said ribbon.

103. In an accounting machine, the combination with type carriers for recording items and the total thereof, of a totalizer comprising a plurality of wheels, a shaft supporting said wheels, actuators for the wheels of the totalizer, and also controlling the type carriers, means for rotating the shaft at each operation of the machine, a manipulative device for shifting the shaft to couple it to the wheels of the totalizer, and means for connecting the wheels of the totalizer and their actuators when the shaft and wheels are coupled and then actuating the shaft rotating means to reset the wheels to zero, whereby the type carriers are moved a proportionate distance so as to record the total during an operation of the machine.

104. In an accounting machine, the combination with a totalizer comprising a plurality of wheels, of a shaft supporting said wheels, actuators for the wheels of the totalizer, means for rotating the supporting shaft at each operation of the machine, and a manipulative device for coupling the shaft and wheels so as to reset the wheels of the totalizer during an operation of the machine.

105. In an accounting machine, the combination with a totalizer comprising a plurality of wheels, of a shaft supporting said wheels, actuators for the wheels of the totalizer, means for rotating the supporting shaft at each operation of the machine, and a manipulative device shifting the shaft and coupling it to the wheels thereby causing resetting of the wheels of the totalizer upon an operation of the machine.

106. In an accounting machine, the combination with a totalizer comprising a plurality of wheels, of a shaft supporting said wheels, pawls carried by the wheels, notches formed in the shaft, the said notches and pawls being normally out of operative relation, means for rotating the shaft at each operation of the machine, and a manipulative device for shifting the shaft and placing the notches therein in operative relation with the pawls carried by the wheels, thereby causing resetting of the wheels of the totalizer upon an operation of the machine.

107. In an accounting machine, the combination with a plurality of totalizers each comprising a plurality of wheels, of a shaft for supporting the wheels of all of the totalizers, a set of actuators common to the totalizers, means for rotating the supporting shaft at each operation of the machine, a manipulative device for shifting the shaft and placing it in position to be connected to the wheels of one of the totalizers, means for shifting the wheels of the totalizers as a unit to bring the wheels of one of the totalizers into position to be connected to the shaft to reset the wheels connected thereto during an operation of the machine, and a series of keys for determining which set of totalizer wheels is to be connected to the shaft.

108. In an accounting machine, the combination with a plurality of totalizers, each comprising a plurality of wheels, of a shaft for supporting the wheels of all of the totalizers, a set of actuators common to the totalizers, means for rotating the supporting shaft at each operation of the machine, a manipulative device for shifting the shaft and placing it in position to be connected to the wheels of one of the totalizers, means for shifting the wheels as a unit to bring the wheels of one of the totalizers into position to be connected to the shaft and for then rotating the shaft to reset the wheels connected thereto during an operation of the machine, a series of keys for determining which set of totalizer wheels is to be connected to the shaft, means for connecting the selected totalizer wheels to the actuators to position said actuators in proportion to the movement of the wheels to zero, and type carriers controlled by the actuators.

109. In an accounting machine, the combination with a totalizer comprising a plurality of wheels, of actuators for said wheels, means for rocking the totalizer wheels into engagement with the actuators, type carriers controlled by the actuators, means for resetting the wheels to zero but normally out of operative condition, a manipulative device for placing the resetting means in operative condition, an additional means for rocking the totalizer into engagement with the actuators but normally disabled, and means controlled by the manipulative device for enabling the additional means and preventing operation of the first mentioned means for rocking the totalizer wheels into engagement with the actuators.

110. In an accounting machine, the combination with a totalizer comprising a plurality of wheels, of actuators for said wheels constructed to be moved from normal position and returned thereto upon an operation of the machine, means for rocking the totalizer wheels into engagement with said actuators previous to the return movement of said actuators to be actuated thereby, a normally inoperative resetting means for the wheels of the totalizer, a manipulative device for placing the resetting means in operative condition, mechanism for actuating the resetting means upon an operation of the machine, additional means for rocking the totalizer wheels into engagement when they are to be reset with the actuators while the latter are in normal position whereby the movement of said wheels to zero will be imparted to the actuators and through the latter control the positioning of the type carriers to record the total, the said additional means being normally disabled, and means controlled by the manipulative device for enabling the additional means and preventing the operation of the first mentioned means for rocking the totalizer into engagement with the actuators.

111. In an accounting machine, the combination with a plurality of totalizers, of a set of differentially movable actuators therefor, manipulative devices for determining the extent of movement of the actuators, and means for establishing coöperative relation between the actuators and different totalizers at different times during a single operation of the machine for the purpose of actuating each of said totalizers an extent determined by the operated manipulative devices.

112. In an accounting machine, the combination with a plurality of totalizers, of a set of differentially movable actuators therefor constructed to be moved from normal position and returned thereto during an operation of the machine, manipulative devices for determining the extent of movement of the actuators from normal position, and means for bringing one of the totalizers and the actuators into coöperative relation previous to the movement of said actuators from normal position and for bringing another one of said totalizers and the actuators into coöperative relation previous to the return movement of said actuators.

113. In an accounting machine, the combination with an operating mechanism therefor, of a shaft and a plurality of totalizers mounted thereon, each totalizer comprising a plurality of wheels, means actuated by the operating mechanism for rotating the shaft, and means for establishing operative relation between the shaft and the wheels of any totalizer mounted thereon for the purpose of resetting the totalizer wheels upon the rotation of the shaft by the operating mechanism.

114. In an accounting machine, the combination with an operating mechanism therefor, of a shaft and a plurality of totalizers mounted thereon, each totalizer comprising a plurality of wheels, means actuated by the operating mechanism for rotating the shaft, and means also actuated by the operating mechanism for bodily shifting the totalizers to bring any one thereof into operative relation with the shaft for the purpose of resetting the wheels of the totalizer brought into such relation with the shaft upon the rotation of the shaft by the operating mechanism.

115. In an accounting machine, the combination with an operating mechanism therefor, of a shaft and a totalizer comprising a plurality of wheels mounted thereon, normally inoperative connections between the shaft and the totalizer wheels, a manipulative device for shifting the shaft and thereby rendering the connections operative, and means actuated by the operating mechanism upon every operation thereof for rotating the shaft and thereby resetting the totalizer wheels when the connections between the shaft and totalizer wheels are rendered operative.

116. In an accounting machine, the combination with operating mechanism, of a plurality of totalizers, actuating means common thereto, and mechanism for automatically and successively establishing operative relation between said totalizers and the actuating means during an operation of the machine.

117. In an accounting machine, the combination with operating mechanism, of a plurality of totalizers, actuating means common thereto, and mechanism for automatically and successively moving the totalizers into engagement with the actuating means during an operation of the machine.

118. In an accounting machine, the combination with operating mechanism, of a plurality of totalizers, actuating means common thereto, mechanism for automatically and successively establishing operative relation between said totalizers and the actuating means during an operation of the machine, and manipulative devices controlling the extent of actuation of the totalizers by the actuating means.

119. In an accounting machine, the combination with operating mechanism, of a plurality of totalizers, actuating means common thereto, mechanism for automatically and successively moving the totalizers into engagement with the actuating means during an operation of the machine, and manipulative devices controlling the extent of actuation of the totalizers by the actuating means.

120. In an accounting machine, the combination with operating mechanism, of a plurality of totalizers, actuating means common thereto, mechanism for automatically and successively moving the totalizers into engagement with the actuating means during an operation of the machine for the purpose of subtracting an item from one of the totalizers and adding the item to the remainder of the totalizers, and manipulative devices for determining the amount of the item added to and subtracted from the totalizers.

121. In an accounting machine, the combination with a plurality of totalizers, of actuating means common thereto, means insuring the successive establishment of coöperative relation between the totalizers and actuating means during an operation of the machine, and manipulative devices controlling the extent of actuation of the totalizers by the actuating means.

122. In an accounting machine, the combination with a plurality of totalizers, of actuating means common thereto, means insuring the movement of the totalizers successively into engagement with the actuating means during an operation of the machine for the purpose of subtracting an item from one of the totalizers and adding the item to the remainder of the totalizers, and manipulative devices for determining the amount of the item added to and subtracted from the totalizers.

123. In an accounting machine, the combination with a plurality of totalizers, of means common thereto and arranged to successively actuate said totalizers during an operation of the machine, and manipulative devices for controlling the extent of actuation of the totalizers by the actuating means.

124. In an accounting machine, the combination with operating mechanism, of a pair of movable frames, a plurality of totalizers carried by each frame, differentially movable elements, a pair of actuators carried by each element, means for shifting the frames as a unit to bring one of the totalizers into coöperative relation with one set of actuators and then moving the frames to bring another of the totalizers into coöperative relation with one set of actuators and then moving the frames to bring another of the totalizers into coöperative relation with the second set of actuators during an operation of the machine.

125. In an accounting machine, the combination with operating mechanism, of a pair of movable frames, a plurality of totalizers carried by each frame, differentially movable elements, a pair of actuators carried by each element, means for shifting the frames as a unit to bring one of the totalizers into position relative to one set of actuators and then shifting the frames to bring another of the totalizers into position relative to the second set of actuators during an operation of the machine, and means for rocking the positioned totalizers into engagement with their respective actuators.

126. In an accounting machine, the combination with a main operating mechanism, of a plurality of totalizers, actuating means common thereto, mechanism for automatically and successively moving the totalizers into engagement with the actuating means during an operation of the machine, and means for rendering said mechanism effective to move but one totalizer into engagement with the actuating means during an operation of the machine.

127. In an accounting machine, the combination with a plurality of totalizers, of actuating means common thereto, mechanism for automatically and in automatic succession establishing operative relation between said totalizers and the actuating means, and manipulative devices operable once for controlling the extent of actuation of the totalizers by the actuating means.

128. In an accounting machine, the combination with a plurality of totalizers, of actuating means common thereto, mechanism for automatically and in automatic succession moving the totalizers into engagement with the actuating means, and manipulative devices operable once for controlling the extent of actuation of the totalizers by the actuating means.

129. In an accounting machine, the combination with a plurality of totalizers, of actuating means common thereto, and mechanism for automatically and in automatic succession moving the totalizers into engagement with the actuating means for the purpose of subtracting an item from one of the totalizers and adding the item to another totalizer.

130. In an accounting machine, the combination with a plurality of totalizers, of actuating means common thereto, mechanism for automatically and in automatic succession moving the totalizers into engagement with the actuating means for the purpose of subtracting an item from one of the totalizers and adding the item to another totalizer, and manipulative means for controlling the extent of actuation of the totalizers by the actuating means.

In testimony whereof I affix my signature in the presence of two witnesses.

HAAKON A. MARTIN.

Witnesses:
R. C. GLASS,
CARL W. BEUST.

Copies of this patent may be obtained for five cents each, by addressing the "Commissioner of Patents, Washington, D. C."